United States Patent
Noguchi et al.

(10) Patent No.: US 8,234,446 B2
(45) Date of Patent: Jul. 31, 2012

(54) DISK ARRAY APPARATUS, DATA DISTRIBUTION AND MANAGEMENT METHOD, AND DATA DISTRIBUTION AND MANAGEMENT PROGRAM

(75) Inventors: Yasuo Noguchi, Kawasaki (JP); Kazutaka Ogihara, Kawasaki (JP); Masahisa Tamura, Kawasaki (JP); Yoshihiro Tsuchiya, Kawasaki (JP); Tetsutaro Maruyama, Kawasaki (JP); Takashi Watanabe, Kawasaki (JP); Tatsuo Kumano, Kawasaki (JP); Kazuichi Oe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 306 days.

(21) Appl. No.: 12/636,268

(22) Filed: Dec. 11, 2009

(65) Prior Publication Data

US 2010/0199126 A1    Aug. 5, 2010

(30) Foreign Application Priority Data

Feb. 5, 2009   (JP) .................................. 2009-24951

(51) Int. Cl.
*G06F 12/00*   (2006.01)
(52) U.S. Cl. .......................... 711/114; 711/156; 711/162
(58) Field of Classification Search .................. None
See application file for complete search history.

(56) References Cited

U.S. PATENT DOCUMENTS
6,023,780 A    2/2000  Iwatani

FOREIGN PATENT DOCUMENTS
JP    9-305328    11/1997
JP    2008-71297   3/2008

*Primary Examiner* — Shawn X Gu
(74) *Attorney, Agent, or Firm* — Staas & Halsey LLP

(57) ABSTRACT

A parity-data generating unit generates, in response to a write request containing update data, updated parity data in the parity group to which the update data belongs. A time-series-information generating unit generates time-series information indicating an anteroposterior relationship during writing between the update data and existing data stored in the unit storage area to which the update data is to be written. A time-series-information adding unit adds the time-series information, generated in response to the write request, to the update data as certification time-series information and that adds comparison time-series information to the updated parity data in association with the update data, the comparison time-series information having the same value as the certification time-series information. A writing unit distributes and writes, to the multiple storage devices, the update data to which the certification time-series information is added and the updated parity data to which the comparison time-series information is added.

16 Claims, 56 Drawing Sheets

| LOGICAL BLOCK NUMBER | DISK NUMBER | PHYSICAL BLOCK NUMBER | DATA | TIMESTAMP | | | | |
|---|---|---|---|---|---|---|---|---|
| | | | | DISK#1 | DISK#2 | DISK#3 | DISK#4 | DISK#5 |
| D1 | DISK#1 | block#1 | d1 | t11 | null | null | null | null |
| P1 | DISK#5 | block#1 | p1 | t21 | t22 | t23 | t24 | null |

| LOGICAL BLOCK NUMBER | DISK NUMBER | PHYSICAL BLOCK NUMBER | DATA | TIMESTAMP | | | | |
|---|---|---|---|---|---|---|---|---|
| | | | | DISK#1 | DISK#2 | DISK#3 | DISK#4 | DISK#5 |
| D1 | DISK#1 | block#1 | d1_1 | t11_1 | null | null | null | null |
| P1 | DISK#5 | block#1 | p1_1 | t11_1 | t22 | t23 | t24 | null |

| LOGICAL BLOCK NUMBER | DISK NUMBER | PHYSICAL BLOCK NUMBER | DATA | TIMESTAMP | | | | |
|---|---|---|---|---|---|---|---|---|
| | | | | DISK#1 | DISK#2 | DISK#3 | DISK#4 | DISK#5 |
| D1 | DISK#1 | block#1 | d1 | t1 | null | null | null | null |
| D5 | DISK#2 | block#1 | d5 | null | t1 | null | null | null |
| D9 | DISK#3 | block#1 | d9 | null | null | t1 | null | null |
| D13 | DISK#4 | block#1 | d13 | null | null | null | t1 | null |
| P1 | DISK#5 | block#1 | p1 | t1 | t1 | t1 | t1 | null |
| ... | ... | ... | ... | ... | ... | ... | ... | ... |

PARITY GROUP

| LOGICAL BLOCK NUMBER | DISK NUMBER | PHYSICAL BLOCK NUMBER | DATA | TIMESTAMP | | | | |
|---|---|---|---|---|---|---|---|---|
| | | | | DISK#1 | DISK#2 | DISK#3 | DISK#4 | DISK#5 |
| D1 | DISK#1 | block#1 | d1 | t11 | null | null | null | null |
| P1 | DISK#5 | block#1 | p1 | t21 | t22 | t23 | t24 | null |

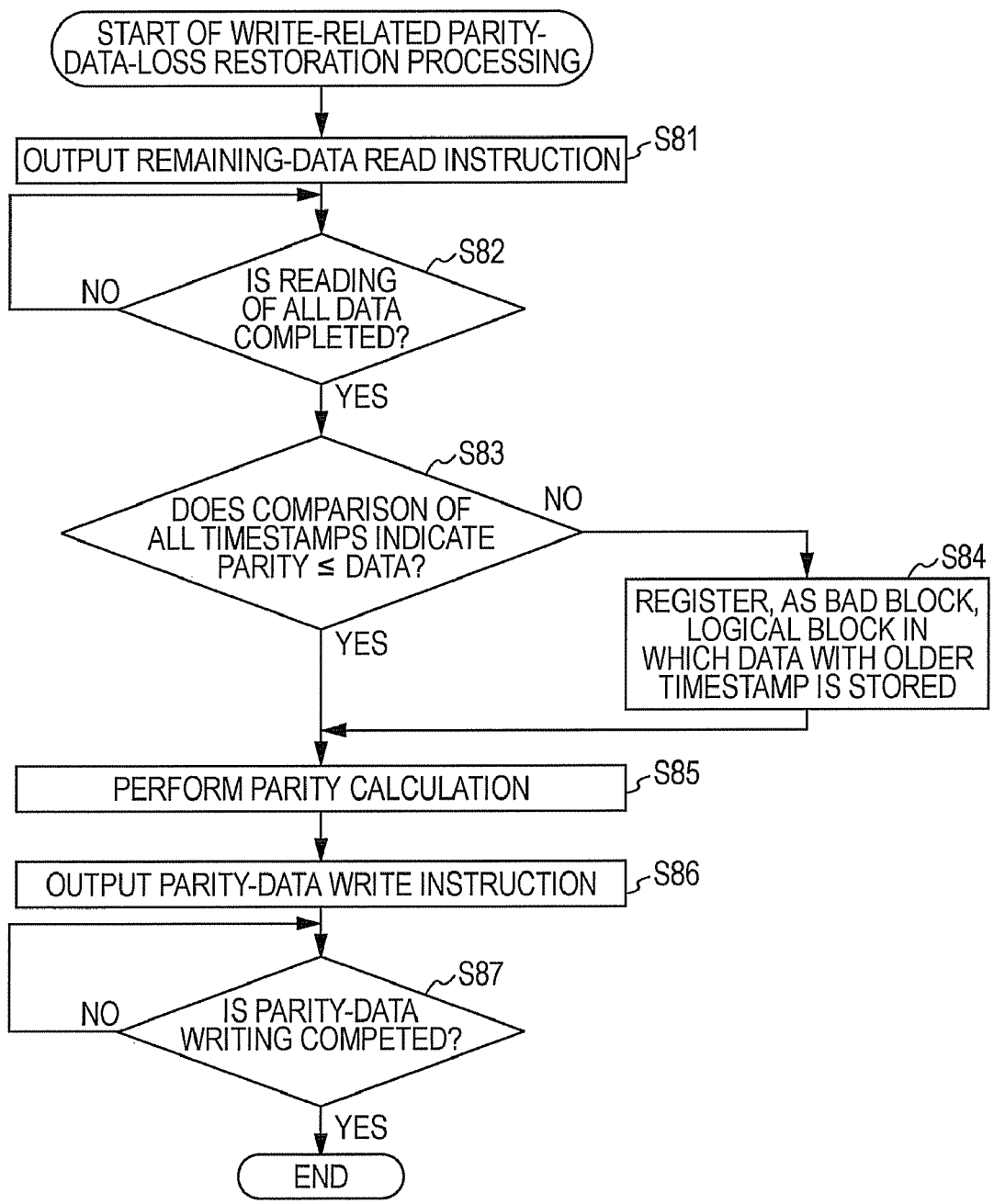

| LOGICAL BLOCK NUMBER | DISK NUMBER | PHYSICAL BLOCK NUMBER | DATA | TIMESTAMP | | | | |
|---|---|---|---|---|---|---|---|---|
| | | | | DISK#1 | DISK#2 | DISK#3 | DISK#4 | DISK#5 |
| D1 | DISK#1 | block#1 | d1 | t11 | null | null | null | null |
| D5 | DISK#2 | block#1 | d5 | null | t12 | null | null | null |
| D9 | DISK#3 | block#1 | d9 | null | null | t13 | null | null |
| D13 | DISK#4 | block#1 | d13 | null | null | null | t14 | null |
| P1 | DISK#5 | block#1 | p1 | t21 | t22 | t23 | t24 | null |

| LOGICAL BLOCK NUMBER | DISK NUMBER | PHYSICAL BLOCK NUMBER | DATA | TIMESTAMP | | | | |
|---|---|---|---|---|---|---|---|---|
| | | | | DISK#1 | DISK#2 | DISK#3 | DISK#4 | DISK#5 |
| D1 | DISK#1 | block#1 | d1 | t11 | null | null | null | null |
| D5 | DISK#2 | block#1 | d5 | null | t12 | null | null | null |
| D9 | DISK#3 | block#1 | d9 | null | null | t13 | null | null |
| D13 | DISK#4 | block#1 | d13 | null | null | null | t14 | null |
| P1 | DISK#5 | block#1 | p1_1 | t11 | t12 | t13 | t14 | null |

| LOGICAL BLOCK NUMBER | DISK NUMBER | PHYSICAL BLOCK NUMBER | DATA | TIMESTAMP | | | | |
|---|---|---|---|---|---|---|---|---|
| | | | | DISK#1 | DISK#2 | DISK#3 | DISK#4 | DISK#5 |
| D1 | DISK#1 | block#1 | d1_1 | t21 | null | null | null | null |
| D5 | DISK#2 | block#1 | d5 | null | t12 | null | null | null |
| D9 | DISK#3 | block#1 | d9 | null | null | t13 | null | null |
| D13 | DISK#4 | block#1 | d13 | null | null | null | t14 | null |
| P1 | DISK#5 | block#1 | p1 | t21 | t22 | t23 | t24 | null |

| LOGICAL BLOCK NUMBER | DISK NUMBER | PHYSICAL BLOCK NUMBER | DATA | TIMESTAMP | | | | |
|---|---|---|---|---|---|---|---|---|
| | | | | DISK#1 | DISK#2 | DISK#3 | DISK#4 | DISK#5 |
| D1 | DISK#1 | block#1 | d1 | t11 | null | null | null | null |
| D5 | DISK#2 | block#1 | d5 | null | t12 | null | null | null |
| D9 | DISK#3 | block#1 | d9 | null | null | t13 | null | null |
| D13 | DISK#4 | block#1 | d13 | null | null | null | t14 | null |
| P1 | DISK#5 | block#1 | p1_2 | t11 | t12 | t13 | t14 | null |

FIG. 24

| LOGICAL BLOCK NUMBER | DISK NUMBER | PHYSICAL BLOCK NUMBER | DATA | TIMESTAMP | | | | |
|---|---|---|---|---|---|---|---|---|
| | | | | DISK#1 | DISK#2 | DISK#3 | DISK#4 | DISK#5 |
| D1 | DISK#1 | block#1 | d1 | t11 | null | null | null | null |
| D5 | DISK#2 | block#1 | d5 | null | t12 | null | null | null |
| D9 | DISK#3 | block#1 | d9 | null | null | t13 | null | null |
| D13 | DISK#4 | block#1 | d13 | null | null | null | t14 | null |
| P1 | DISK#5 | block#1 | p1 | t21 | null | null | t24 | null |
| D2 | DISK#1 | block#2 | d2 | t15 | t16 | null | null | null |
| D6 | DISK#2 | block#2 | d6 | null | null | t17 | null | null |
| D10 | DISK#3 | block#2 | d10 | null | null | null | t18 | null |
| D14 | DISK#4 | block#2 | d14 | t25 | t26 | t27 | t28 | null |
| P2 | DISK#5 | block#2 | p2 | t29 | null | null | null | null |
| D3 | DISK#1 | block#3 | d3 | null | t110 | t111 | null | null |
| D7 | DISK#2 | block#3 | d7 | null | null | null | t112 | null |
| D11 | DISK#3 | block#3 | d11 | null | null | null | null | null |
| D15 | DISK#4 | block#3 | d15 | t113 | t114 | t115 | null | null |
| P3 | DISK#5 | block#3 | p3 | null | t210 | t211 | t212 | null |
| D4 | DISK#1 | block#4 | d4 | null | null | null | null | null |
| D8 | DISK#2 | block#4 | d8 | null | null | null | null | null |
| D12 | DISK#3 | block#4 | d12 | null | null | t115 | t116 | null |
| D16 | DISK#4 | block#4 | d16 | null | null | null | null | null |
| P4 | DISK#5 | block#4 | p4 | t213 | t214 | t215 | t216 | null |

132d

FIG. 26

FIG. 29

| LOGICAL BLOCK NUMBER | DISK NUMBER | PHYSICAL BLOCK NUMBER | DATA | TIMESTAMP | | | | |
|---|---|---|---|---|---|---|---|---|
| | | | | DISK#1 | DISK#2 | DISK#3 | DISK#4 | DISK#5 |
| ... | ... | ... | ... | ... | ... | ... | ... | ... |
| D2 | DISK#1 | block#2 | d2 | t15 | null | null | null | null |
| D6 | DISK#2 | block#2 | d6 | null | ✗ t16 | null | null | null |
| D10 | DISK#3 | block#2 | d10 | null | null | t17 | null | null |
| D14 | DISK#4 | block#2 | d14 | null | null | null | ✗ t18 | null |
| P2 | DISK#5 | block#2 | p2 | t25 | t26 | t27 | t28 | null |
| ... | ... | ... | ... | ... | ... | ... | ... | ... | t16 < t26     t18 < t28

⇒

| LOGICAL BLOCK NUMBER | DISK NUMBER | PHYSICAL BLOCK NUMBER | DATA | TIMESTAMP | | | | |
|---|---|---|---|---|---|---|---|---|
| | | | | DISK#1 | DISK#2 | DISK#3 | DISK#4 | DISK#5 |
| ... | ... | ... | ... | ... | ... | ... | ... | ... |
| D2 | DISK#1 | block#2 | d2 | t15 | null | null | null | null |
| D6 (BAD BLOCK) | DISK#2 | block#2 | d6 | null | t16 | null | null | null |
| D10 | DISK#3 | block#2 | d10 | null | null | t17 | null | null |
| D14 (BAD BLOCK) | DISK#4 | block#2 | d14 | null | null | null | t18 | null |
| P2 | DISK#5 | block#2 | p2_2 | t15 | t16 | t17 | t18 | null |
| ... | ... | ... | ... | ... | ... | ... | ... | ... |

132d

132d

FIG. 30

| PHYSICAL BLOCK NUMBER | DATA | COUNTER VALUE GROUP | | | | |
|---|---|---|---|---|---|---|
| | | DISK#1 | DISK#2 | ... | DISK#n-1 | DISK#n |
| block#1 | d(1, 1) | c(1, 1) | c(1, 2) | ... | c(1, n-1) | c(1, n) |
| block#2 | d(1, 2) | c(2, 1) | c(2, 2) | ... | c(2, n-1) | c(2, n) |
| ... | ... | ... | ... | ... | ... | ... |
| block#x-1 | d(1, x-1) | c(x-11, 1) | c(x-1, 2) | ... | c(x-1, n-1) | c(x-1, n) |
| block#x | d(1, x) | c(x, 1) | c(x, 2) | ... | c(x, n-1) | c(x, n) |

HDD 31a

FIG. 32

| u | v | DETERMINATION |
|---|---|---|
| 0 | 0 | NO WRITE-RELATED LOSS |
| 0 | 1 | WRITE-RELATED LOSS IN U |
| 0 | 2 | INDETERMINABLE |
| 0 | 3 | WRITE-RELATED LOSS IN V |
| 1 | 0 | WRITE-RELATED LOSS IN V |
| 1 | 1 | NO WRITE-RELATED LOSS |
| 1 | 2 | WRITE-RELATED LOSS IN U |
| 1 | 3 | INDETERMINABLE |
| 2 | 0 | INDETERMINABLE |
| 2 | 1 | WRITE-RELATED LOSS IN V |
| 2 | 2 | NO WRITE-RELATED LOSS |
| 2 | 3 | WRITE-RELATED LOSS IN U |
| 3 | 0 | WRITE-RELATED LOSS IN U |
| 3 | 1 | INDETERMINABLE |
| 3 | 2 | WRITE-RELATED LOSS IN V |
| 3 | 3 | NO WRITE-RELATED LOSS |

FIG. 33

| LOGICAL BLOCK | DISK NUMBER | PHYSICAL BLOCK | DATA | TIMESTAMP | FLAG #1 | COUNTER VALUE #1 | FLAG #2 | COUNTER VALUE #2 | FLAG #3 | COUNTER VALUE #3 | FLAG #4 | COUNTER VALUE #4 | FLAG #5 | COUNTER VALUE #5 |
|---|---|---|---|---|---|---|---|---|---|---|---|---|---|---|
| D1 | DISK#1 | block#1 | d1 | t1 | f1 | c1 | null | null | null | null | null | null | null | null |
| D2 | DISK#1 | block#2 | d2 | t2 | f2 | c2 | null | null | null | null | null | null | null | null |
| D3 | DISK#1 | block#3 | d3 | t3 | f3 | c3 | null | null | null | null | null | null | null | null |
| D4 | DISK#1 | block#4 | d4 | t4 | f4 | c4 | null | null | null | null | null | null | null | null |
| D5 | DISK#2 | block#1 | d5 | t5 | null | null | f5 | c5 | null | null | null | null | null | null |
| D6 | DISK#2 | block#2 | d6 | t6 | null | null | f6 | c6 | null | null | null | null | null | null |
| D7 | DISK#2 | block#3 | d7 | t7 | null | null | f7 | c7 | null | null | null | null | null | null |
| D8 | DISK#2 | block#4 | d8 | t8 | null | null | f8 | c8 | null | null | null | null | null | null |
| D9 | DISK#3 | block#1 | d9 | t9 | null | null | null | null | f9 | c9 | null | null | null | null |
| D10 | DISK#3 | block#2 | d10 | t10 | null | null | null | null | f10 | c10 | null | null | null | null |
| D11 | DISK#3 | block#3 | d11 | t11 | null | null | null | null | f11 | c11 | null | null | null | null |
| D12 | DISK#3 | block#4 | d12 | t12 | null | null | null | null | f12 | c12 | null | null | null | null |
| D13 | DISK#4 | block#1 | d13 | t13 | null | null | null | null | null | null | f13 | c13 | null | null |
| D14 | DISK#4 | block#2 | d14 | t14 | null | null | null | null | null | null | f14 | c14 | null | null |
| D15 | DISK#4 | block#3 | d15 | t15 | null | null | null | null | null | null | f15 | c15 | null | null |
| D16 | DISK#4 | block#4 | d16 | t16 | null | null | null | null | null | null | f16 | c16 | null | null |
| P1 | DISK#5 | block#1 | p1 | t17 | f11 | c11 | f12 | c12 | f13 | c13 | f14 | c14 | null | null |
| P2 | DISK#5 | block#2 | p2 | t18 | f21 | c21 | f22 | c22 | f23 | c23 | f24 | c24 | null | null |
| P3 | DISK#5 | block#3 | p3 | t19 | f31 | c31 | f32 | c32 | f33 | c33 | f34 | c34 | null | null |
| P4 | DISK#5 | block#4 | p4 | t20 | f41 | c41 | f42 | c42 | f43 | c43 | f44 | c44 | null | null |

| LOGICAL BLOCK | DISK NUMBER | PHYSICAL BLOCK | DATA | TIMESTAMP | FLAG #1 | COUNTER VALUE #1 | FLAG #2 | COUNTER VALUE #2 | FLAG #3 | COUNTER VALUE #3 | FLAG #4 | COUNTER VALUE #4 | FLAG #5 | COUNTER VALUE #5 |
|---|---|---|---|---|---|---|---|---|---|---|---|---|---|---|
| D1 | DISK#1 | block#1 | d1 | t1 | f1 | c1 | null | null | null | null | null | null | null | null |
| P1 | DISK#5 | block#1 | p1 | t17 | f11 | c11 | f12 | c12 | f13 | c13 | f14 | c14 | null | null |

| LOGICAL BLOCK | DISK NUMBER | PHYSICAL BLOCK | DATA | TIMESTAMP | FLAG #1 | COUNTER VALUE #1 | FLAG #2 | COUNTER VALUE #2 | FLAG #3 | COUNTER VALUE #3 | FLAG #4 | COUNTER VALUE #4 | FLAG #5 | COUNTER VALUE #5 |
|---|---|---|---|---|---|---|---|---|---|---|---|---|---|---|
| D1 | DISK#1 | block#1 | d1_1 | t1_1 | 0 | c1_1 | null | null | null | null | null | null | null | null |
| P1 | DISK#5 | block#1 | p1_1 | t17 | 0 | c11_1 | f12 | c12 | f13 | c13 | f14 | c14 | null | null |

$p1\_1 = d1 \wedge p1 \wedge d1\_1$

| LOGICAL BLOCK | DISK NUMBER | PHYSICAL BLOCK | DATA | TIMESTAMP | FLAG #1 | COUNTER VALUE #1 | FLAG #2 | COUNTER VALUE #2 | FLAG #3 | COUNTER VALUE #3 | FLAG #4 | COUNTER VALUE #4 | FLAG #5 | COUNTER VALUE #5 |
|---|---|---|---|---|---|---|---|---|---|---|---|---|---|---|
| D1 | DISK#1 | block#1 | d1 | t1_2 | 1 | 0 | null | null | null | null | null | null | null | null |
| D2 | DISK#1 | block#2 | d2 | t1_2 | 1 | 0 | null | null | null | null | null | null | null | null |
| D3 | DISK#1 | block#3 | d3 | t1_2 | 1 | 0 | null | null | null | null | null | null | null | null |
| D4 | DISK#1 | block#4 | d4 | t1_2 | 1 | 0 | null | null | null | null | null | null | null | null |
| D5 | DISK#2 | block#1 | d5 | t1_2 | null | null | 1 | 0 | null | null | null | null | null | null |
| D6 | DISK#2 | block#2 | d6 | t1_2 | null | null | 1 | 0 | null | null | null | null | null | null |
| D7 | DISK#2 | block#3 | d7 | t1_2 | null | null | 1 | 0 | null | null | null | null | null | null |
| D8 | DISK#2 | block#4 | d8 | t1_2 | null | null | 1 | 0 | null | null | null | null | null | null |
| D9 | DISK#3 | block#1 | d9 | t1_2 | null | null | null | null | 1 | 0 | null | null | null | null |
| D10 | DISK#3 | block#2 | d10 | t1_2 | null | null | null | null | 1 | 0 | null | null | null | null |
| D11 | DISK#3 | block#3 | d11 | t1_2 | null | null | null | null | 1 | 0 | null | null | null | null |
| D12 | DISK#3 | block#4 | d12 | t1_2 | null | null | null | null | 1 | 0 | null | null | null | null |
| D13 | DISK#4 | block#1 | d13 | t1_2 | null | null | null | null | null | null | 1 | 0 | null | null |
| D14 | DISK#4 | block#2 | d14 | t1_2 | null | null | null | null | null | null | 1 | 0 | null | null |
| D15 | DISK#4 | block#3 | d15 | t1_2 | null | null | null | null | null | null | 1 | 0 | null | null |
| D16 | DISK#4 | block#4 | d16 | t1_2 | null | null | null | null | null | null | 1 | 0 | null | null |
| P1 | DISK#5 | block#1 | p1 | t1_2 | 1 | 0 | 1 | 0 | 1 | 0 | 1 | 0 | null | null |
| P2 | DISK#5 | block#2 | p2 | t1_2 | 1 | 0 | 1 | 0 | 1 | 0 | 1 | 0 | null | null |
| P3 | DISK#5 | block#3 | p3 | t1_2 | 1 | 0 | 1 | 0 | 1 | 0 | 1 | 0 | null | null |
| P4 | DISK#5 | block#4 | p4 | t1_2 | 1 | 0 | 1 | 0 | 1 | 0 | 1 | 0 | null | null |

| LOGICAL BLOCK NUMBER | STATUS |
|---|---|
| D1 | null |
| D5 | null |
| D9 | null |
| D13 | null |
| P1 | null |

FIG. 42

BLOCK WRITING (TIME T1)

| LOGICAL BLOCK | FLAG | COUNTER VALUE | TIMESTAMP | STATUS |
|---|---|---|---|---|
| D | 0 | 1 | T1 | NORMAL |
| P | 0 | 1 | Tx | NORMAL |

BLOCK WRITING (TIME T2)

PATTERN "1"

| LOGICAL BLOCK | FLAG | COUNTER VALUE | TIMESTAMP | STATUS | DETECTION METHOD |
|---|---|---|---|---|---|
| D | 0 | 2 | T2 | NORMAL | FIRST COUNTER-VALUE COMPARISON PROCESSING (D = P) |
| P | 0 | 2 | Tx | NORMAL | |

PATTERN "2"

| LOGICAL BLOCK | FLAG | COUNTER VALUE | TIMESTAMP | STATUS | DETECTION METHOD |
|---|---|---|---|---|---|
| D | 0 | 1 | T1 | WRITE ERROR | FIRST COUNTER-VALUE COMPARISON PROCESSING (D < P) |
| P | 0 | 2 | Tx | NORMAL | |

PATTERN "3"

| LOGICAL BLOCK | FLAG | COUNTER VALUE | TIMESTAMP | STATUS | DETECTION METHOD |
|---|---|---|---|---|---|
| D | 0 | 2 | T2 | NORMAL | FIRST COUNTER-VALUE COMPARISON PROCESSING (D > P) |
| P | 0 | 1 | Tx | WRITE ERROR | |

FIG. 43

STRIPE WRITING (TIME T3)

| LOGICAL BLOCK | FLAG | COUNTER VALUE | TIMESTAMP | STATUS |
|---|---|---|---|---|
| D | 1 | 0 | T3 | NORMAL |
| P | 1 | 0 | T3 | NORMAL |

PATTERN "4"

STRIPE WRITING (TIME T4)

| LOGICAL BLOCK | FLAG | COUNTER VALUE | TIMESTAMP | STATUS | DETECTION METHOD |
|---|---|---|---|---|---|
| D | 1 | 0 | T4 | NORMAL | FIRST TIMESTAMP COMPARISON PROCESSING (D = P) |
| P | 1 | 0 | T4 | NORMAL | |

PATTERN "5"

| LOGICAL BLOCK | FLAG | COUNTER VALUE | TIMESTAMP | STATUS | DETECTION METHOD |
|---|---|---|---|---|---|
| D | 1 | 0 | T3 | WRITE ERROR | FIRST TIMESTAMP COMPARISON PROCESSING (D < P) |
| P | 1 | 0 | T4 | NORMAL | |

PATTERN "6"

| LOGICAL BLOCK | FLAG | COUNTER VALUE | TIMESTAMP | STATUS | DETECTION METHOD |
|---|---|---|---|---|---|
| D | 1 | 0 | T4 | NORMAL | FIRST TIMESTAMP COMPARISON PROCESSING (D > P) |
| P | 1 | 0 | T3 | WRITE ERROR | |

FIG. 44

STRIPE WRITING (TIME T3)

| LOGICAL BLOCK | FLAG | COUNTER VALUE | TIMESTAMP | STATUS |
|---|---|---|---|---|
| D | 1 | 0 | T3 | NORMAL |
| P | 1 | 0 | T3 | NORMAL |

BLOCK WRITING (TIME T5)

PATTERN "7"

| LOGICAL BLOCK | FLAG | COUNTER VALUE | TIMESTAMP | STATUS | DETECTION METHOD |
|---|---|---|---|---|---|
| D | 0 | 1 | T5 | NORMAL | FIRST COUNTER-VALUE COMPARISON PROCESSING (D = P) |
| P | 0 | 1 | T3 | NORMAL | |

PATTERN "8"

| LOGICAL BLOCK | FLAG | COUNTER VALUE | TIMESTAMP | STATUS | DETECTION METHOD |
|---|---|---|---|---|---|
| D | 1 | 0 | T3 | WRITE ERROR | SECOND TIMESTAMP COMPARISON PROCESSING (D = P) SECOND COUNTER-VALUE COMPARISON PROCESSING (D < P) |
| P | 0 | 1 | T3 | NORMAL | |

PATTERN "9"

| LOGICAL BLOCK | FLAG | COUNTER VALUE | TIMESTAMP | STATUS | DETECTION METHOD |
|---|---|---|---|---|---|
| D | 0 | 1 | T5 | NORMAL | SECOND TIMESTAMP COMPARISON PROCESSING (D > P) |
| P | 1 | 0 | T3 | WRITE ERROR | |

| LOGICAL BLOCK | STATUS |
|---|---|
| D1 | OK |
| D5 | null |
| D9 | null |
| D13 | null |
| P1 | OK |

| LOGICAL BLOCK | STATUS |
|---|---|
| D1 | ERROR |
| D5 | null |
| D9 | null |
| D13 | null |
| P1 | OK |

| LOGICAL BLOCK | STATUS |
|---|---|
| D1 | OK |
| D5 | null |
| D9 | null |
| D13 | null |
| P1 | ERROR |

| LOGICAL BLOCK | STATUS |
|---|---|
| D1 | ERROR |
| D5 | null |
| D9 | null |
| D13 | null |
| P1 | ERROR |

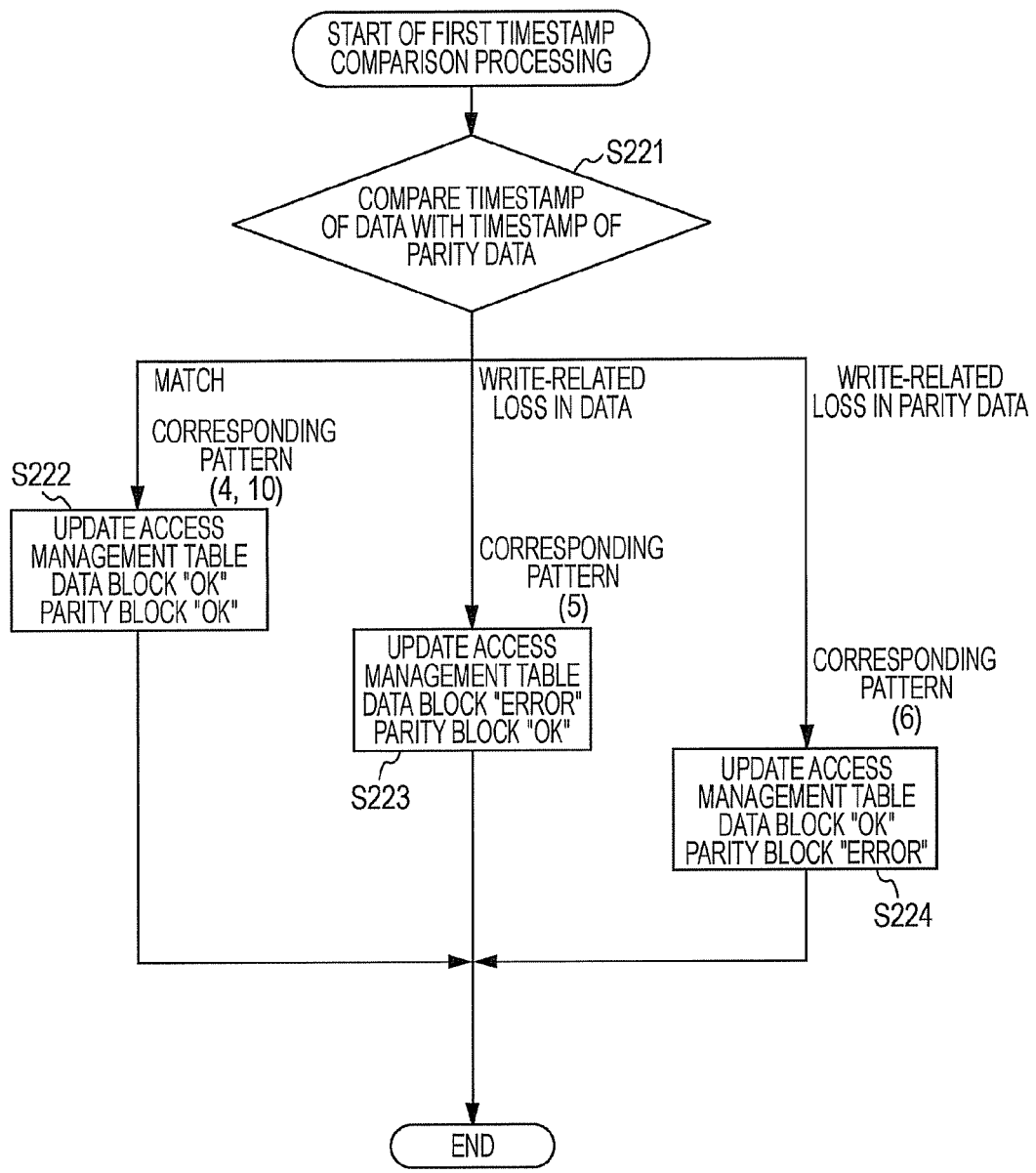

| LOGICAL BLOCK | STATUS |
|---|---|
| D1 | null |
| D5 | null |
| D9 | null |
| D13 | null |
| P1 | null |

132i

| LOGICAL BLOCK | STATUS |
|---|---|
| D2 | null |
| D6 | null |
| D10 | null |
| D14 | null |
| P2 | null |

132j

| LOGICAL BLOCK | STATUS |
|---|---|
| D3 | null |
| D7 | null |
| D11 | null |
| D15 | null |
| P3 | null |

132k

| LOGICAL BLOCK | STATUS |
|---|---|
| D4 | null |
| D8 | null |
| D12 | null |
| D16 | null |
| P4 | null |

DISK ARRAY APPARATUS, DATA DISTRIBUTION AND MANAGEMENT METHOD, AND DATA DISTRIBUTION AND MANAGEMENT PROGRAM

CROSS-REFERENCE TO RELATED APPLICATIONS

This application is based upon and claims the benefit of priority of the prior Japanese Patent Application No. 2009-24951, filed on Feb. 5, 2009, the entire contents of which are incorporated herein by reference.

FIELD

The embodiments discussed herein relate to a technology for distributing and storing data and parity data in a parity group into blocks in multiple storage devices.

BACKGROUND

In computers, hard disk devices (or hard disk drives (HDDs)) are used as large-capacity storage devices. Various types of data are stored in HDDs depending on applications, and high levels of reliability are required for the HDDs. Disk array apparatuses having an array of HDDs employ various reliability-enhancing technologies.

For example, as a technology for enhancing the reliability of HDDs, a RAID (Redundant Arrays of Inexpensive Disks) is available. The RAID is a technology for causing multiple HDDs to function collectively as a single hard disk, thereby increasing the speed in data input/output and improving the reliability. A disk array apparatus using RAID is called a "RAID device or apparatus".

A variety of applied technologies are being studied as reliability-improving technology using RAID. For example, as technology for identifying a data error portion during disk failure, there is a technology in which the same access history information is stored during writing of data to multiple storage areas in different HDDs. The use of such access history information allows unmatched data portion to be identified during a failure of a HDD in RAID 6.

The use of RAID makes it possible to not only detect a failure of a HDD but also detect and correct an abnormality during access to individual data. Abnormalities during access to data in a HDD include an abnormality in which data changes in the apparatus, an abnormality in which data is allocated to a wrong location on a disk device, and an abnormality in which a response indicating that data is properly written is issued without the data being written (this abnormality may be referred to as a "write-related loss" hereinafter).

A RAID apparatus adds an ECC (error correcting code) to data and writes the resulting data, in order to deal with a data-access abnormality. The RAID apparatus then uses the ECC to detect an abnormality during reading. If written data changes, an error can be detected through ECC checking. Upon detecting an abnormality, the RAID apparatus uses parity data or the like to correct the data. With this arrangement, it is possible to detect and correct an abnormality in which data changes in the apparatus.

With respect to an abnormality in which data is written to a wrong location, the abnormality cannot be detected using the ECC. Thus, for example, the RAID apparatus adds address information to data and writes the resulting data. During reading of the data, the RAID apparatus checks the address added to the data. When the address of an area from which the data is to be read and the address added to the data are different from each other, it can be determined that the data is written to a wrong location. That is, it is possible to detect an abnormality in which data is written to a wrong location. Upon detecting such an abnormality, the RAID apparatus reconstructs and restores the original data by using parity data.

In this manner, when data changes in the RAID apparatus or when data is written to a wrong location, the RAID apparatus can detect the abnormality during reading of the data and can restore the original data.

With respect to a write-related loss, however, even the RAID apparatus cannot detect the abnormality during reading of the data. This is because, for a write-related loss, previously written correct data already exists in a block in question. Thus, even when the ECC is checked during reading of the data, it is determined that the data is properly written, and when the address is checked, it is also determined that the data is properly written. As a result, the ECC or address checking cannot detect an abnormality during reading of the data.

Accordingly, a known RAID apparatus reads data written immediately after writing of the data and compares the written data with the read data. The expression "immediately after data writing" used herein refers to time before a response indicating the completion of data write processing is sent to a host computer. Before the data write processing is completed, a controller in the RAID apparatus holds the data to be written and thus can compare the data with read data. Such data comparison before the data write processing is completed makes it possible to check whether or not the writing is properly executed.

This method, however, is based on the premise that writing/reading of data to/from HDDs is performed as part of the write processing, and thus cannot use write caching. Reading of data from a block immediately after writing of the data involves a wait time for the disk to make one rotation. Thus, the time for responding to the host computer during writing is extended. Consequently, the performance of the writing decreases.

With a RAID apparatus that manages data in RAID 3, it is possible to detect a write-related loss by simultaneously recording data and a timestamp to each physical block and comparing the timestamps during reading. In RAID 3, data in one logical block is distributed and stored across physical blocks in multiple HDDs. That is, in RAID 3, respective physical blocks in multiple HDDs constitute one logical block. Thus, when data is written to a logical block, the data is always written to multiple physical blocks at the same time. Accordingly, simultaneously with writing data to physical blocks constituting a logical block, the RAID apparatus writes the same timestamp to all the physical blocks. During reading of the data, the RAID apparatus simultaneously reads the timestamps from all physical blocks and compares the timestamps. When a physical block having a different timestamp exists, it can be determined that a write-related loss occurred.

The RAID apparatus based on RAID 5, however, has a problem in that it cannot detect a write-related loss during reading of data when the same method as for RAID 3 is used. That is, in RAID 5, the logical blocks and the physical blocks correspond to each other on a one-to-one basis and the individual physical blocks are independently updated. Thus, during writing of data to a physical block, there is only one physical block to which the data is to be written, and thus, processing for writing the same timestamp to multiple physical blocks cannot be performed, unlike RAID 3.

Such a problem is common to not only RAID apparatuses using RAID 5 but also disk array apparatuses that perform data write control such that data in one logical block is written to only one physical block.

In a certain aspect, an object of the present invention is to provide a technology that allows a write-related loss to be detected during data reading even when data in one physical block is updated during update of data in a logical block.

SUMMARY

A disk array apparatus in which each of storage areas in multiple storage devices is divided into multiple unit storage areas, multiple pieces of data and parity data generated based on the multiple pieces of data are grouped into a parity group, and the multiple pieces of data and the parity data in the same parity group are distributed and stored in the unit storage areas in the multiple storage devices. A parity-data generating unit that generates, in response to a write request containing update data, updated parity data in the parity group to which the update data belongs. A time-series-information generating unit that generates time-series information indicating an anteroposterior relationship during writing between the update data and existing data stored in the unit storage area to which the update data is to be written. A time-series-information adding unit that adds the time-series information, generated in response to the write request, to the update data as certification time-series information and that adds comparison time-series information to the updated parity data in association with the update data, the comparison time-series information having the same value as the certification time-series information. A writing unit that distributes and writes, to the multiple storage devices, the update data to which the certification time-series information is added and the updated parity data to which the comparison time-series information is added.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 11 is an example of the data structure of a data-to-be-processed table;

FIG. 12 illustrates an example of the data-to-be-processed table after the data are updated;

FIG. 14 illustrates an example of the data-to-be-processed table for the stripe writing;

FIG. 16 illustrates an example of the data structure of a data-to-be-processed table;

FIG. 17 is a flowchart of a procedure of write-related parity-data-loss restoration processing;

FIG. 18 illustrates an example of the data-to-be-processed table for the write-related parity-data-loss restoration;

FIG. 19 illustrates an example of the data-to-be-processed table after the parity data is restored;

FIG. 21 illustrates the data-to-be-processed table after the data restoration;

FIG. 22 illustrates the data-to-be-processed table when data cannot be restored;

FIG. 24 illustrates an example of a data-to-be-processed table for stripe writing;

FIG. 26 illustrates the data-to-be-processed table after a write-related parity-data loss occurs and parity data is generated;

FIG. 29 illustrates an example of the data-to-be-processed table used when a write-related loss occurred in two or more pieces of data;

FIG. 30 is an example of counter values stored in the HDD in a second embodiment;

FIG. 32 illustrates write-related loss determination criteria based on a counter-value comparison result;

FIG. 33 is an example of the data structure of a data-to-be-processed table in a third embodiment;

FIG. 36 illustrates an example of a data-to-be-processed table used when a write request is issued;

FIG. 37 illustrates an example of the data-to-be-processed table after the update;

FIG. 39 illustrates an example of a data-to-be-processed table for stripe writing;

FIG. 41 illustrates an example of an initialized access management table;

FIG. 42 illustrates time-series-information generation patterns when block writing continues;

FIG. 43 illustrates time-series-information generation patterns when stripe writing continues;

FIG. 44 illustrates time-series-information generation patterns when block writing is performed after stripe writing;

FIGS. 48A to 48D each illustrate an access management table after the first counter-value comparison processing is executed;

FIG. 49 is a flowchart of a procedure of first timestamp comparison processing;

FIG. 57 illustrates an example of the access management tables initialized during stripe reading;

DESCRIPTION OF EMBODIMENTS

Embodiments will be described below with reference to the accompanying drawings.

Figure 1:
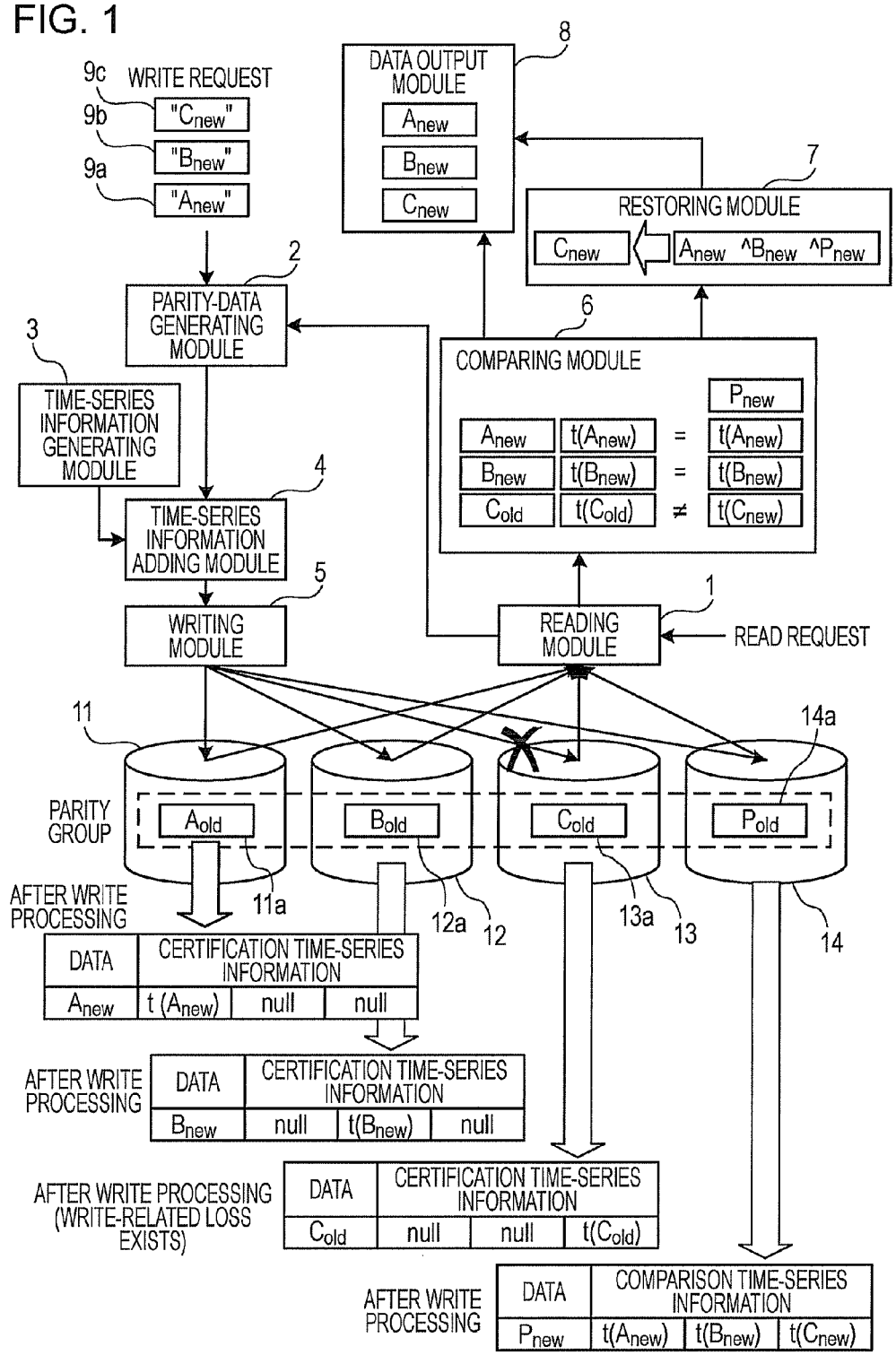
FIG. 1 is a diagram illustrating an overview of embodiments.

FIG. 1 is a diagram illustrating an overview of embodiments. FIG. 1 illustrates a function of a disk array apparatus. In the disk array apparatus, each of storage areas in storage devices 11 to 14 is divided into multiple unit storage areas (blocks) for management. In the disk array apparatus, multiple pieces of data and parity data generated based on the multiple pieces of data are grouped into a parity group. In the disk array apparatus, the multiple pieces of data and the parity data in the parity group are distributed and stored in the blocks in the storage devices 11 to 14.

In this case, during storage of the data and the parity data, a data or parity-data loss during write (i.e., a write-related loss) can occur. One example of a method for detecting a write-related loss is a method in which written data and parity data are read immediately after the writing thereof to thereby check whether or not the data and the parity data are properly written. The use of such a method, however, requires a large amount of time to perform write processing. The disk array apparatus has a reading module 1, a parity-data generating module 2, a time-series-information generating module 3, a time-series-information adding module 4, a writing module 5, a comparing module 6, a restoring module 7, and a data output module 8.

In response to a write request, the reading module 1 reads, from the multiple storage devices 11 to 14, data that exists in a block to which update data specified by the read request is to be written and parity data belonging to the same parity data as the update data.

Also, in response to a read request specifying update data written in accordance with a write request, the reading module 1 reads, from the multiple storage devices 11 to 14, the update data having time-series information (certification time-series information). In addition, in response to the read request, the reading module 1 reads, in the parity group to which the update data belongs, parity data having multiple pieces of time-series information (comparison time-series information). The pieces of comparison time-series information added to the parity data are associated with corresponding pieces of data in the same parity group.

The parity-data generating module 2 uses the existing data, the update data, and the read parity data to generate new parity data (updated parity data) corresponding to the update data.

Each time the time-series-information generating module 3 receives a write request, it generates time-series information indicating an anteroposterior relationship during writing between update data and existing data stored in a unit storage area to which the update data is to be written. For example, the time-series-information generating module 3 generates, as the time-series information, time-series information having a value that increases as the write request is input later. Such time-series information includes, for example, a timestamp and a counter value that is counted up by a counter in response to each write request.

The time-series-information adding module 4 adds the time-series information, generated in response to the write request, to the update data as certification time-series information. The time-series-information adding module 4 adds comparison time-series information to the updated parity data in association with the update data, the time-series information having the same value as the certification time-series information.

The writing module 5 writes, to the different storage devices, the update data to which the certification time-series information is added and the updated parity data to which the comparison-time-series information is added.

The comparing module 6 compares the certification time-series information, added to the update data read in response to the read request, with the comparison time-series information, added to the updated parity data in association with the update data.

On the basis of the result of the comparison performed by the comparing module 6, the restoring module 7 determines the presence/absence of a write-related loss during writing of the update data or the updated parity data. For example, when the value of the certification time-series information of the update data is smaller than the comparison time-series information added to the updated parity data in association with the update data, the restoring module 7 determines that a write-related loss has occurred during writing of the updated data. Upon detecting a write-related loss in the update data, the restoring module 7 causes the reading module 1 to read, from the storage devices, other data in the parity group to which the update data belongs. The restoring module 7 then uses the data other than the update data and the updated parity data to restore the data to be read.

When the certification time-series information and the comparison time-series information match each other, the data output module 8 outputs the update data as a response to the read request. When the update data is restored, the data output module 8 outputs the restored update data.

Even in a system in which data in a logical block is written to one physical block, such as a RAID 5 system, the disk array apparatus having the above-described function can detect a write-related loss in the data during reading of the data.

A description will now be given of an example of a parity group having three pieces of data $A_{old}$, $B_{old}$, and $C_{old}$ and one piece of parity data $P_{old}$. The data and the parity data in the parity group are stored in the storage devices 11 to 14 in a distributed manner. That is, the data $A_{old}$ is stored in a block 11a in the storage device 11. The data $B_{old}$ is stored in a block 12a in the storage device 12. The data $C_{old}$ is stored in a block 13a in the storage device 13. The parity data $P_{old}$ is stored in a block 14a in the storage device 14.

It is now assumed that a request 9a for writing update data $A_{new}$ for the data $A_{old}$, a request 9b for writing update data $B_{new}$ for the data $B_{old}$, and a request 9c for writing update data $C_{new}$ for the data $C_{old}$ are sequentially input.

When the request 9a for writing the update data $A_{new}$ is input, the reading module 1 reads the existing data $A_{old}$ and the existing parity data $P_{old}$. The parity-data generating module 2 then generates updated parity data. For example, a bitwise XOR (Exclusive OR) operation may be performed on the pieces of data in the parity group to obtain the updated parity data. That is, performing a bitwise XOR operation on the data $A_{old}$, the parity data $P_{old}$, and the update data $A_{new}$ makes it possible to generate the updated parity data.

In response to the request for writing the update data $A_{new}$, the time-series-information generating module 3 generates time-series information. The time-series information is information that can identify, for example, at least a temporal anteroposterior relationship between a request for writing the existing data $A_{old}$ and the request for writing the update data $A_{new}$. For example, the time-series information may be a timestamp. In this case, the time-series information generated in response to the request for writing the update data $A_{new}$ is represented by $t(A_{new})$. The time-series information generated by the time-series-information generating module 3 is added to the update data $A_{new}$ and the updated parity data generated by the parity-data generating module 2.

The time-series information added to the updated parity data is associated with the update data $A_{new}$. For example, multiple time-series information storage areas provided for the updated parity data are associated with the storage devices 11 to 14. The time-series information generated during writing of the update data $A_{new}$ is stored in, of the time-series information storage areas, the time-series information storage area associated with the storage device 11 in which the update data $A_{new}$ is stored. Thus, the time-series information $t(A_{new})$ is added to the parity data while the association with the update data $A_{new}$ is maintained.

The writing module 5 writes, to the block 11a in the storage device 11, the update data $A_{new}$ having the time-series information $t(A_{new})$ in an overwriting manner. During the writing, the writing module 5 also writes the time-series information $t(A_{new})$, added to the update data $A_{new}$, to the storage device 11.

Thereafter, write processing is performed in response to the request 9b for writing the update data $B_{new}$ and the request 9c for writing the update data C. It is now assumed that the writing of the update data $B_{new}$ is properly executed and a write-related loss occurred during the write processing of the update data $C_{new}$. It is also assumed that writing of the updated parity data is properly executed during execution of each write request.

In this case, upon execution of the write request 9a, 9b, and 9c, the update data $A_{new}$ and the time-series information $t(A_{new})$ are stored in the block 11a in the storage device 11 and the update data $B_{new}$ and the time-series information $t(B_{new})$ are stored in the block 12a in the storage device 12.

However, the pre-update existing data $C_{old}$ and the time-series information $t(C_{old})$, generated during writing of the existing data $C_{old}$, are still stored in the block 13a in the storage device 13. The updated parity data $P_{new}$ generated based on the update data $A_{new}$, $B_{new}$, and $C_{new}$ and the time-series information $t(A_{new})$, $t(B_{new})$, and $t(C_{new})$ are stored in the block 14a in the storage device 14. The time-series information $t(A_{new})$, $t(B_{new})$, and $t(C_{new})$ are associated with the update data $A_{new}$, $B_{new}$, and $C_{new}$, respectively.

It is assumed that, thereafter, requests for reading the update data $A_{new}$, $B_{new}$, and $C_{new}$ are sequentially input. First, when a request for reading the update data $A_{new}$ is input, the reading module 1 reads the update data $A_{new}$ and the parity data $P_{new}$. At the same time, the reading module 1 reads the time-series information added to the update data $A_{new}$ and the parity data $P_{new}$.

Next, the comparing module 6 extracts the time-series information $t(A_{new})$, associated with the update data $A_{new}$, from the multiple pieces of time-series information added to the parity data $P_{new}$. The comparing module 6 then compares the extracted time-series information $t(A_{new})$ with the time-series information $t(A_{new})$ added to the update data $A_{new}$. Since the values match each other in this case, the comparing module 6 determines that no write-related loss exists. When no write-related loss exists, the data output module 8 outputs the read update data $A_{new}$.

When a request for reading the update data $B_{new}$ is input, processing that is similar to the reading of the update data $A_{new}$ is performed. In this case, the time-series information $t(B_{new})$ added to the update data $B_{new}$ has the same value as, of the multiple pieces of time-series information added to the updated parity data $P_{new}$, the time-series information $t(B_{new})$ associated with the update data $B_{new}$. Thus, it is also determined that no write-related loss occurred during the writing of the update data $B_{new}$, and the data output module 8 outputs the read update data $B_{new}$.

In addition, when a request for reading the update data $C_{new}$ is input, processing that is similar to the reading of the update data $A_{new}$ is performed. The update data $C_{old}$ is stored in the block 13a in which the update data $C_{new}$ is supposed to be stored. In this case, the time-series information $t(C_{old})$ added to the existing $C_{old}$ is different from, of the multiple pieces of time-series information added to the updated parity data $P_{new}$, the time-series information $t(C_{new})$ associated with the update data $C_{new}$. When the time-series information is a timestamp, $t(C_{old})$ has a smaller value than $t(C_{new})$. Thus, since $t(C_{old})$ added to the data to be read is smaller than $t(C_{new})$ added to the updated parity data $P_{new}$, the comparing module 6 determines that a write-related loss occurred during the writing to a unit storage area from which the data is to be read.

When a write-related loss is detected, the reading module 1 reads other update data $A_{new}$ and $B_{new}$ in the same parity group. Next, the restoring module 7 restores the update data $C_{new}$ by using the update data $A_{new}$ and $B_{new}$ and the parity data $P_{new}$. For example, the result of the bitwise XOR operation of the update data $A_{new}$ and $B_{new}$ and the parity data $P_{new}$ becomes the update data $C_{new}$. The data output module 8 then outputs the restored update data $C_{new}$.

As described above, the pieces of time-series information associated with respective other data in the same parity group are stored, and thus, during data writing for each block, the same time-series information can be added to the data and the parity data. With the same time-series information being added to the data and the parity data, when a read request is input, a write-related loss can be detected through determination as to whether or not the time-series information of the data and the time-series information of the parity data are the same.

The use of a value that increases time-sequentially, such as the value of a timestamp, as the time-series information makes it possible to determine whether a write-related data loss or a write-related parity-data loss exists. As the value that increases time-sequentially, a counter value that is counted up each time a write request is input may also be used.

Details of the embodiments will be described next. In the embodiments described below, it is assumed that, in response to access specifying a logical block on a virtual disk, writing is performed to a physical block corresponding to the logical block. The term "logical blocks" as used herein include data blocks and parity blocks. The data blocks are, on virtual disks, virtual storage areas for storing data. The parity blocks are virtual storage areas for storing parity data generated based on the data in the data blocks. The data or parity data stored in the logical blocks are in practice stored in physical blocks located in the HDDs and associated with the logical blocks.

With respect to the data and parity data to which the time-series information is added, an ECC (error correcting code) is calculated therefor and is added thereto. Thereafter, during reading of the data, error detection is performed using the ECC. Thus, the ECC ensures that processing for writing the time-series information and the data and the processing for writing the time-series information and the parity data are atomic operations (i.e., integrated processing) respectively. That is, an event in which part of the time-series information is written and a write-related data or parity-data loss occurs is detected as an error through ECC checking. In the embodiments described below, therefore, it is assumed that the ECC ensures that write processing for each block is an atomic operation to perform processing for detecting a write-related loss.

In the description below, writing data or parity data to HDDs means writing the time-series information (e.g., timestamps, counter values, and/or flags), added to the data or parity data, simultaneously with the data or parity data, unless particularly stated. Similarly, reading data or parity data from HDDs means reading the time-series information (e.g., timestamps, counter values, and/or flags), added to the data or parity data, simultaneously with the data or parity data, unless particularly stated.

[First Embodiment]

Figure 2:
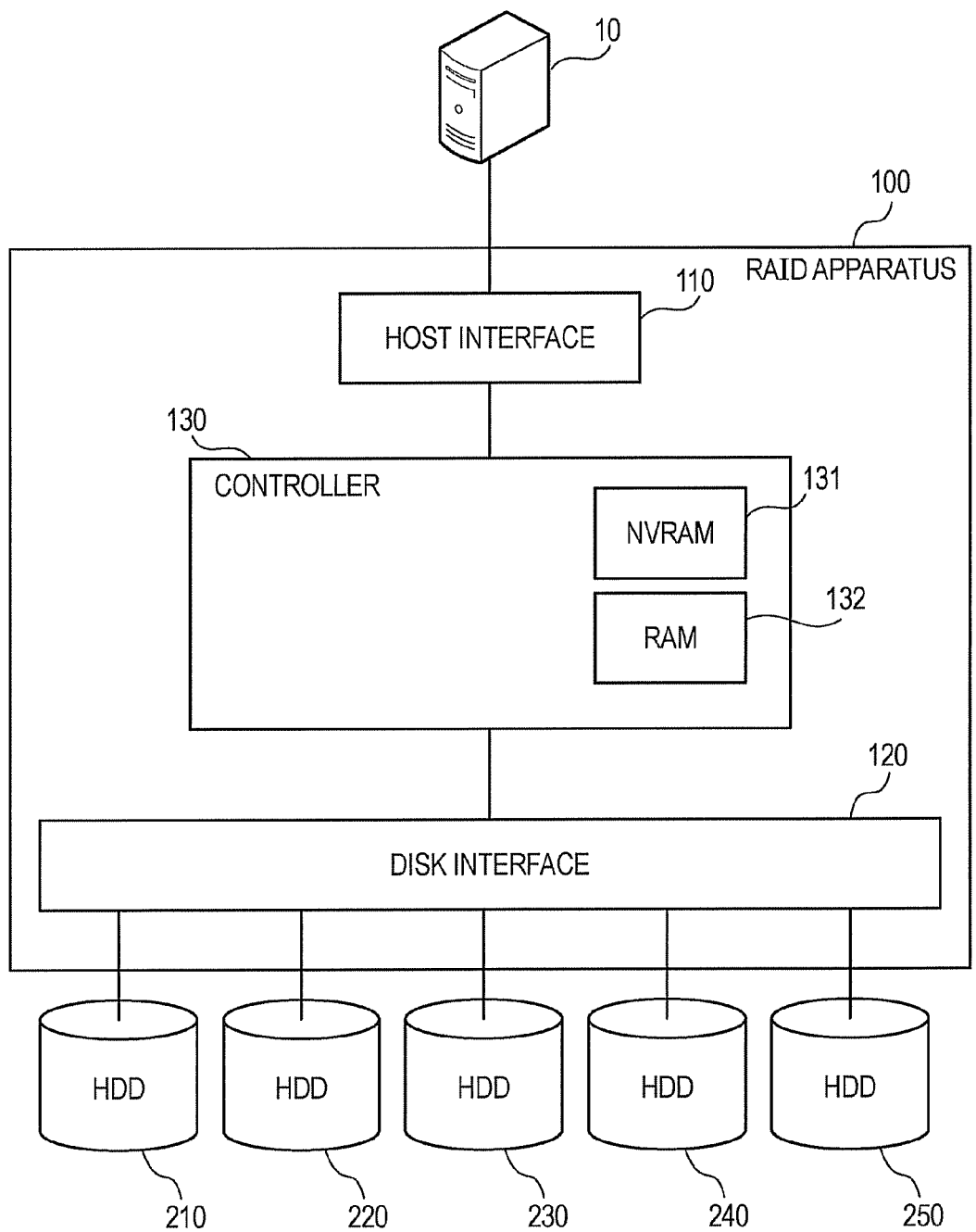
FIG. 2 is a block diagram of an example of a system configuration according to a first embodiment.

FIG. 2 is a block diagram of an example of a system configuration according to a first embodiment. A RAID apparatus 100 is connected to a host computer 10 via a host interface 110. In response to an operation input from a user or the like, the host computer 10 inputs/outputs data to/from the RAID apparatus 100. The RAID apparatus 100 is coupled to HDDs 210, 220, 230, 240, and 250 via a disk interface 120. Each of the HDDs 210, 220, 230, 240, and 250 has a data storage area, which is divided into physical blocks.

A controller 130 controls overall operations in the RAID apparatus 100. The controller 130 has an NVRAM (non-volatile random access memory) 131 and a RAM (random access memory) 132. The NVRAM 131 stores a firmware program engineered for processing to be executed by the controller 130 and management information, and so on. The NVRAM 131 may be implemented by, for example, a flash memory. The RAM 132 temporarily stores data need for processing to be executed by the controller 130.

The controller 130 receives a write request and a read request from the host computer 10 via the host interface 110. In accordance with the received request, the controller 130 inputs/outputs data to/from the HDDs 210, 220, 230, 240, and 250 via the disk interface 120.

For example, when a write request specifying a logical block is input from the host computer 10, the controller 130 determines a physical block to which data is to be written and outputs a data write instruction to the HDD to which the determined physical block belongs. When a write request specifying a logical block is input from the host computer 10, the controller 130 determines a physical block from which data is to be read and reads the data from the HDD to which the determined physical block belongs. The controller 130 has functions of the reading module 1, the parity-data generating module 2, the time-series-information generating module 3, the time-series-information adding module 4, the writing module 5, the comparing module 6, the restoring module 7, and the data output module 8 which are illustrated in FIG. 1.

The controller 130 also has a data management function based on RAID. For example, the controller 130 allows input/output data to/from the HDDs 210, 220, 230, 240, and 250 based on RAID 4 or RAID 5. In the description below, it is assumed that the controller 130 manages data in accordance with RAID 5.

Each of the HDDs 210, 220, 230, 240, and 250 is physically formatted into block units, each having a predetermined data length. The HDDs, 210, 220, 230, 240, and 250 have cache memories for disk caching. The HDDs 210, 220, 230, 240, and 250 temporarily store, in the corresponding cache memories, data to be written, and write the data, stored therein, to the disks by using subsequent free time or the like.

Figure 3:
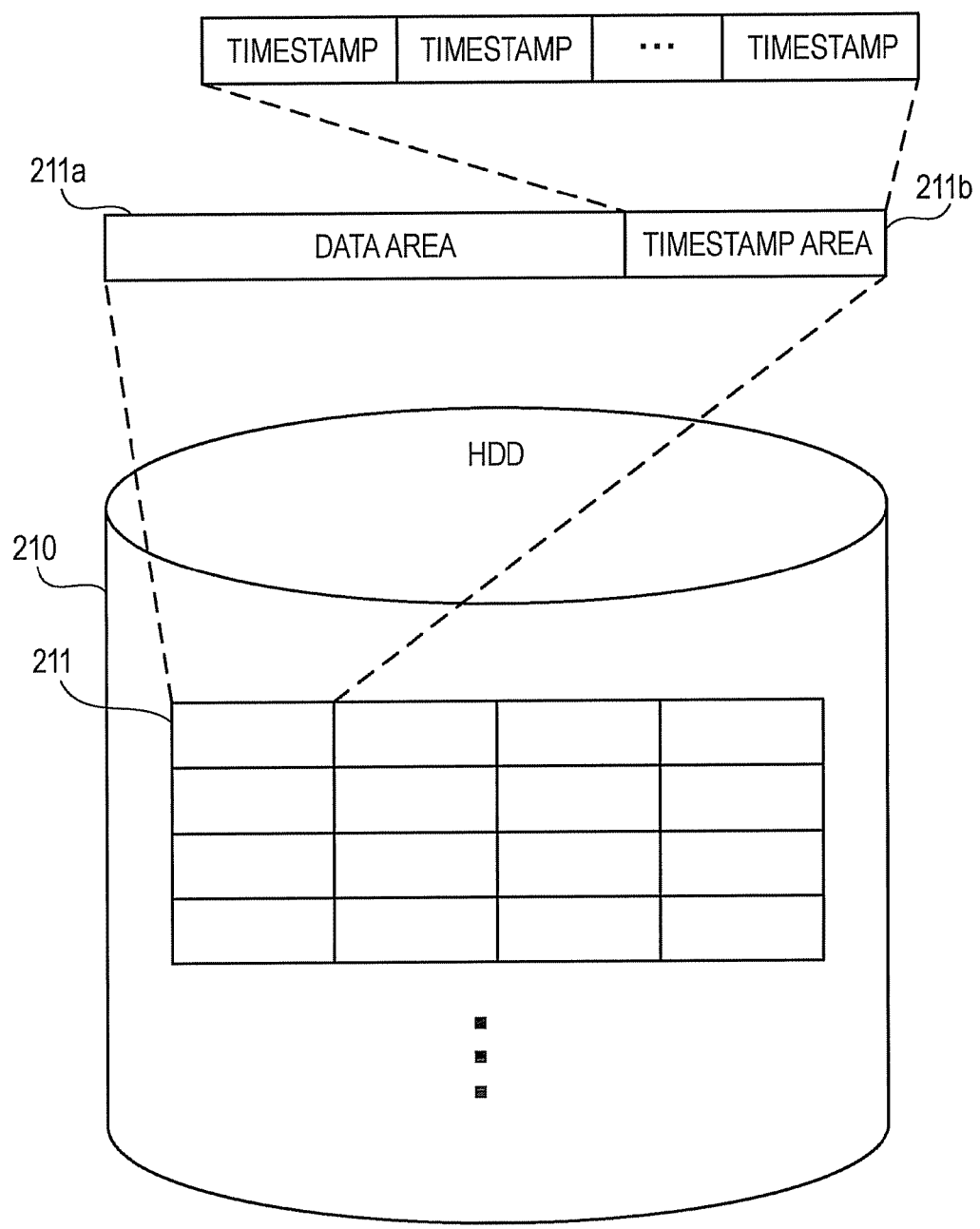
FIG. 3 illustrates a format of a HDD.

FIG. 3 illustrates a format of the HDD. The HDD 210 has a storage area in which multiple physical blocks 211 are provided. Each physical block 211 has a data area 211a and a timestamp area 211b. The data area 211a stores data of an allocated logical block. The timestamp area 211b stores multiple timestamps (a timestamp group). The timestamp area 211b has at least a storage capacity that allows writing of timestamps corresponding to the number of logical blocks in a parity group based on RAID 5.

Now, data in the HDD will now be described in detail in conjunction with an example in which the number of HDDs used in a RAID system based on RAID 5 is n (n is a natural number) and the number of physical blocks in each HDD is x (x is a natural number).

Figure 4:
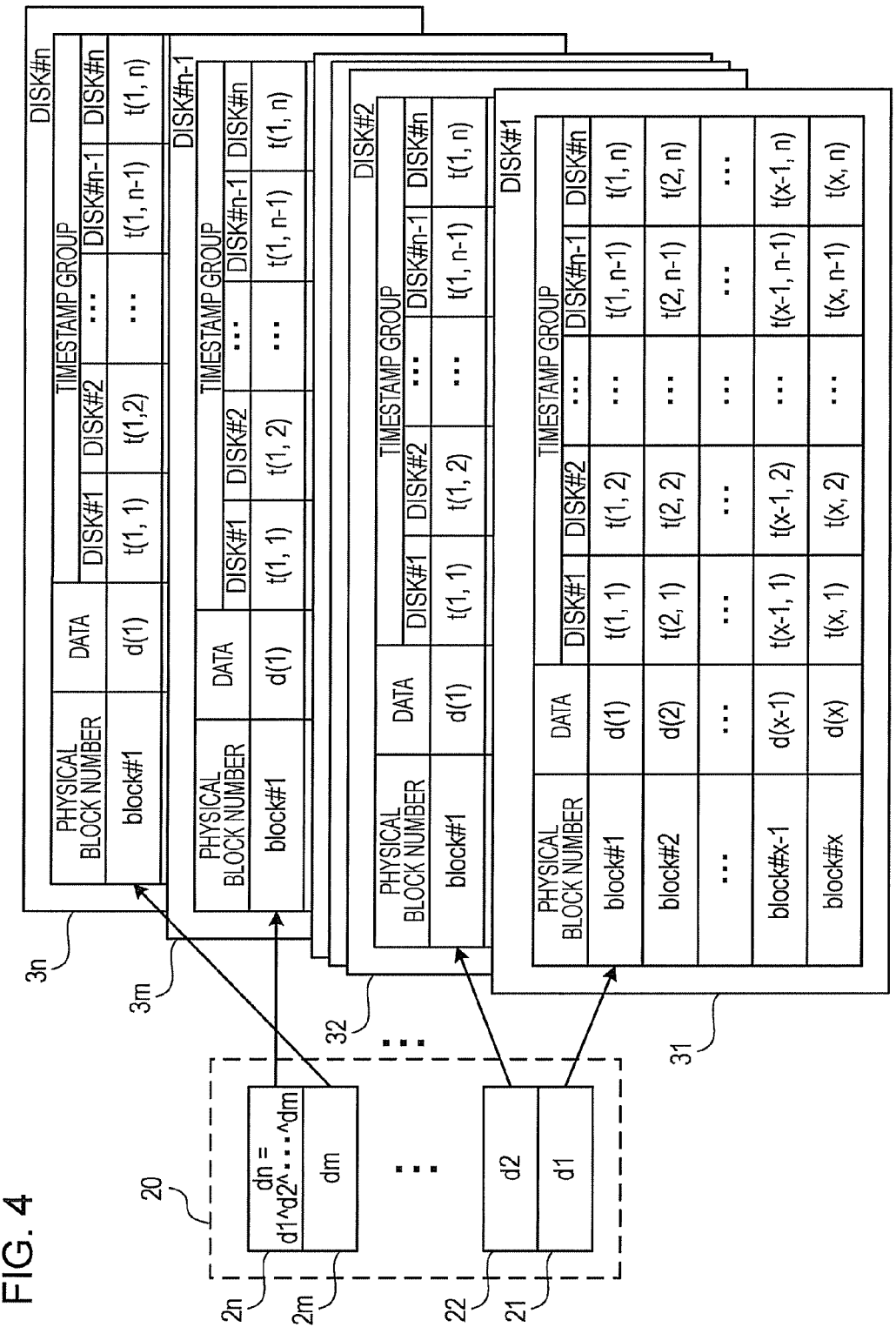
FIG. 4 illustrates relationships between logical blocks and physical blocks in a parity group in RAID 5.

FIG. 4 illustrates relationships between logical blocks and physical blocks in a parity group based on RAID 5. A parity group 20 has multiple logical blocks. The logical blocks include multiple data blocks 21, 22, . . . , and 2m and one parity block 2n.

The data blocks 21, 22, . . . , and 2m are logical storage areas for storing predetermined-data-length data, d1, d2, . . . , and dm, respectively. The parity block 2n is a logical storage area for storing parity data dn generated based on the data d1, d2, and dm in the data blocks 21, 22, . . . , and 2m. The parity data dn is data used as an error correction code for the data d1, d2, . . . , and dm. For example, the parity data dn is generated by performing an XOR operation on the data d1, d2, . . . , and dm in the data blocks 21, 22, . . . , and 2m.

The number of blocks in the parity group 20 is equal to the number of HDDs used for RAID 5. In the example of FIG. 4, n HDDs 31, 32, . . . , 3m, and 3n are provided. Thus, the parity group 20 has n−1 data blocks 21, 22, . . . , and 2m and one parity block 2n. Disk numbers (i.e., numerals that follow DISK#) of 1 to n are assigned to the HDDs 31, 32, . . . , 3m, and 3n, respectively.

Physical block numbers (i.e., numerals that follow block#) are set for x physical blocks in each of the HDDs 31, 32, ..., 3m, and, 3n. Each physical block has storage areas for data and a timestamp group. In the example of FIG. 4, data stored in a physical block with physical block number "i" (i is an integer of 1 to x) is expressed by d(i).

The storage area of the timestamp group can store timestamps corresponding to the number of HDDs. The storage area of the timestamp group is separated into timestamp areas associated with the disk numbers of the HDDs. That is, the timestamp areas are associated with the corresponding HDDs 31, 32, ..., 3m, and 3n. In the example of FIG. 4, a timestamp corresponding to disk number "j" (j is an integer of 1 to n) for physical block number "i" is expressed by t(i, j).

The data in the data blocks 21, 22, ..., and 2m and the parity group 2n in the parity group 20 are stored in the HDDs 31, 32, ..., 3m, and 3n, respectively. Thus, the controller 130 in the RAID apparatus 100 selects, from the different HDDs, physical blocks corresponding to the data blocks 21, 22, ..., and 2m and the parity block 2n. In the example of FIG. 4, a first physical block in the HDD 31 is associated with the data block 21. A first physical block in the HDD 32 is associated with the data block 22. A first physical block in the HDD 3n is associated with the data block 2m. A first physical block in the HDD 3m is associated with the parity block 2n.

In response to a request from the host computer 10, the controller 130 in the RAID apparatus 100 stores the data of a data block into a corresponding physical block. During the storage, the controller 130 adds timestamps to the data and the parity data in the data block.

Figure 5:
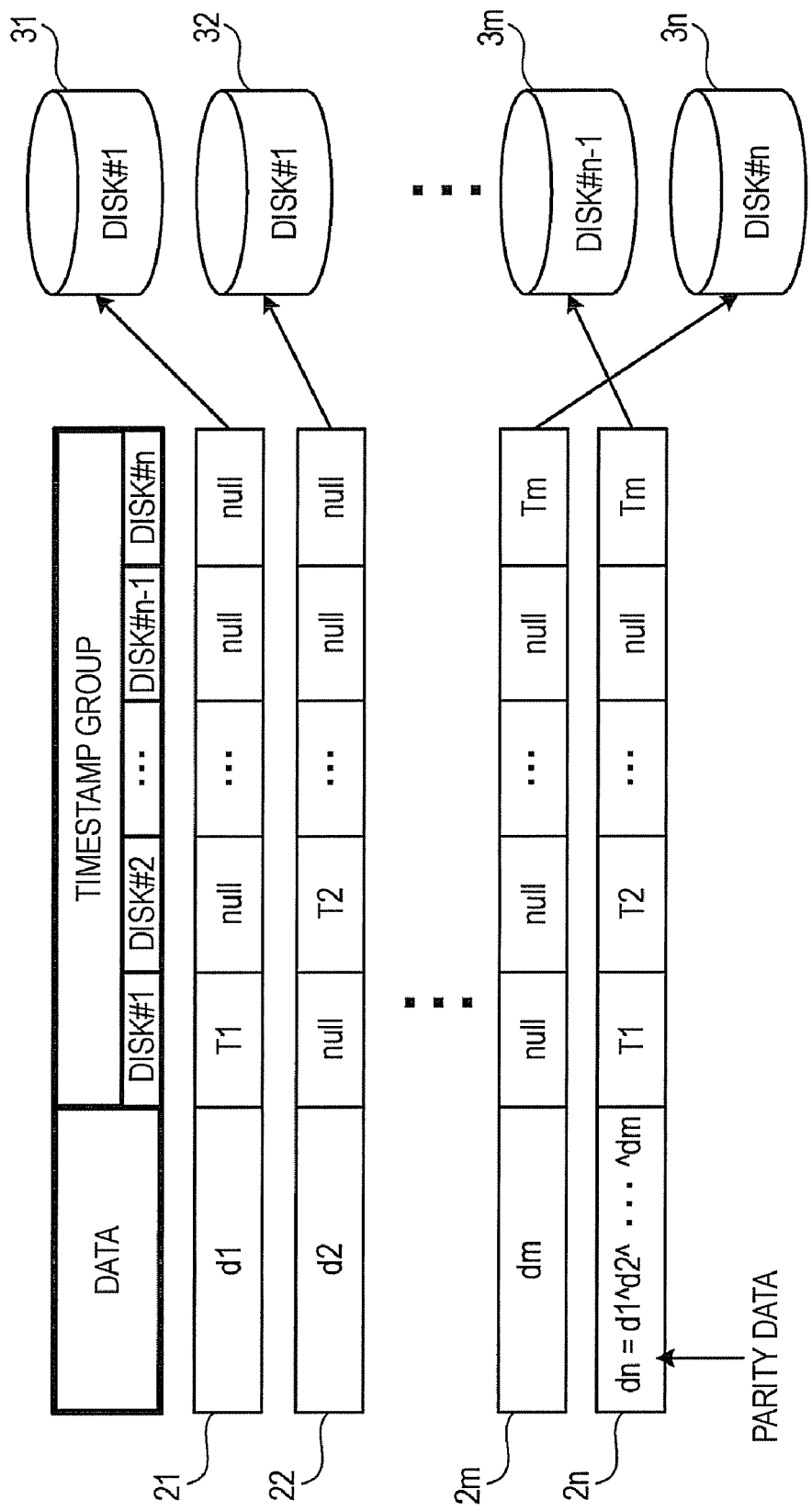
FIG. 5 illustrates an example of timestamps set for data and parity data.

FIG. 5 illustrates an example of timestamps set for data and parity data. In the example of FIG. 5, T1 indicates time at which data is written to the data block 21. T2 indicates time at which data is written to the data block 22, and Tm indicates time at which data is written to the data block 2m. With respect to the data in the data blocks 21, 22, ..., and 2m, timestamps indicating the writing times are set in portion areas corresponding to the HDDs in which the data are written. In the parity data in the parity block 2n, timestamps set during writing of other data belonging to the same parity group are set in the timestamp areas corresponding to the HDDs in which the data are written.

When the data in each data block is updated, the timestamp added to the updated data is also updated. When the data in the parity group is updated, the corresponding parity data is also updated. During the update, of the timestamps added to the parity data, the timestamp of the updated data is updated. That is, each timestamp added to the parity data has the same value as the timestamp added to the corresponding data.

Data write processing and data read processing when the number of HDDs is five, as illustrated in FIG. 2, will be described next.

Figure 6:
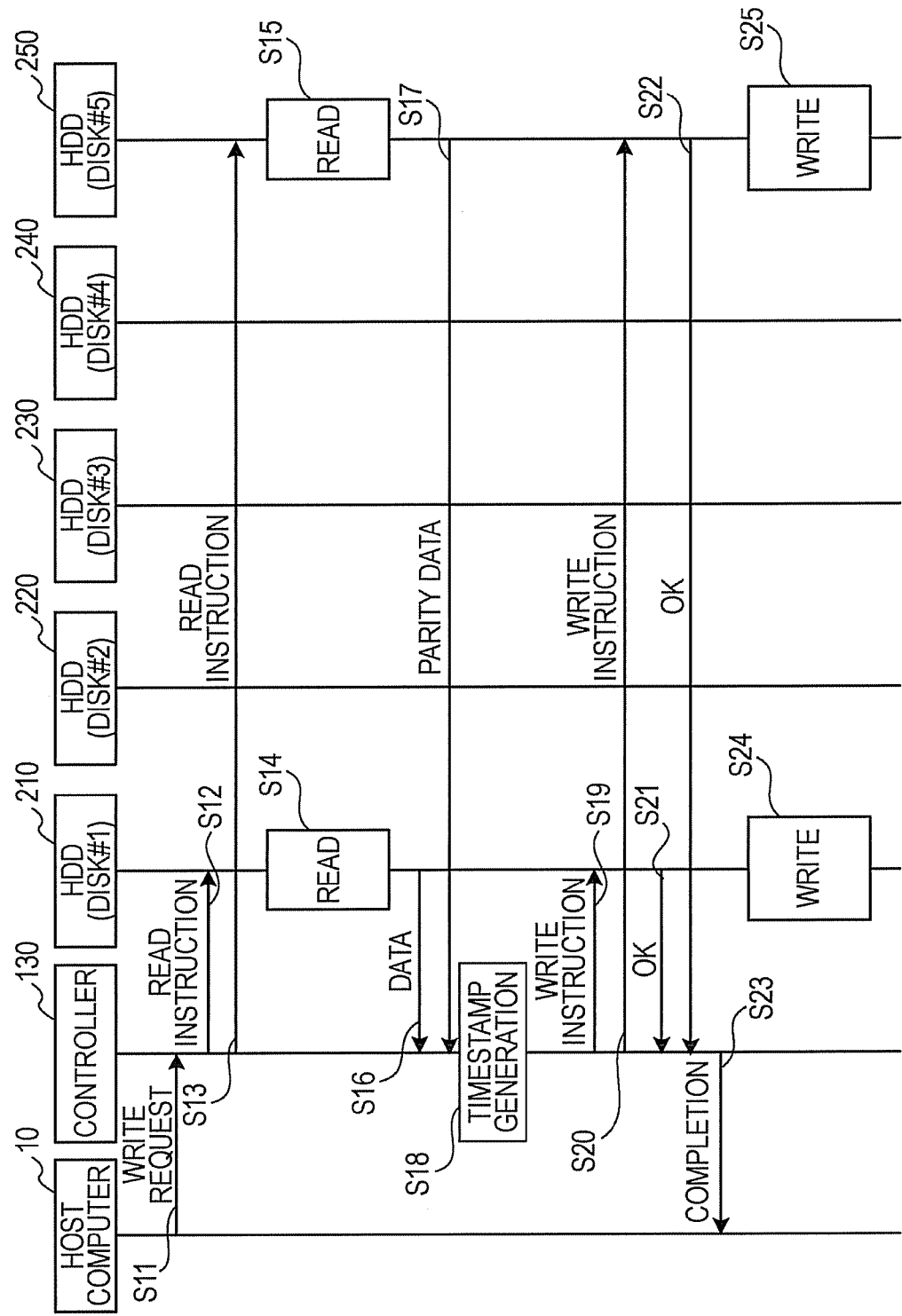
FIG. 6 is a sequence diagram of a procedure of data write processing.

FIG. 6 is a sequence diagram of a procedure of data write processing. The processing illustrated in FIG. 6 will now be described along with step numbers.

In step S11, in response to an operation input from a user or the like, the host computer 10 transmits, to the RAID apparatus 100, a read request specifying the contents of data to be updated and a data block to which the data belongs. The write request is input to the controller 130 via the host interface 110 in the RAID apparatus 100. It is assumed, in this example, that the data block to which the data is to be written is associated with a physical block in the HDD 210. It is also assumed that a physical block in the HDD 250 is associated with a parity block in the parity group to which the data block to which the data is to be written belongs.

In step S12, upon receiving the write request, the controller 130 outputs, to the HDD 210, an instruction for reading data in the physical block for the corresponding data block to which the data is to be written.

In step S13, simultaneously with outputting the read instruction to the HDD 210, the controller 130 outputs, to the HDD 250, an instruction for reading data in the physical block for the corresponding parity block.

In step S14, in response to the read instruction, the HDD 210 reads the data in the specified physical block. During the reading, the HDD 210 also reads the timestamps added to the data.

In step S15, in response to the read instruction, the HDD 250 reads the parity data in the specified physical block. During the reading, the HDD 250 also reads the timestamps added to the parity data.

In step S16, the HDD 210 sends the timestamped data to the controller 130.

In step S17, the HDD 250 sends the timestamped parity data to the controller 130.

In step S18, the controller 130 generates a timestamp. Specifically, the controller 130 obtains current time from an internal-clock function of the RAID apparatus 100 and uses the obtained time as a timestamp.

In step S19, in accordance with the write request, the controller 130 updates the contents of the data read from the HDD 210. In addition, the controller 130 adds the timestamp, generated in step S18, to the updated data. The controller 130 then sends, to the HDD 210, an instruction for writing the updated data to the physical block for the corresponding data block to which writing is to be performed.

In step S20, on the basis of the update contents of the data read from the HDD 210, the controller 130 updates the parity data read from the HDD 250. In addition, the controller 130 adds the timestamp, generated in step S18, to the updated parity data. The controller 130 then sends, to the HDD 250, an instruction for writing the updated parity data to the physical block for the corresponding parity block.

In step S21, the HDD 210 stores the timestamped data, included in the write instruction, into the cache memory and sends an "OK" response to the controller 130.

In step S22, the HDD 250 stores the timestamped parity data, included in the write instruction, into the cache memory, and sends an "OK" response indicating that the writing was executed to the controller 130.

In step S23, upon receiving the "OK" responses from the HDDs 210 and 250, the controller 130 transmits a write completion response to the host computer 10.

In step S24, the HDD 210 writes the timestamped data, stored in the cache memory, to the physical block at a predetermined timing after sending the "OK" response.

In step S25, the HDD 210 writes the timestamped parity data, stored in the cache memory, to the physical block at a predetermined timing after sending the "OK" response.

As described above, during writing of the data, the same timestamp is written to the physical block in which the data is stored and the physical block in which the parity data of the data is stored.

Data read processing will be described next.

Figure 7:
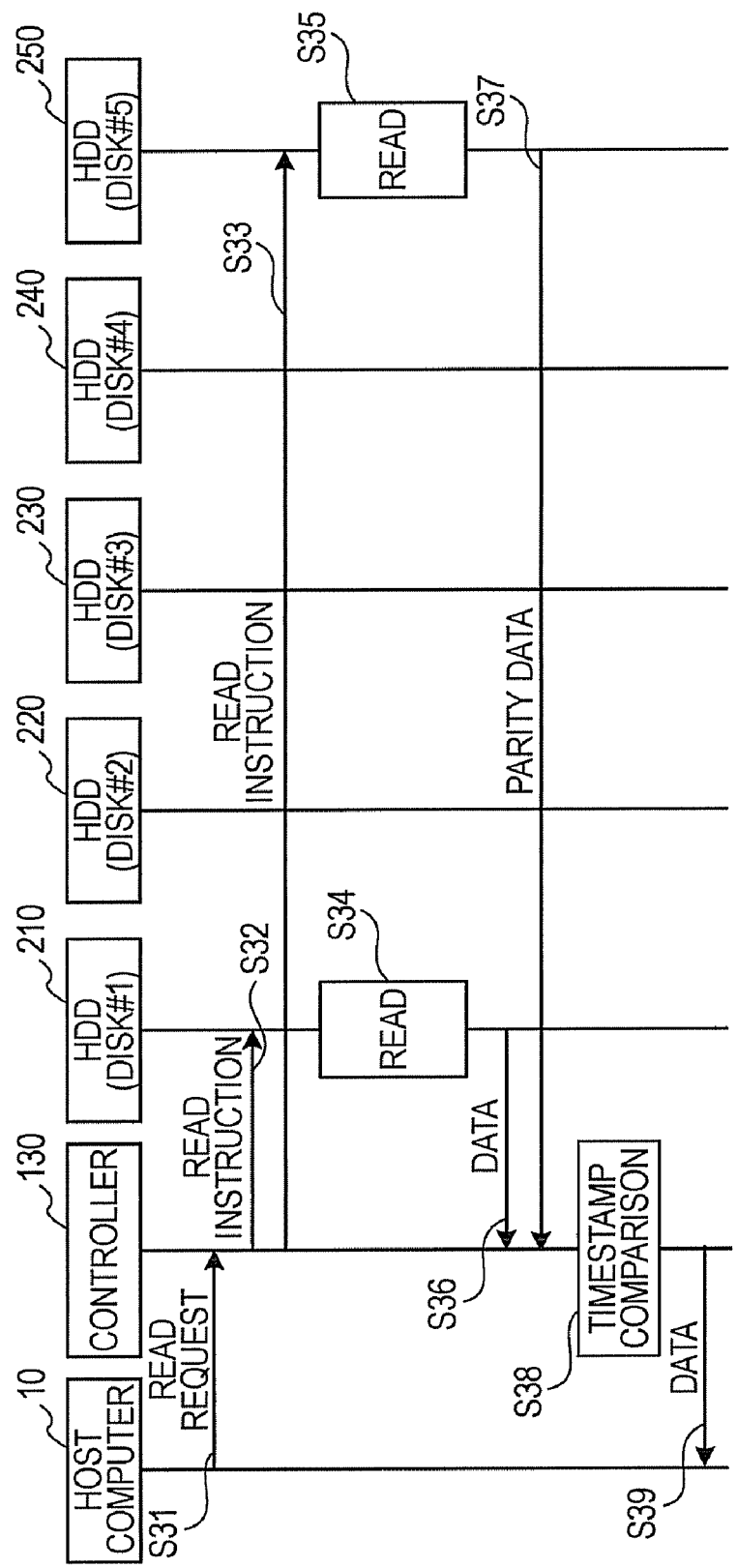
FIG. 7 is a sequence diagram of a procedure of data read processing.

FIG. 7 is a sequence diagram of a procedure of data read processing. The processing illustrated in FIG. 7 will now be described along with step numbers.

In step S31, in response to an operation input from a user or the like, the host computer 10 transmits, to the RAID apparatus 100, a read request specifying a data block to which data to be read belongs. The read request is input to the controller 130 via the host interface 110 in the RAID apparatus 100. It is assumed, in this example, that the data block from which the data is to be read is associated with a physical block in the HDD 210. It is also assumed that a physical block in the HDD 250 is associated with a parity block in a parity group to which the data block from which the data is to be read belongs.

In step S32, upon receiving the read request, the controller 130 outputs, to the HDD 210, an instruction for reading data in the physical block for the corresponding data block from which the data is to be read.

In step S33, simultaneously with outputting the read instruction to the HDD 210, the controller 130 outputs, to the HDD 250, an instruction for reading parity data in the physical block for the corresponding parity block.

In step S34, in response to the read instruction, the HDD 210 reads the data in the specified physical block. During the reading, the HDD 210 also reads the timestamps added to the data.

In step S35, in response to the read instruction, the HDD 250 reads the parity data in the specified physical block. During the reading, the HDD 250 also reads the timestamps added to the parity data.

In step S36, the HDD 210 sends the timestamped data to the controller 130.

In step S37, the HDD 250 sends the timestamped parity data to the controller 130.

In step S38, the controller 130 compares the timestamps. Specifically, the controller 130 extracts, from the timestamps added to the parity data, a timestamp corresponding to the data to be read. The controller 130 then compares the extracted timestamp with the timestamp added to the data to be read. When the values of the timestamps match each other, the controller 130 determines that no write-related loss occurred during the writing of the data.

When no write-related loss exists, in step S39, the controller 130 transmits the data, read from the HDD 210, to the host computer 10.

As described above, during writing of data, the same timestamp is added to both the data to be written and corresponding parity data, and during reading, the timestamps thereof are compared with each other, so that a write-related data loss can be detected. That is, a write-related loss in the data can be detected during reading of the data.

When a write-related loss can be detected during reading of data, there is no need to perform write-related-loss detection processing during writing of the data. That is, in the related art, there is a need to detect a write-related loss during writing of data. Thus, immediately after writing of data, processing for reading the data is executed to check that no write-related loss occurs (i.e., to check that desired data is written). As a result, in the related art, immediately after the data is written, processing for reading the data needs to be additionally performed. However, in the present embodiment, immediately after data is written, the data does not have been read, as illustrated in FIG. 6.

In addition, in the related art, since the data read processing is performed immediately after data writing, disk-cache processing cannot be performed. In contrast, in the present embodiment, write-related-loss detection processing can be performed during data reading. Consequently, disk-cache processing can be performed during the data writing, thereby making it possible to reduce a response time for a write request.

In RAID 5, contiguous logical blocks can be stored on the same HDD.

Figure 8:
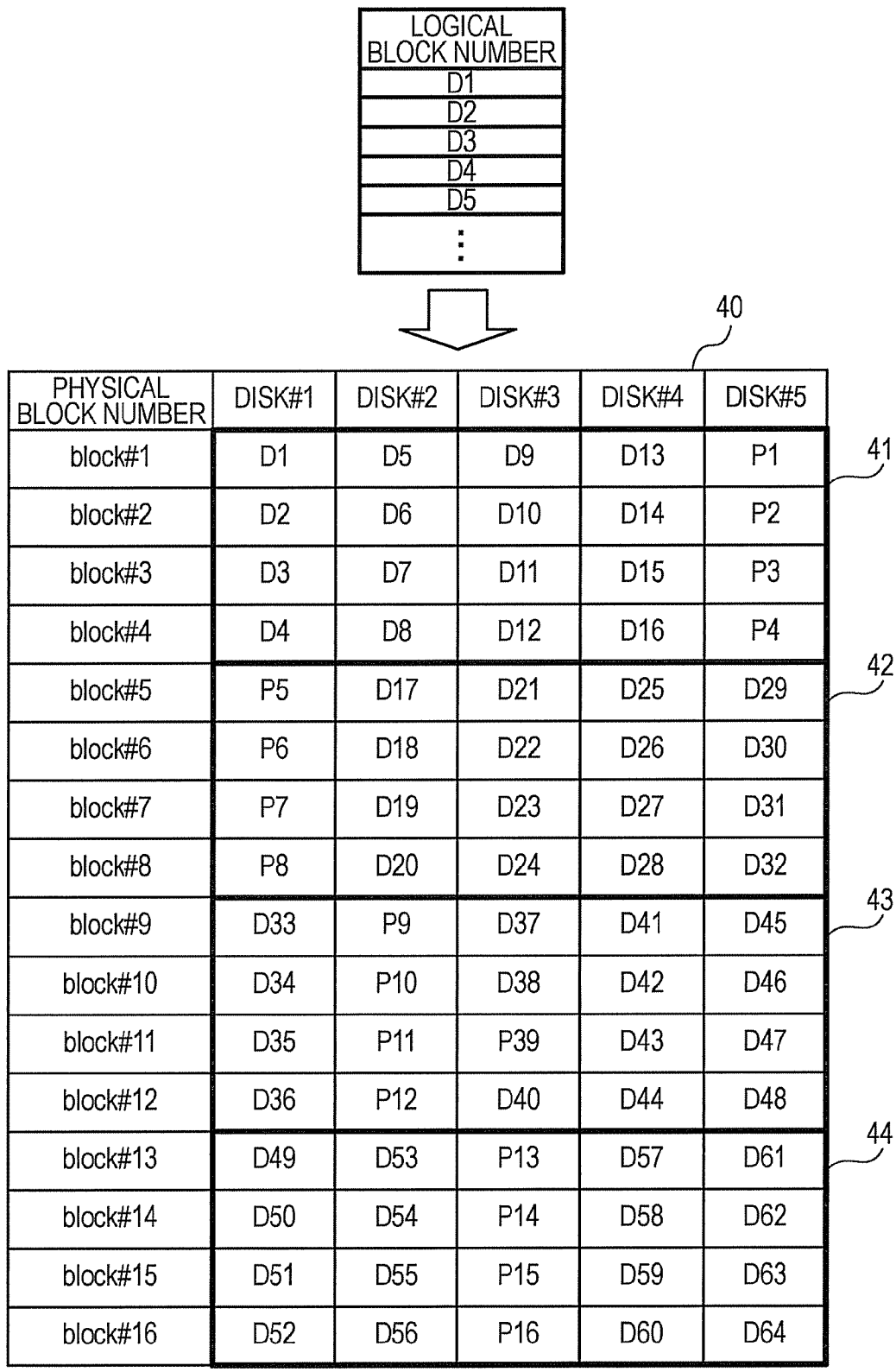
FIG. 8 illustrates an example of assignment of logical blocks in RAID 5 to HDDs.

FIG. 8 illustrates an example of assignment of logical blocks in RAID 5 to HDDs. In FIG. 8, the logical block number of each data block in which data is stored is expressed by a combination of character "D" and a numeral. The logical block number of each parity block in which parity data is stored is expressed by a combination of character "P" and a numeral. In an assignment table 40, the logical block number of a logical block assigned to a physical block identified by a disk number and a block number is set at a position where the disk number and the block number cross each other.

In the example of FIG. 8, the number of bocks in a parity group is five and the number of blocks in a chunk is four. Blocks horizontally arranged in the assignment table 40, for example, logical block numbers D1, D5, D9, D13, and P1, belong to one parity group. Parity data in the parity block P1 is the XOR of data of the logical blocks D1, D5, D9, and D13.

When the number of blocks in a chunk is four in this manner, four contiguous blocks in the logical blocks are stored in the same HDD. That is, each collection of four blocks provides a chunk. The chunks, such as chunks of D1 to D16 and P1 to P4, that are each grouped so as to correspond to the number of parity groups constitute each of stripes 41 to 44. In FIG. 8, the stripes 41 to 44 are surrounded by thick-line frames. Physical blocks corresponding to parity groups contained in each of the stripes 41 to 44 belong to the same HDD.

When the logical blocks are assigned for each chunk in such a manner, a method for performing access for each physical block and a method for performing access for each stripe are available as processing for accessing the HDDs. Accordingly, a method for controlling the timestamps is also described below in two different cases, i.e., a case of accessing data for each physical block and a case of accessing data for each stripe.

A processing function of the controller 130 in the RAID apparatus 100 will first be described in detail.

Figure 9:
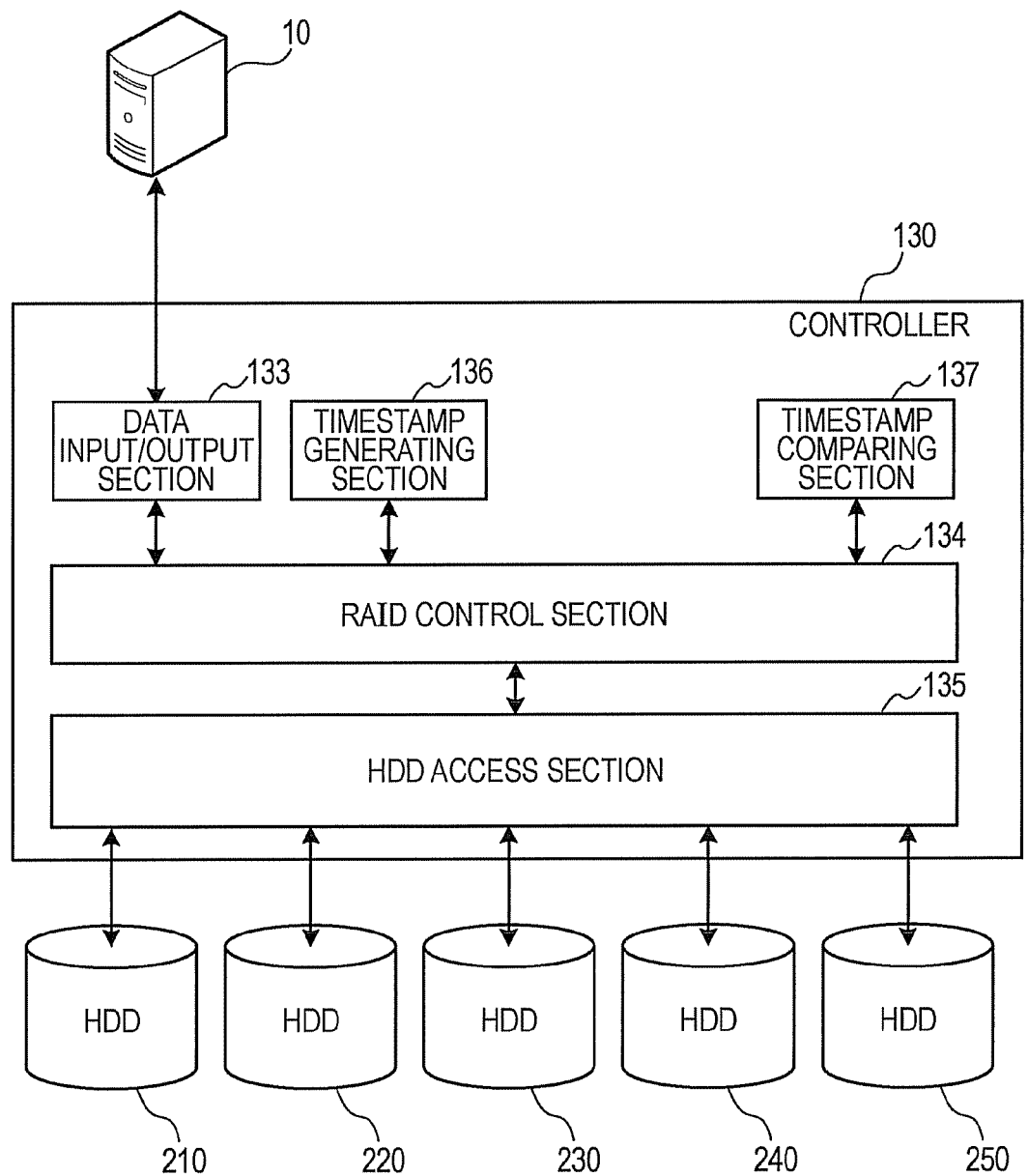
FIG. 9 is a block diagram of the function of a controller.

FIG. 9 is a block diagram of the function of the controller 130. The controller 130 includes a data input/output section 133, a RAID control section 134, a HDD access section 135, a timestamp generating section 136, and a timestamp comparing section 137.

The data input/output section 133 receives an access request from the host computer 10. As the access request, a write request and a read request are available. The data input/output section 133 transfers the received access request to the RAID control section 134. Thereafter, the data input/output section 133 receives an access-request result from the RAID control section 134 and transmits the result to the host computer 10.

In response to the access request, the RAID control section 134 performs access control on the HDDs 210, 220, 230, 240, and 250, which use a RAID technology. In the present embodiment, it is assumed that the RAID control section 134 performs access control based on RAID 5. In order to perform access control based on RAID 5, the RAID control section 134 manages logical-block and physical-block association relationships as illustrated in FIG. 8. The RAID control section 134 identifies a physical block corresponding to a logical block specified by the access request and a HDD having the physical block, and outputs, to the HDD access section 135, an access instruction corresponding to the access request.

When the access request is a write request, the RAID control section 134 obtains a timestamp from the timestamp generating section 136. The RAID control section 134 then adds the obtained timestamp to data to be written and updated parity data. The RAID control section 134 then issues an instruction for writing the timestamped data and the timestamped parity data to the HDDs.

When the access request is a read request, the RAID control section 134 extracts a timestamp added to read data and also extracts, from timestamps added to the parity data in the parity group to which the read data belongs, a timestamp corresponding to the read data. The RAID control section 134 then transfers the two extracted timestamps to the timestamp comparing section 137. The RAID control section 134 receives a timestamp comparison result from the timestamp comparing section 137, and determines the presence/absence of a write-related loss on the basis of the comparison result. When no write-related loss exists, the RAID control section 134 transfers the read data to the data input/output section 133 as a response to the read request.

On the other hand, upon determining that a write-related loss exists, the RAID control section 134 performs processing for restoring the data. The RAID control section 134 then transfers the restored data to the data input/output section 133 as a response to the read request.

In accordance with an instruction from the RAID control section 134, the HDD access section 135 issues a data write instruction or data read instruction for each physical block to a corresponding one of the HDDs 210, 220, 230, 240, and 250. When the HDD access section 135 issues a data write instruction to the HDD and receives an "OK" response from the HDD to which data is to be written, the HDD access section 135 transfers the "OK" response to the RAID control section 134. When the HDD access section 135 issues a data read instruction to the HDD, the HDD access section 135 receives data read from the HDD and transfers the read data to the RAID control section 134.

For writing data or parity data to the HDDs 210, 220, 230, 240, and 250, the HDD access section 135 generates an ECC for timestamped data or parity data and adds the ECC to the data or parity data. For reading data or parity data from the HDDs 210, 220, 230, 240, and 250, the HDD access section 135 performs error detection processing using the ECC.

The timestamp generating section 136 generates a timestamp in response to a request from the RAID control section 134. More specifically, the timestamp generating section 136 obtains time indicated by the internal clock in the RAID apparatus 100 and uses the time as a timestamp.

The timestamp comparing section 137 compares timestamps in response to a request from the RAID control section 134.

The write processing and read processing performed by the controller 130 will be described below in detail with respect to two different cases, i.e., a case in which processing is performed for each block and a case in which processing is performed for each stripe. A description of address control and ECC control for data writing and reading is omitted in the description below.

First, write processing for each block will be described.

Figure 10:
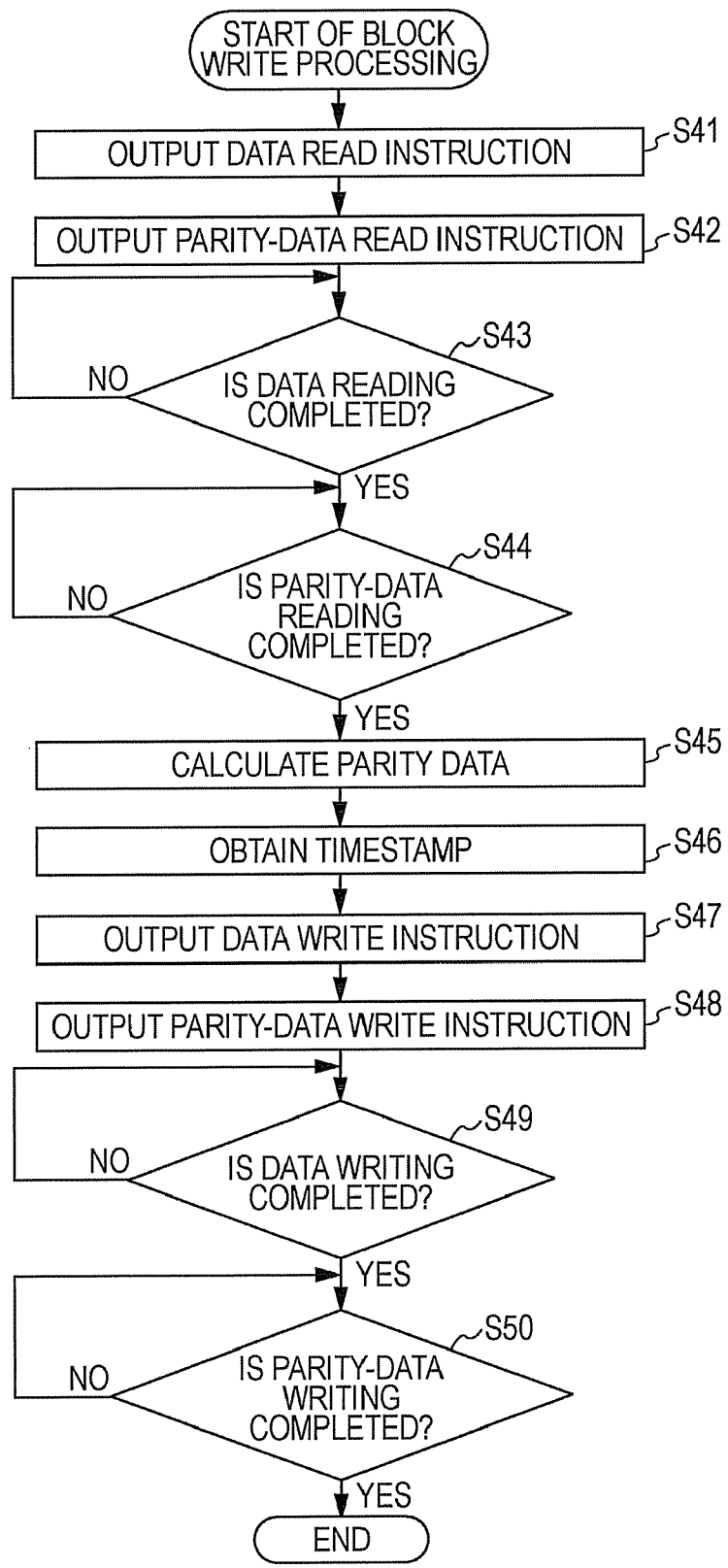
FIG. 10 is a flowchart of a procedure of block write processing.

FIG. 10 is a flowchart of a procedure of block write processing. The processing illustrated in FIG. 10 will now be described along with step numbers. This processing is executed when a request for writing data for each block is input from the host computer 10. The data write request contains data (update data) to be written and the logical block number of a data block to which the update data belongs.

In step S41, the RAID control section 134 outputs, to the HDD access section 135, an instruction for reading data in a physical block to which the data is to be written, so as to correspond to the write request. Specifically, the RAID control section 134 first identifies a physical block corresponding to the logical block number specified by the write request. The RAID control section 134 then determines the disk number of a HDD to which the identified physical block belongs and the physical block number of the identified physical block. This determination is made based on the assignment relationships illustrated in FIG. 8. The RAID control section 134 then specifies the physical block to which the data is to be written and outputs, to the HDD access section 135, an instruction for reading data in the specified physical block. The HDD access section 135 then reads the data in the specified physical block.

In step S42, the RAID control section 134 outputs, to the HDD access section 135, an instruction for reading parity data in a physical block for a corresponding parity block. Specifically, the RAID control section 134 specifies a physical block for a corresponding parity block in the same parity group as that of the logical block with logical block number specified by the write request. The RAID control section 134 then determines the disk number of a HDD to which the identified physical block belongs and the physical block number of the identified physical block. This determination is made based on the assignment relationships illustrated in FIG. 8. The RAID control section 134 then specifies the physical block for the corresponding parity block and outputs, to the HDD access section 135, an instruction for reading parity data in the specified physical block. In response to the read instruction, the HDD access section 135 reads the parity data in the specified physical block.

In step S43, the RAID control section 134 determines whether or not the data reading is completed. Specifically, upon receiving the data from the HDD for which the data read instruction was output, the RAID control section 134 determines that the data reading is completed. When the data reading is completed, the process proceeds to step S44. When the data reading is not completed, the processing in step S43 is repeated and the RAID control section 134 enters a state for waiting for the data reading.

In step S44, the RAID control section 134 determines whether or not the parity-data reading is completed. Specifically, upon receiving the parity data from the HDD for which the parity-data read instruction was output, the RAID control section 134 determines that the parity-data reading is completed. When the parity-data reading is completed, the process proceeds to step S45. When the parity-data reading is not completed, the processing in step S44 is repeated and the RAID control section 134 enters a state for waiting for the parity-data reading.

When the data reading and the parity-data reading are completed, the RAID control section 134 creates a data-to-be-processed table in the RAM 132 and stores the read data and parity data in the data-to-be-processed table.

In step S45, the RAID control section 134 calculates parity data. Specifically, the RAID control section 134 performs an XOR operation on the parity data read from the HDD, the data read from the HDD, and the update data. The result of the operation becomes updated parity data.

In step S46, the timestamp generating section 136 obtains a timestamp. Specifically, the RAID control section 134 issues a timestamp generation request to the timestamp generating section 136. In response to the timestamp generation request, the timestamp generating section 136 generates a timestamp. The generated timestamp is sent from the timestamp generating section 136 to the RAID control section 134.

In step S47, the RAID control section 134 outputs a data-block write instruction to the HDD access section 135. Specifically, the RAID control section 134 adds the timestamp to the update data specified by the write request. The RAID control section 134 then specifies the disk number and the physical block number of the physical block for the corresponding data block to which the update data belongs, and outputs, to the HDD access section 135, an instruction for writing the timestamped update data. In response to the write instruction, the HDD access section 135 writes the timestamped update data to the HDD corresponding to the disk number.

In step S48, the RAID control section 134 outputs a parity-data write instruction to the HDD access section 135. Specifically, the RAID control section 134 adds the timestamp to the parity data in the same parity group as that of the update data specified by the write request. The added timestamp is set, in the parity data, in a timestamp area associated with the HDD in which the update data is stored. The RAID control section 134 then specifies the disk number and the physical block number of the physical block for the corresponding parity block, and outputs, to the HDD access section 135, an instruction for writing the timestamped parity data. In response to the write instruction, the HDD access section 135 writes the timestamped parity data to the HDD corresponding to the disk number.

In step S49, the RAID control section 134 determines whether or not the data writing is completed. Specifically, upon receiving an "OK" response from the HDD for which the data write instruction was output, the RAID control section 134 determines that the data writing is completed. When the data writing is completed, the process proceeds to step S50. When the data writing is not completed, the processing in step S49 is repeated and the RAID control section 134 enters a state for waiting for the data writing.

In step S50, the RAID control section 134 determines whether or not the parity-data writing is completed. Specifically, upon receiving an "OK" response from the HDD for which the parity-data write instruction was output, the RAID control section 134 determines that the parity-data writing is completed. When the parity-data writing is completed, the block write processing ends. On the other hand, when the parity-data writing is not completed, the processing in step S50 is repeated and the RAID control section 134 enters a state for waiting for the parity-data writing.

As described above, in response to the block-wise data-write request from the host computer 10, the controller 130 updates the data in the physical blocks for the corresponding data block and the corresponding parity block.

With reference to FIGS. 11 and 12, update of a data block, a parity block, and a timestamp will now be described in conjunction with an example in which a write request for updating data in the logical block with logical block number "D1" is output.

When a request for writing data to the data block with logical block number "D1" is input from the host computer 10, data in a physical block for the corresponding data block and parity data in a corresponding parity block are read from the HDDs (steps S41 to S44 in FIG. 10). Referring to FIG. 8, the physical block corresponding to logical block number "D1" is a physical block that is located in the HDD 210 with disk number "DISK#1" and that has physical block number "block#1". Thus, data in the physical block with physical block number "block#1" is read.

A parity block that belongs to the same parity group as that of the logical block with logical block number "D1" is a parity block with logical block number "P1". A physical block corresponding to logical block number "P1" is a physical block that is contained in the HDD 250 with disk number "DISK#5" and that has physical block number "block#1". Thus, parity data in the physical block "block#1" in the HDD 250 is read.

The read data and parity data are set in the data-to-be-processed table.

FIG. 11 is an example of the data structure of the data-to-be-processed table. After step S44 in FIG. 10 is finished, the RAID control section 134 generates a data-to-be-processed table 132a in the RAM 132. The data-to-be-processed table 132a has a logical-block-number column, a disk-number column, a physical-block-number column, a data column, and a timestamp column.

In the logical-block-number column, a logical block number indicating a logical block of read data or parity data is set.

In the disk-number column, the disk number of a HDD to which the physical block corresponding to the logical block indicated by the logical block number belongs is set.

In the physical-block-number column, the physical block number of a physical block corresponding to the logical block indicated by the logical block number is set.

In the data column, the read data or parity data is set.

In the timestamp column, timestamp(s) added to the read data or parity data is set. The timestamps are associated with corresponding HDDs 210, 220, 230, 240, and 250.

In the example of FIG. 11, the logical block with logical block number "D1" is a data block. A timestamp t11 corresponding to the HDD 210 with disk number "DISK#1" is set for the data d1 in the data block with logical block number "D1". The logical block with logical block number "P1" is a parity block. Timestamps t21, t22, t23, and t24 corresponding to data in the data blocks in the same parity group are set for parity data p1 in the parity block.

Such data in the data-to-be-processed table 132a are updated based on update data indicated by the write request.

FIG. 12 illustrates an example of the data-to-be-processed table after the data are updated. As illustrated in FIG. 12, in the data-to-be-processed table 132a after the data are updated, the data d1 in the logical block D1 is changed to update data d1_1. The parity data p1 in the logical block with logical block number "P1" is changed to updated parity data p1_1. The updated parity data p1_1 is calculated by:

$$p1\_1 = p1 \char`\^ d1 \char`\^ d1\_1,$$

where "^" represents an XOR operator (the same applies to equations below).

In the data-to-be-processed table 132a after the data are updated, the timestamp t11 corresponding to the disk "DISK#1" for the data d1_1 in the logical block "D1" is changed to a timestamp t11_1 added during the update. Similarly, the timestamp t21 corresponding to the disk "DISK#5" for the parity data p1_1 in the logical block with logical block number "P1" is changed to a timestamp t11_1 added during the update.

The timestamped data and parity data in the data-to-be-processed table 132a after the data are updated are written back to their original physical blocks. As a result, update of the parity data and update of the timestamps added to the data and the parity data are performed simultaneously with the update of the data. That is, the update time t11_1 is redundantly stored in the HDD in which the data in the data block is stored and the HDD in which the parity data in the parity block is stored.

Write processing for each stripe will be described next.

Figure 13:
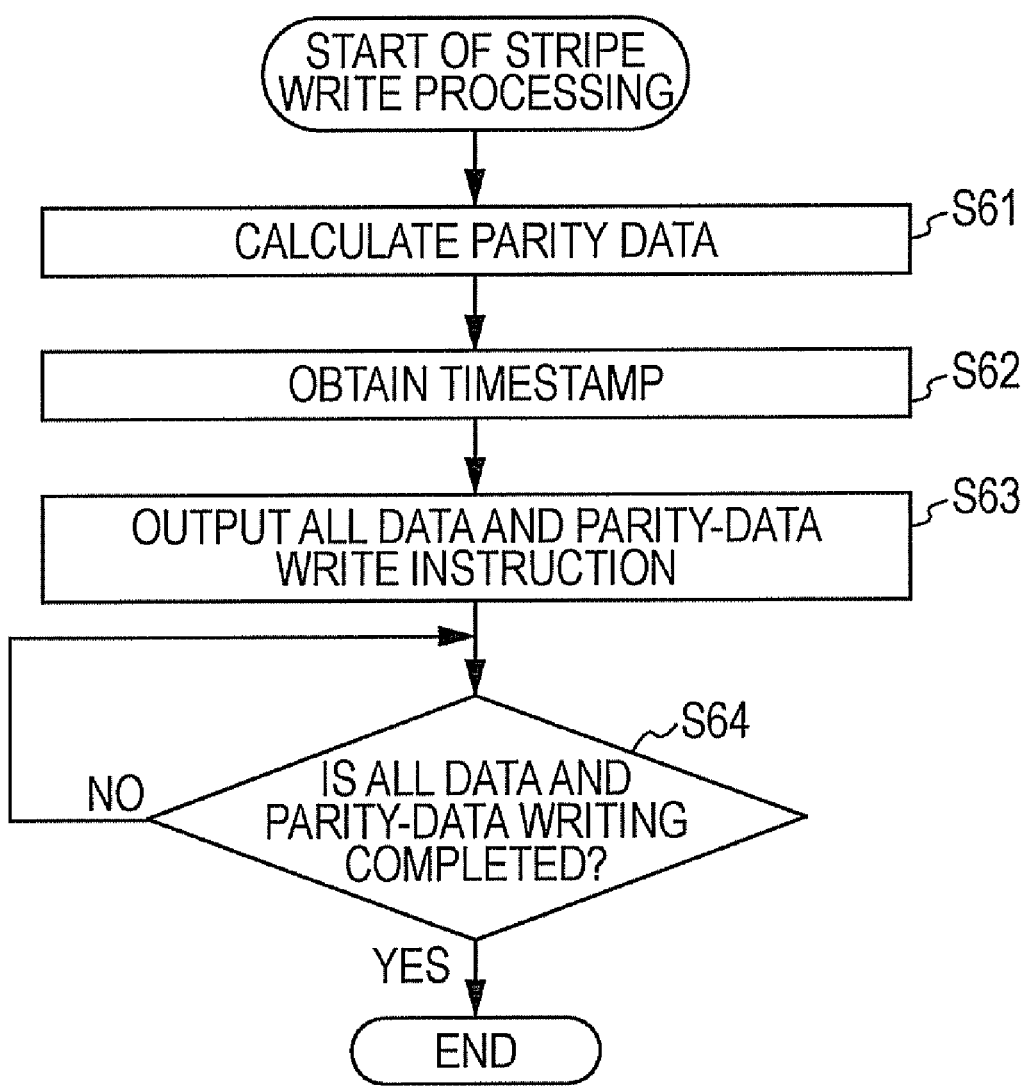
FIG. 13 is a flowchart of a procedure of stripe write processing.

FIG. 13 is a flowchart of a procedure of stripe write processing. The processing illustrated in FIG. 13 will now be described along with step numbers. This processing is executed when a request for writing data for each stripe is input from the host computer 10. The data write request contains data (update data) to be written and a specified stripe to which the update data belongs (i.e., a specified range of data blocks by using logical block numbers).

In step S61, the RAID control section 134 calculates parity data. Specifically, the RAID control section 134 divides data in the stripe into parity groups in accordance with logical blocks to which individual data belong. The RAID control section 134 further performs an XOR operation on the data in the data blocks belonging to each of the parity groups and generates parity data for each parity group. The RAID control section 134 then registers a logical block containing the generated parity data as a parity block for the same parity group as that of the data blocks from which the parity data was generated.

In step S62, the RAID control section 134 obtains a timestamp. Details of the timestamp obtaining processing are analogous to those of the processing in step S46 in FIG. 10.

In step S63, the RAID control section 134 outputs, to the HDD access section 135, an instruction for writing data and parity data to all logical blocks in the stripe. Specifically, the RAID control section 134 adds the timestamp to update data for each of the blocks in the stripe specified by the write request. The RAID control section 134 adds, to each of the parity blocks in the stripe specified by the write request, the timestamp corresponding to the update data in the same parity group. The RAID control section 134 outputs, to the HDD access section 135, instructions for writing the multiple pieces of data and the multiple pieces of parity data. The instruction for writing the update data specifies the disk numbers and the physical block numbers of physical blocks corresponding to the data blocks to which the update data belong. The instruction for writing the parity data specifies the disk numbers and the physical block numbers of physical blocks corresponding to parity blocks to which the parity data belong. In response to the write instructions, the HDD access section 135 writes the timestamped update data and the timestamped parity data to the corresponding specified physical blocks in the specified HDDs.

In step S64, the RAID control section 134 determines whether or not all the data and parity-data writing is completed. Specifically, upon receiving "OK" responses from all HDDs, the RAID control section 134 determines that the all data and parity-data writing is completed. When the all data and parity-data writing is completed, the RAID control section 134 ends the stripe write processing. When writing to at least one HDD is not completed, the processing in step S64 is repeated and the RAID control section 134 enters a state for waiting for the writing.

As described above, in response to the stripe-wise datawrite request from the host computer 10, the data in the physical blocks corresponding to the data blocks and the parity blocks are updated.

With reference to FIG. 14, update of the timestamps will now be described in conjunction with an example in which a stripe write request for logical block numbers D1 to D16 is input.

When a stripe write request for logical block numbers D1 to D16 is input from the host computer 10, the RAID control section 134 generates a data-to-be-processed table in the RAM 132.

FIG. 14 illustrates an example of the data-to-be-processed table for the stripe writing. The table structure of a data-to-be-processed table 132b for the stripe writing is analogous to the data-to-be-processed table 132a (illustrated in FIGS. 11 and 12) for the block writing. In the stripe-writing data-to-be-processed table 132b for the strip writing, however, information related to all logical blocks belonging to a stripe is registered.

In the example of FIG. 14, information regarding update data for the first parity group in the stripe 41 in FIG. 8 is shown. This parity group has data blocks with logical block numbers D1, D5, D9, and D13 and the parity block with logical block number "P1". Although not shown in FIG. 14, information regarding three other parity groups included in the stripe 41 is also registered in the data-to-be-processed table 132b. The other three parity groups include the parity blocks with logical block numbers P2, P3, and P4 (see FIG. 8).

When the individual data in the logical blocks D1 to D16 are represented by d1 to d16, the parity data p1 to p4 in the parity blocks with logical block numbers P1 to P4 can be calculated by:

$$p1 = d1 \char`\^ d5 \char`\^ d9 \char`\^ d13$$

$$p2 = d2 \char`\^ d6 \char`\^ d10 \char`\^ d14$$

$$p3 = d3 \char`\^ d7 \char`\^ d11 \char`\^ d15$$

$$p4 = d4 \char`\^ d8 \char`\^ d12 \char`\^ d16$$

where the timestamps added to the data d1, d5, d9, and d13 illustrated in FIG. 14 have the same value t1. The individual timestamps are stored in areas associated with the HDDs in which the corresponding data are stored. Since the data d1, d5, d9, and d13 are stored in different respective HDDs, the timestamps thereof are also stored in different areas.

Four timestamps corresponding to the respective data d1, d5, d9, and d13 are added to the parity data p1. All of the values of the timestamps added to the parity data p1 are t1.

In this manner, the data-to-be-processed table 132b is used to add timestamps to the data and parity data contained in the stripe. The timestamped data and the timestamped parity data are written to associated physical blocks through stripe writing based on RAID 5. As a result, the timestamps t1 added to the data are redundantly stored in both the HDDs in which the data are stored and the HDDs in which the parity data are stored.

Data read processing will be described next. First, read processing for each block will be described.

Figure 15:
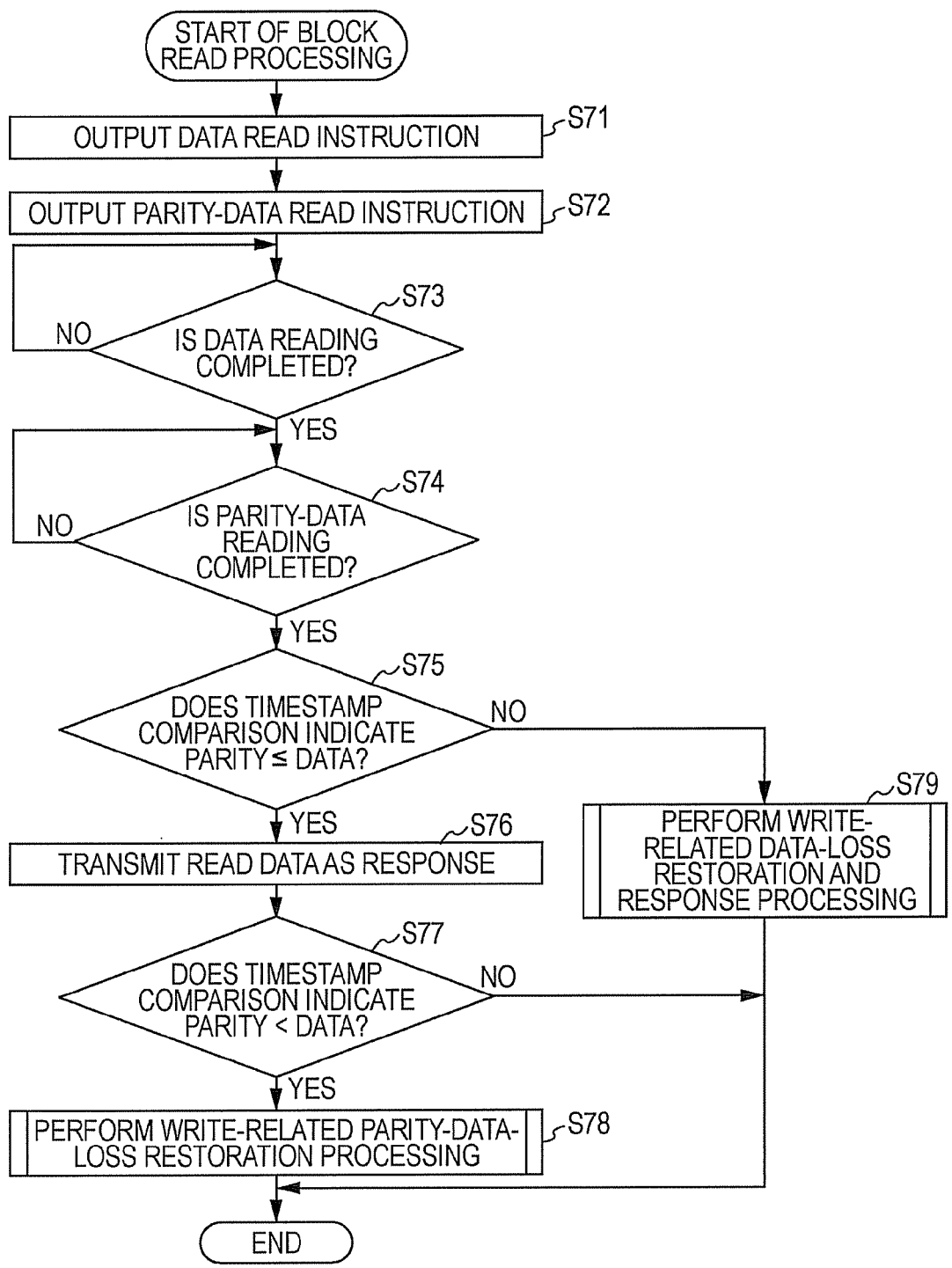
FIG. 15 is a flowchart of a procedure of block read processing.

FIG. 15 is a flowchart of a procedure of block read processing. The processing illustrated in FIG. 15 will now be described along with step numbers. This processing is executed when a request for reading data for each block is input from the host computer 10. This data write request contains the logical block number of a data block to which data to be read belongs.

In step S71, the RAID control section 134 outputs, to the HDD access section 135, an instruction for reading data in a physical block for the corresponding data block specified by the read request. In response to the data read instruction, the HDD access section 135 reads the data in the specified physical block from the HDD to which the specified physical block belongs.

In step S72, the RAID control section 134 outputs, to the HDD access section 135, an instruction for reading parity data in a physical block for a corresponding parity block. In response to the parity-data read instruction, the HDD access section 135 reads the parity data in the specified physical block from the HDD to which the specified physical block belongs.

In step S73, the RAID control section 134 determines whether or not the data reading is completed. Specifically, upon receiving the data from the HDD for which the data read instruction was output, the RAID control section 134 determines that the data reading is completed. When the data reading is completed, the process proceeds to step S74. When the data reading is not completed, the processing in step S73 is repeated and the RAID control section 134 enters a state for waiting for the data reading.

In step S74, the RAID control section 134 determines whether or not the parity-data reading is completed. Specifically, upon receiving the parity data from the HDD for which the parity-data read instruction was output, the RAID control section 134 determines that the parity-data reading is completed. When the parity-data reading is completed, the process proceeds to step S75. When the parity-data reading is not completed, the processing in step S74 is repeated and the RAID control section 134 enters a state for waiting for the parity-data reading.

When the data reading and the parity-data reading are completed, the RAID control section 134 creates a data-to-be-processed table in the RAM 132 and stores the read data and parity data in the data-to-be-processed table.

In step S75, the timestamp comparing section 137 compares one of the timestamps added to the parity data, the one timestamp corresponding to the data to be read, with the timestamp added to the data to be read. When the value of the timestamp added to the data to be read is greater than or equal to the value of the timestamp added to the parity data, the process proceeds to step S76. Otherwise, the process proceeds to step S79.

In step S76, the RAID control section 134 transmits the read data to the host computer 10 as a response.

In step S77, the timestamp comparing section 137 compares the timestamp added to the parity data and corresponding to the data to be read with the timestamp added to the data to be read. When the value of the timestamp added to the data to be read is greater than the value of the timestamp added to the parity data, the process proceeds to step S78. When the value of the timestamp added to the data to be read is equal to the value of the timestamp added to the parity data, the block read processing ends.

In step S78, the RAID control section 134 performs write-related parity-data-loss restoration processing. Details of the write-related parity-data-loss restoration processing are described below (with reference to FIG. 17). After step S78, the block read processing ends.

On the other hand, when the comparison in step S75 indicates that the timestamp added to the data to be read is smaller than the timestamp added to the parity data, the RAID control section 134 performs write-related data-loss restoration and response processing in step S79.

Details of the write-related data-loss restoration and response processing are described below (with reference to FIG. 20). After step S79, the RAID control section 134 transmits the restored data to the host computer 10 as a response. Thereafter, the block read processing ends.

The read processing for each block is performed as described above. A case in which the data d1 in the data block with logical block number "D1" is read will now be described by way of example. In this case, the data d1 is first read from the physical block in which the data d1 is stored. The parity data p1 is also read from the physical block in which the parity data p1 in the parity block P1 belonging to the same parity block as that of the data block with physical block number "D1" is stored. The RAID control section 134 then generates a data-to-be-processed table.

FIG. 16 illustrates an example of the data structure of the data-to-be-processed table. After step S74 in FIG. 15 is finished, the RAID control section 134 generates a data-to-be-processed table 132c in the RAM 132. The data-to-be-processed table 132c has a logical-block-number column, a disk-number column, a physical-block-number column, a data column, and a timestamp column. In these columns, the same types of information as those in the columns having the same names in the data-to-be-processed table 132a illustrated in FIG. 11 are set.

In the example of FIG. 16, in the data-to-be-processed table 132c, information regarding the data d1 and information regarding the parity data p1 are registered. The data d1 is data in the data block with logical block number "D1". Also, the parity data p1 is parity data in the parity block (with logical block number "P1") in the same parity group as that of the data block with logical block number "D1".

In this case, the timestamp added to the data d1 is assumed to be a timestamp t11. The timestamp t11 is associated with the HDD 210 with disk number "DISK#1". The timestamps added to the parity data p1 are assumed to be timestamps t21, t22, t23, and t24. The timestamps t21, t22, t23, and t24 are associated with the HDDs 210, 220, 230, and 240 with disk numbers DISK#1, DISK#2, DISK#3, and DISK#4, respectively.

The timestamp comparing section 137 compares the timestamp t1 added to the data d1 with the timestamp t21 added to the parity data in association with the HDD 210 from which the data d1 was read. In this case, for t21>t11, the timestamp comparing section 137 determines that a write-related data loss exists. On the other hand, for t21≦t11, the timestamp comparing section 137 determines that no write-related data loss exists. However, for t21<t11, the timestamp comparing section 137 determines that a write-related parity-data loss exists.

When no write-related data loss is detected, the RAID control section 134 transmits the read data d1 to the host computer 10 as a response. When a write-related parity-data loss is detected, the RAID control section 134 performs write-related parity-data-loss restoration processing. When a write-related data loss is detected, the RAID control section 134 performs write-related data-loss restoration and response processing.

The write-related parity-data-loss restoration processing will be described next.

FIG. 17 is a flowchart of a procedure of the write-related parity-data-loss restoration processing. The processing illustrated in FIG. 17 will now be described along with step numbers.

In step S81, the RAID control section 134 outputs an instruction for reading remaining data to the HDD access section 135. In response to the remaining-data read instruction, the HDD access section 135 reads the remaining data from the HDDs. The term "remaining data" refers to data stored in physical blocks corresponding to other data blocks belonging to the same parity group as that of the data block with the logical block number specified by the read request.

In step S82, the RAID control section 134 determines whether or not reading of all data for which the read instruction was output in step S81 is completed. When reading of all data is completed, the process proceeds to step S83. When data that has not been completely read exists, the processing in step S82 is repeated and the RAID control section 134 enters a state for waiting for the reading.

The data in the data block specified by the read request and the data in the parity block are already read in the processing in steps S71 and S72. Thus, when all the remaining data are read in step S81, this means that all data and parity data in the parity group to which the logical block specified by the read request belongs are read.

In step S83, the timestamp comparing section 137 compares the timestamps added to the parity data with the timestamps added to the newly read data. Specifically, on the basis of the storage location of each time stamp added to the parity data, the timestamp comparing section 137 determines a HDD corresponding to the timestamp. The timestamp comparing section 137 then compares each of the timestamps added to the parity data with the timestamp added to the data read from the HDD corresponding to that timestamp. When the result of the timestamp comparison indicates that the timestamps added to all data have values that are greater than the values of the timestamps added to the corresponding parity data, the process proceeds to step S85. On the other hand, even one piece of data to which a timestamp having a smaller value than the timestamp added to the parity data exists, the process proceeds to step S84.

In step S84, the RAID control section 134 identifies a physical block in which the data to which the older timestamp than the timestamp of the parity data is added is stored. The RAID control section 134 then registers, as a bad block, the logical block corresponding to the identified physical block. That is, in this case, a write-related data loss exists in the physical block in which the data to which the older timestamp than the timestamp of the parity data is added is stored. Also, when the write-related parity-data-loss restoration processing is to be executed, it is already known that a write-related parity-data loss exists. That is, a write-related loss exists in multiple physical blocks in the same parity group.

When a write-related loss occurs in multiple physical blocks, the data cannot be restored. Accordingly, in order to indicate that data in the logical blocks corresponding to the physical blocks in which the write-related loss occurred, the RAID control section 134 registers attributes of the logical blocks as bad blocks. Thereafter, upon receiving a request for reading the data in the logical block(s) registered as the bad block(s), the RAID control section 134 sends an "error" response.

In step S85, on the basis of the read data, the RAID control section 134 performs parity calculation to generate parity data. Specifically, the RAID control section 134 performs an XOR operation on the read data and uses the result of the operation as parity data. During the processing, the RAID control section 134 adds, to the generated parity data, timestamps having the same values as the timestamps of the individual data.

In step S86, the RAID control section 134 outputs, to the HDD access section 135, an instruction for writing the timestamped parity data to the physical block corresponding to the parity block. In response to the write instruction, the HDD access section 135 writes the restored parity data to the specified logical block in the HDD.

In step S87, the RAID control section 134 determines whether or not the parity-data writing is completed. When the parity-data writing is completed, the write-related parity-data-loss restoration processing ends. When the parity-data writing is not completed, the processing in step S87 is repeated and the RAID control section 134 enters a state for waiting for the parity-data writing.

As described above, when a write-related parity-data loss occurs, it is possible to restore the parity data.

It is assumed, for example, that a write-related parity-data loss is detected during processing of reading data in the data block with logical block number "D1". In this case, data in other data blocks belonging to the same parity group as that of the logical block D1 are read. That is, the data d5, d9, and d13 are read from the physical blocks for the corresponding data blocks with logical block numbers D5, D9, and D13. The read data are additionally registered in the data-to-be-processed table 132c illustrated in FIG. 16.

FIG. 18 illustrates an example of the data-to-be-processed table for the write-related parity-data-loss restoration. Information regarding the data d5, d9, and d13 is additionally registered in the data-to-be-processed table 132c.

The timestamp comparing section 137 compares the timestamps added to the newly read data d5, d9, and d13 with the timestamps added to the parity data p1. That is, t12 and t22 are compared with each other, t13 and t23 are compared with each other, and t14 and t24 are compared with each other. A determination is made as to whether or not the result of the comparison satisfies the following condition:

(t12≧t22) AND (t13≧t23) AND (t14≧t24), where "AND" indicates an AND operation. When the condition is satisfied, the timestamp comparing section 137 determines that no write-related loss exists in the physical blocks corresponding to logical block numbers D5, D9, and D13. When the condition is not satisfied, the timestamp comparing section 137 determines that a write-related loss occurred in a physical block having a smaller timestamp than the timestamp added to the parity data. In this case, the RAID control section 134 registers the logical disk block in question as a bad block having data loss.

When no bad block exists, the RAID control section 134 calculates parity data by using the data d1, d5, d9, and d13 in the data blocks. In this case, the RAID control section 134 performs calculation given by:

$$p1\_1 = d1\textasciicircum d5\textasciicircum d9\textasciicircum d13,$$

where p1_1 represents parity data that is newly generated.

In addition, timestamps that are the same as the timestamps of the other data are added to the newly generated parity data p1_1.

FIG. 19 illustrates an example of the data-to-be-processed table after the parity data is restored. As illustrated in FIG. 19, timestamps t11, t12, t13, and t14 that are the same as those of the other data d1, d5, d9, and d13 are added to the newly generated parity data p1_1.

The timestamped parity data p1_1 is written to the physical block corresponding to logical block number "P1". As a result, the parity data lost by the write-related loss is restored.

The write-related data-loss restoration and response processing will be described next.

Figure 20:
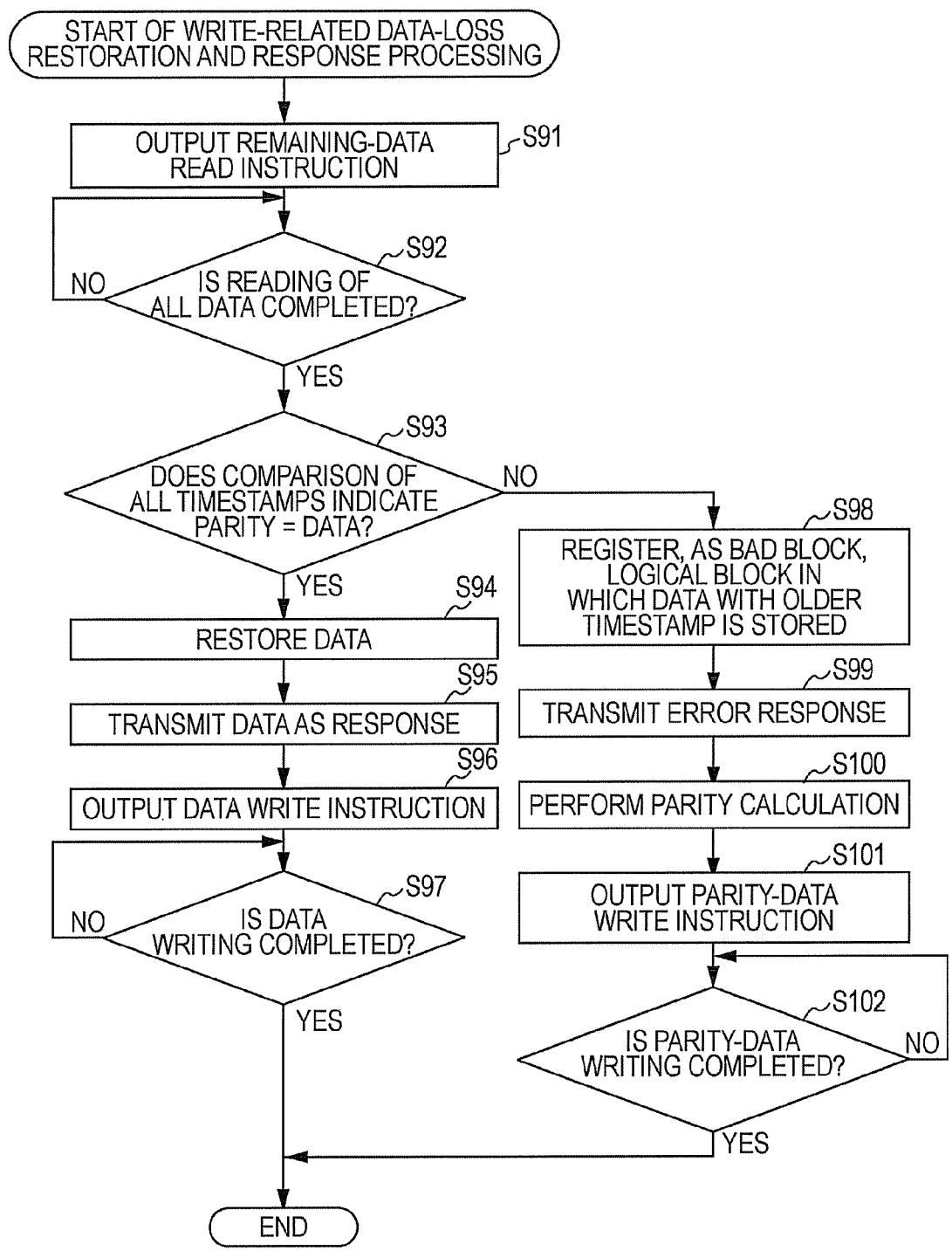
FIG. 20 is a flowchart of a procedure of write-related data-loss restoration and response processing.

FIG. 20 is a flowchart of a procedure of the write-related data-loss restoration and response processing. The processing illustrated in FIG. 20 will now be described along with step numbers.

In step S91, the RAID control section 134 outputs an instruction for reading remaining data, i.e., data other than the data specified by the read request, to the HDD access section 135. In response to the remaining-data read instruction, the HDD access section 135 reads the remaining data from the HDDs.

In step S92, the RAID control section 134 determines whether or not reading of all data for which the read instruction was output in step S91 is completed. When reading of all data is completed, the process proceeds to step S93. When data that has not been completely read exists, the processing in step S92 is repeated and the RAID control section 134 enters a state for waiting for the reading.

In step S93, the timestamp comparing section 137 compares the timestamps added to the parity data with the timestamps added to the newly read data. Specifically, on the basis of the storage location of each timestamp added to the parity data, the timestamp comparing section 137 determines a HDD corresponding to the timestamp. The timestamp comparing section 137 then compares each of the timestamps added to the parity data with the timestamp added to the data read from the HDD corresponding to that timestamp. When the result of the timestamp comparison indicates that the timestamps added to all the newly read data have the same values as the timestamps added to the parity data, the process proceeds to step S94. On the other hand, at least one piece of data has a timestamp that is different from the timestamp added to the parity data, the process proceeds to step S98.

When the result of the timestamp comparison in step S93 indicates that the timestamps added to all the newly read data have the same values as the timestamps added to the parity data, in step S94, the RAID control section 134 determines that no write-related loss occurred in the data. Thus, the RAID control section 134 restores data on the basis of the data in which no write-related loss occurred and the parity data. Specifically, the RAID control section 134 performs an XOR operation on the data other than the data in which the write-related loss occurred and the parity data, and uses the result of the operation as restored data.

In step S95, the RAID control section 134 transmits the data, restored in step S94, to the host computer 10 as a response to the read request.

In step S96, the RAID control section 134 outputs, to the HDD access section 135, an instruction for writing the data, restored in step S94, to the physical block for which the data read instruction was output in step S71 (refer to FIG. 15). In this case, the timestamp added to the parity data (and corresponding to the HDD to which the data is to be written) is added to the data to be written. In response to the write instruction output in step S96, the HDD access section 135 writes the restored timestamped data to the specified logical block in the HDD.

In step S97, the RAID control section 134 determines whether or not the data writing is completed. When the data writing is completed, the write-related data-loss restoration and response processing ends. When the data writing is not completed, the processing in step S97 is repeated and the RAID control section 134 enters a state for waiting for the data writing.

In step S98, the RAID control section 134 registers, as a bad block, the logical block in which the data having the older timestamp than that of the parity data is stored.

In step S99, the RAID control section 134 transmits an "error" response to the host computer 10.

In step S100, on the basis of, of the read data, data (properly read data) of logical blocks that are not registered as bad blocks, the RAID control section 134 performs parity calculation to generate parity data. Specifically, the RAID control section 134 performs an XOR operation on the properly read data and uses the result of the operation as parity data. During the processing, the RAID control section 134 adds, to the generated parity data, timestamps having the same values as the timestamps of the corresponding data from which the parity data was generated.

In step S101, the RAID control section 134 outputs a parity-data write instruction to the HDD access section 135. In response to the write instruction, the HDD access section 135 writes the timestamped parity data to the HDD.

In step S102, the RAID control section 134 determines whether or not the parity-data writing is completed. When the parity-data writing is completed, the write-related data-loss restoration processing and response processing ends. When the parity-data writing is not completed, the processing in step S102 is repeated and the RAID control section 134 enters a state for waiting for the parity-data writing.

As described above, when a write-related data loss occurs, it is possible to restore data and to transmit the restored data to the host computer 10 as a response.

It is now assumed, for example, that a write-related data loss is detected during processing of reading the data d1 in the data block with logical block number "D1". In this case, data in other data blocks belonging to the same parity group as that of the data block with logical block number "D1" are read. That is, the data d5, d9, and d13 are read from the physical blocks for the corresponding data blocks with logical block numbers D5, D9, and D13. The read data are additionally registered in the data-to-be-processed table 132c illustrated in FIG. 16. As a result, the RAID control section 134 generates a data-to-be-processed table 132c illustrated in FIG. 18. In this case, it is known that the timestamp t11 added to the data d1 in the data block with logical block number "D1" is smaller than the timestamp t21 added to the parity data p1.

Thus, the RAID control section 134 respectively compares the timestamps t12, t13, and t14 of the data d5, d9, and d13 with the timestamps t22, t23, and t24 of the parity data p1. That is, t12 and t22 are compared with each other, t13 and t23 are compared with each other, and t14 and t24 are compared with each other. A determination is made as to whether or not the result of the comparison satisfies the following condition:

(t12=t22) AND (t13=t23) AND (t14=t24).

When this condition is satisfied, the RAID control section 134 determines that no write-related loss exists in the data d5, d9, and d13 and the parity data p1.

When no write-related loss exists except for the data d1 in the data block with logical block number "D1", the RAID control section 134 restores the data in the data block with logical block number "D1". In this case, the RAID control section 134 performs calculation given by:

$$d1\_1 = d5 \wedge d9 \wedge d13 \wedge p1,$$

where d1_1 represents data that is restored.

The RAID control section 134 adds the timestamp t21, added to the parity data, to the restored data d1_1. The RAID control section 134 then updates, in the data-to-be-processed table 132c, the data and the timestamp corresponding to logical block number "D1".

FIG. 21 illustrates the data-to-be-processed table after the data restoration. When compared with FIG. 18, the data corresponding to logical block number "D1" in the data-to-be-processed table 132c is changed from d1 to d1_1. The timestamp corresponding to logical block number "D1" is also changed from t11 to t21.

Thereafter, the RAID control section 134 issues an instruction for writing the data t1_1 having the timestamp t21 to the physical block "block#1" in the HDD 210 with disk number "DISK#1". Consequently, the data in the HDD 210 are updated.

When the condition of (t12=t22) AND (t13=t23) AND (t14=t24) is not satisfied, this means that a write-related loss exists in the data or parity data having a smaller timestamp. When the timestamp of the data is smaller than the timestamp of the parity data, a write-related data loss exists. In this a case, however, the data cannot be restored because of multiple failures. Thus, all logical blocks (including the logical block with logical block number "D1") in which data having timestamps that are smaller than the timestamps of the parity data are stored are registered as bad blocks. In this case, since the data in the data block with logical block number "D1" specified by the read request cannot be restored, an "error" response is transmitted to the host computer 10.

Even when data cannot be restored, an XOR operation is performed on the read data to generate parity data. The RAID control section 134 performs calculation given by:

$$p1\_2 = d1 \wedge d5 \wedge d9 \wedge d13,$$

where p1_2 indicates parity data that is newly generated.

The timestamps of individual data from which the parity data p1_2 was generated are added to the parity data p1_2. The RAID control section 134 then updates, in the data-to-be-processed table 132c, the parity data and the timestamps corresponding to logical block number "P1".

FIG. 22 illustrates the data-to-be-processed table when data cannot be restored. When compared with FIG. 18, the parity data corresponding to logical block number "P1" in the data-to-be-processed table 132c is changed from p1 to p1_2. The timestamps corresponding to logical block number "P1" are also changed to t11, t12, t13, and t14.

Thereafter, the RAID control section 134 issues an instruction for writing the parity data p1_2 having the timestamps t11, t12, t13, and t14 to the physical block "block#1" in the HDD 250 with disk number "DISK#5". Consequently, the parity data in the HDD 250 is updated.

As described above, the RAID apparatus 100 based on RAID 5 can perform detection and correction for a write-related loss by simultaneously reading physical blocks of data and parity data during block reading and comparing the timestamps of the data and the parity data.

Processing for reading for each stripe will be described next.

Figure 23:
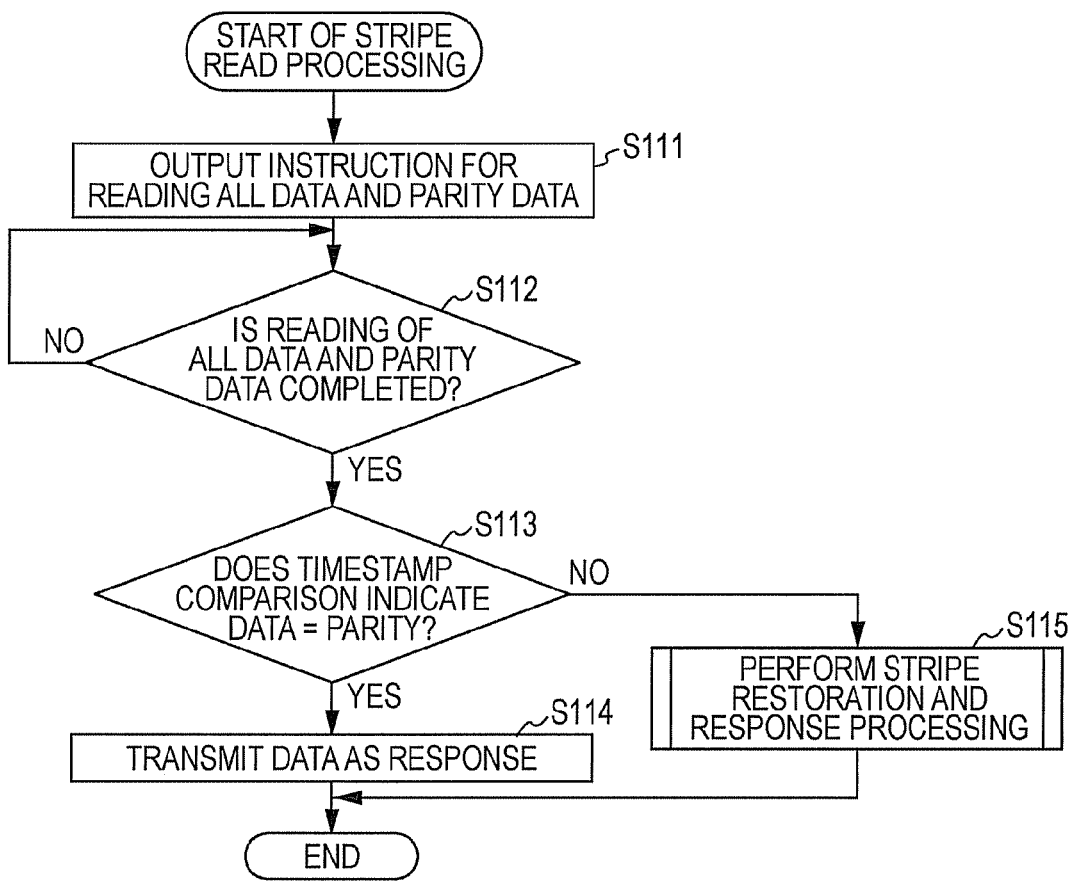
FIG. 23 is a flowchart of a procedure of stripe read processing.

FIG. 23 is a flowchart of a procedure of stripe read processing. The processing illustrated in FIG. 23 will now be described along with step numbers. This processing is executed in response to a read request specifying a stripe.

In step S111, the RAID control section 134 outputs, to the HDD access section 135, an instruction for reading data in physical blocks corresponding to all logical blocks included in the specified stripe. In response to the read instruction, the HDD access section 135 reads all data and parity data from the HDDs.

In step S112, the RAID control section 134 determines whether or not the reading of all data and parity data is completed. When reading of all data and parity data is completed, the process proceeds to step S113. When unread data or parity data exists, the processing in step S112 is repeated and the RAID control section 134 enters a state for waiting for the reading.

In step S113, the timestamp comparing section 137 compares the timestamps added to the parity data with the timestamps added to the newly read data. When the result of the timestamp comparison indicates that the timestamps added to all the newly read data have the same values as the timestamps added to the parity data, the process proceeds to step S114. On the other hand, even one piece of data has a timestamp that is different from the timestamp added to the parity data, the process proceeds to step S115.

In step S114, the RAID control section 134 transmits, as a response, the stripe data read in step S111 to the host computer 10. Thereafter, the stripe read processing ends.

In step S115, the RAID control section 134 performs stripe restoration and response processing. Thereafter, the stripe read processing ends.

Data reading for each stripe is performed as described above. It is assumed, for example, a request for reading a stripe containing the data blocks with logical block numbers D1 to D16 and the parity blocks P1 to P4 associated with the data blocks is issued. In this case, data and parity data are read from physical blocks corresponding to all logical blocks included in the stripe. The RAID control section 134 generates a data-to-be-generated table in the RAM 132 and stores the read data and parity data in the data-to-be-generate table.

FIG. 24 illustrates an example of the data-to-be-processed table for the stripe reading. In a data-to-be-processed table 132d illustrated in FIG. 24, parity groups in a stripe are surrounded by thick lines. In this manner, when a read request specifying a stripe is issued, data and parity data are read from physical blocks corresponding to all logical blocks included in the specified stripe and are stored in the data-to-be-processed table 132d.

The timestamp comparing section 137 compares the timestamps in all data blocks in the data-to-be-processed table 132d with the timestamps in the parity blocks therein. \when all results of the comparison indicate matches, the timestamp comparing section 137 determines that no write-related loss exists in the stripe. In this case, all the read data are transmitted to the host computer 10.

On the other hand, when a mismatched timestamp exists, the RAID control section 134 starts stripe restoration and response processing.

Figure 25:
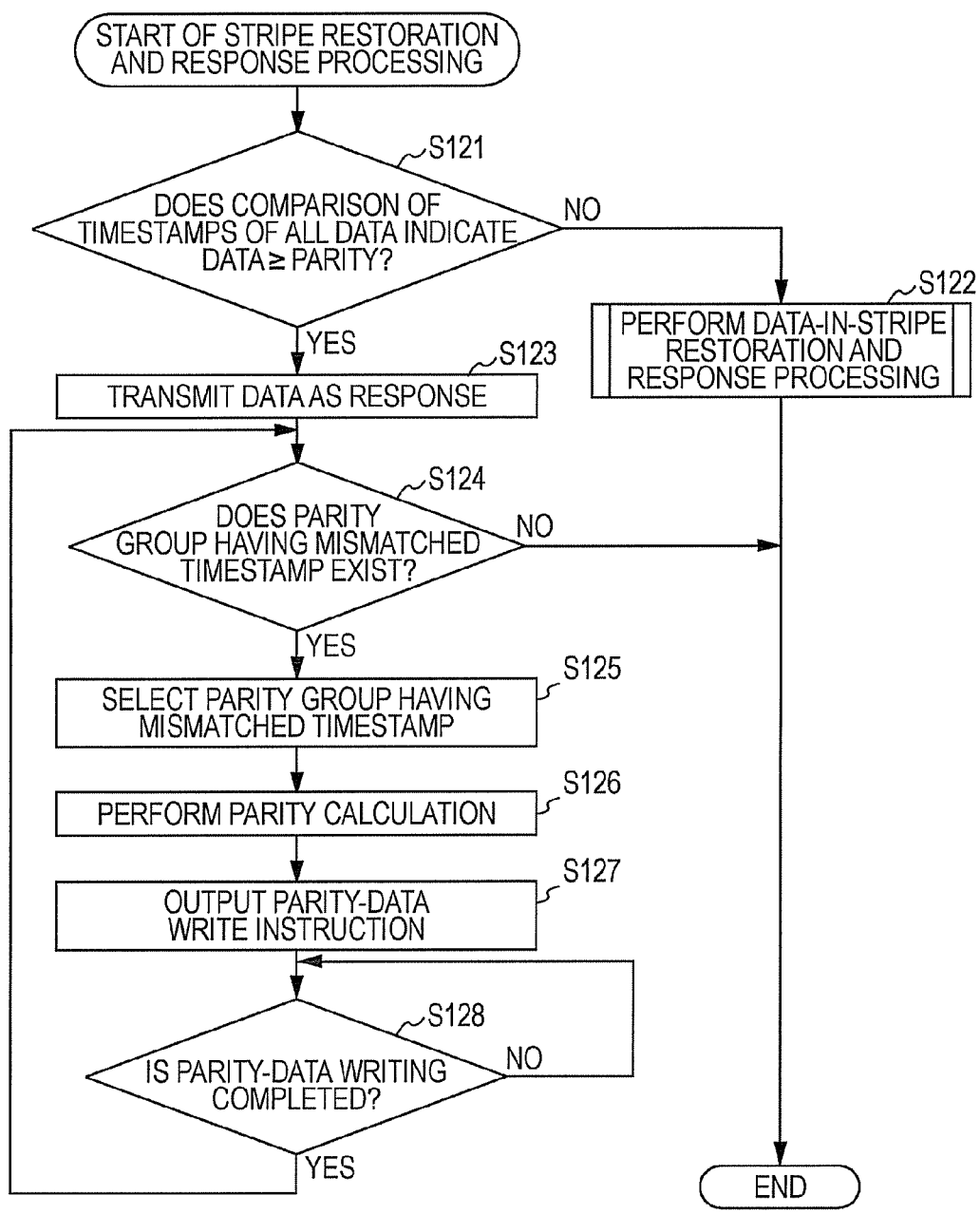
FIG. 25 is a flowchart of a procedure of stripe-restoration and response processing.

FIG. 25 is a flowchart of a procedure of the stripe restoration and response processing. The processing illustrated in FIG. 25 will now be described along with step numbers.

In step S121, the RAID control section 134 determines whether or not results of the comparison performed by the timestamp comparing section 137 indicate that the values of the timestamps added to all data are greater than or equal to the values of the timestamps added to the parity data. When the values of the timestamps of all data are greater than or equal to the values of the timestamps of the parity data, the process proceeds to step S123. When at least one piece of data has a timestamp whose value is smaller than the value of the parity data, the process proceeds to step S122.

When the results of the comparison performed in step S121 indicate that data to which a timestamp that is older than the timestamp of the parity data is added exists, the RAID control section 134 determines that a write-related loss occurred during writing of the data, and the process proceeds to step S122. In step S122, the RAID control section 134 performs data-in-stripe restoration and response processing. Thereafter, the stripe restoration and response processing ends.

When the results of the comparison performed in step S121 indicate that the values of the timestamps added to all the data are greater than or smaller than the values of the timestamps added to the parity data, the RAID control section 134 determines that a write-related loss occurred during writing of the parity data. In this case, the RAID control section 134 determines that no write-related loss exists in the data. Thus, in step S123, the RAID control section 134 transmits the read data to the host computer 10 as a response.

In step S124, the RAID control section 134 determines whether or not any parity group having a mismatched timestamp exists. That is, the RAID control section 134 determines whether or not any parity group on which the processing in steps S125 to S128 described below has not been executed yet exists in the parity groups having mismatched timestamps. When any parity having a mismatched timestamp exists, the process proceeds to step S125. When no parity group having a mismatched timestamp exists, the stripe restoration and response proceeding ends.

In step S125, the RAID control section 134 selects one parity group having a mismatched timestamp.

In step S126, on the basis of the read data, the RAID control section 134 performs parity calculation to generate parity data. Specifically, the RAID control section 134 performs an XOR operation on the properly read data and uses the result of the operation as parity data. During the processing, the RAID control section 134 adds, to the generated parity data, timestamps having the same values as the timestamps of the individual data from which the parity data was generated.

In step S127, the RAID control section 134 outputs, to the HDD access section 135, an instruction for writing the parity data to a physical block for a corresponding parity block. In response to the write instruction, the HDD access section 135 writes the parity data to the specified physical blocks.

In step S128, the RAID control section 134 determines whether or not the parity-data writing is completed. When the parity-data reading is completed, the process proceeds to step S124. When the parity-data writing is not completed, the processing in step S128 is repeated and the RAID control section 134 enters a state for waiting for the parity-data writing.

The stripe restoration and response processing is performed as described above. For example, with respect to the data in the stripe illustrated in FIG. 24, it is assumed that the timestamp of the data d14 in the data block with logical block number "D14" does not match the corresponding timestamp of the parity data p2 in the parity block with logical block number "P2". It is assumed, in this example, that the timestamp t18 added to the data d14 and the timestamp t28 added to the parity data p2 and corresponding to DISK#4 have a relationship of t18>t28.

In this case, since the timestamp t28 added to the parity data is smaller than the timestamp t14 added to the data, it is regarded that a write-related loss occurred during writing of the parity data. Accordingly, the RAID control section 134 performs parity calculation to generate parity data. The generated parity data is stored in the data-to-be-processed table 132d.

FIG. 26 illustrates the data-to-be-processed table 132d after a write-related parity-data loss occurs and the parity data is generated. As illustrated in FIG. 26, the parity data p2 corresponding to logical block number "P2" is updated to p2_1. The parity data p2_1 can be expressed as:

p2_1=d2^d6^d10^d14.

The timestamps t15, t16, t17, and t18 of the data in the same parity group are added to the generated parity data p2_1. The generated parity data p2_1 and the timestamps added thereto are stored in the data-to-be-processed table 132d. The timestamped parity data p2_1 is written to the physical block "block#2" in the HDD 250 with disk number "DISK#5".

The data-in-stripe restoration and response processing will now be described next in detail.

Figure 27:
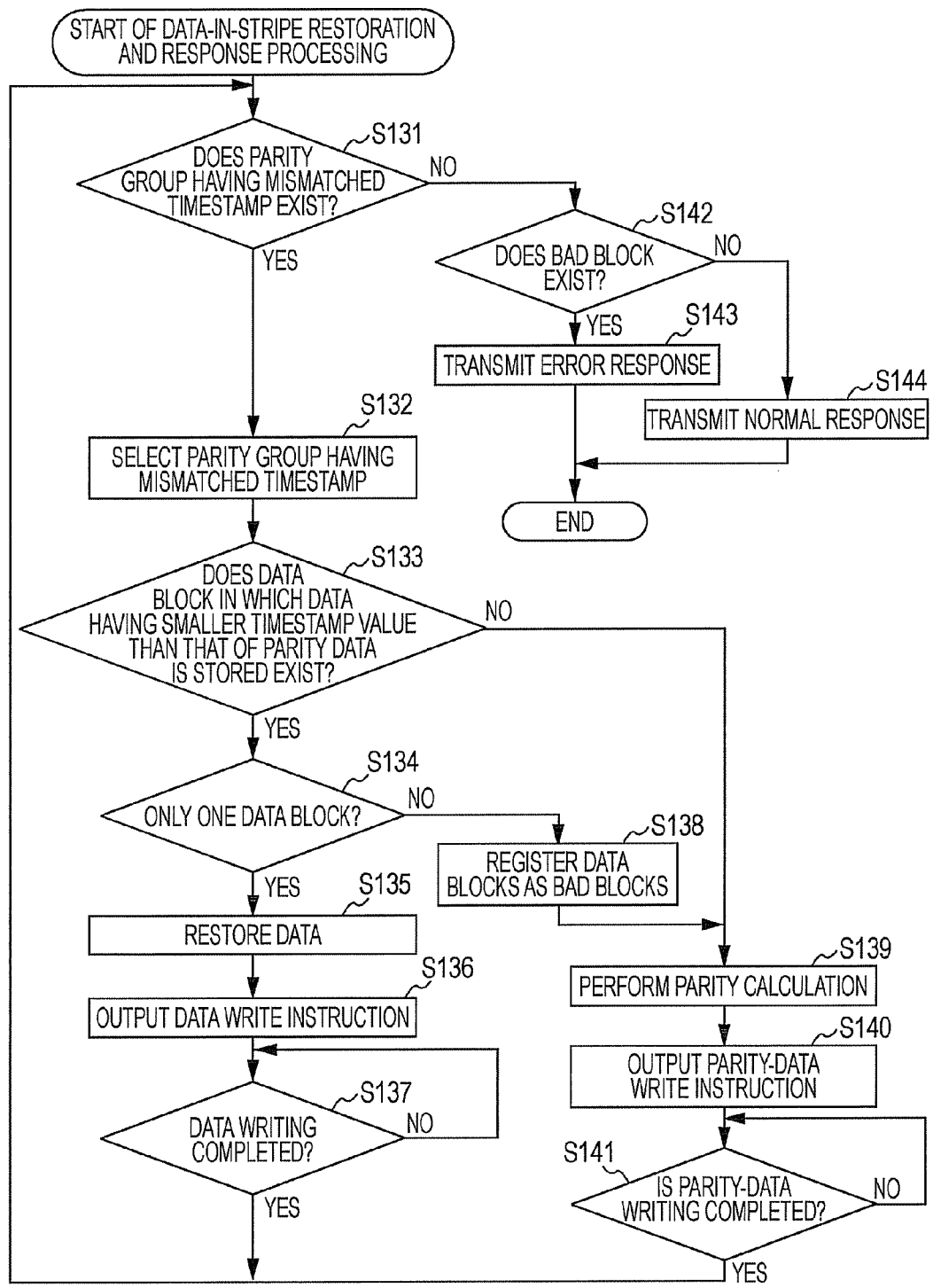
FIG. 27 is a flowchart of a procedure of data-in-stripe restoration and response processing.

FIG. 27 is a flowchart of a procedure of the data-in-stripe restoration and response processing. The processing illustrated in FIG. 27 will now be described along with step numbers.

In step S131, the RAID control section 134 determines whether or not any parity group having a mismatched timestamp exists. When a parity group having a mismatched timestamp exists, the process proceeds to step S132. When a parity group having a mismatched timestamp does not exist, the process proceeds to step S142.

In step S132, the RAID control section 134 selects one parity group having a mismatched timestamp.

In step S133, on the basis of the results of the comparison performed by the timestamp comparing section 137, the RAID control section 134 determines whether or not a data block in which data having a timestamp whose value is smaller than the value of the timestamp of the parity data is stored exists. When at least one such data block exists, the process proceeds to step S134. When no such a data block exists, the process proceeds to step S139.

In step S134, the RAID control section 134 determines whether or not the number of data blocks in which data having timestamps whose values are smaller than the values of the timestamps of the parity data are stored is one. When the number of such data blocks is one, the process proceeds to step S135. When the number of such data blocks is two or more, the process proceeds to step S138.

In step S135, the RAID control section 134 restores the data. Specifically, the RAID control section 134 performs an XOR operation on other data and the parity data in the parity group and uses the result of the operation as restored data. During this processing, the RAID control section 134 adds, to the restored data, a timestamp having the same value as the value of the timestamp of the parity data (and corresponding to the HDD to which the data is to be written).

In step S136, the RAID control section 134 outputs, to the HDD access section 135, an instruction for writing the data to a physical block for the corresponding data block in which the write-related loss occurred. In response to the write instruction, the HDD access section 135 writes the data to the specified physical block.

In step S137, the RAID control section 134 determines whether or not the data writing is completed. When the data reading is completed, the process returns to step S131. When the data writing is not completed, the processing in step S137 is repeated and the RAID control section 134 enters a state for waiting for the data writing.

When it is determined in step S134 that the number of data blocks is two or more, in step S138, the RAID control section 134 registers the data blocks as bad blocks.

In step S139, on the basis of the read data, the RAID control section 134 performs parity calculation to generate parity data. Specifically, the RAID control section 134 performs an XOR operation on the read data and uses the result of the operation as parity data. During the processing, the RAID control section 134 adds, to the generated parity data, timestamps having the same values as the timestamps of the corresponding individual data.

In step S140, the RAID control section 134 outputs, to the HDD access section 135, an instruction for writing the parity data to the physical blocks for the corresponding parity blocks. In response to the write instruction, the HDD access section 135 writes the parity data to the specified physical blocks.

In step S141, the RAID control section 134 determines whether or not the parity-data writing is completed. When the parity-data writing is completed, the process returns to step S131. When the parity-data writing is not completed, the processing in step S141 is repeated and the RAID control section 134 enters a state for waiting for the parity-data writing.

When it is determined in step S131 that a parity group having a mismatched timestamp does not exist, in step S142, the RAID control section 134 determines whether or not a logical block registered as a bad block exists. When a bad block exists, the process proceeds to step S143. When no bad block exists, the process proceeds to step S144.

In step S143, the RAID control section 134 transmits an error response to the host computer 10. Thereafter, the data-in-stripe restoration and response processing ends.

In step S144, the RAID control section 134 transmits, as a normal response, the stripe data containing the restored data to the host computer 10. Thereafter, the data-in-stripe restoration and response processing ends.

The data-in-stripe restoration and response processing is performed as described above. It is assumed, for example, that a write-related loss occurs in the data block with logical block number "D14".

Figure 28:
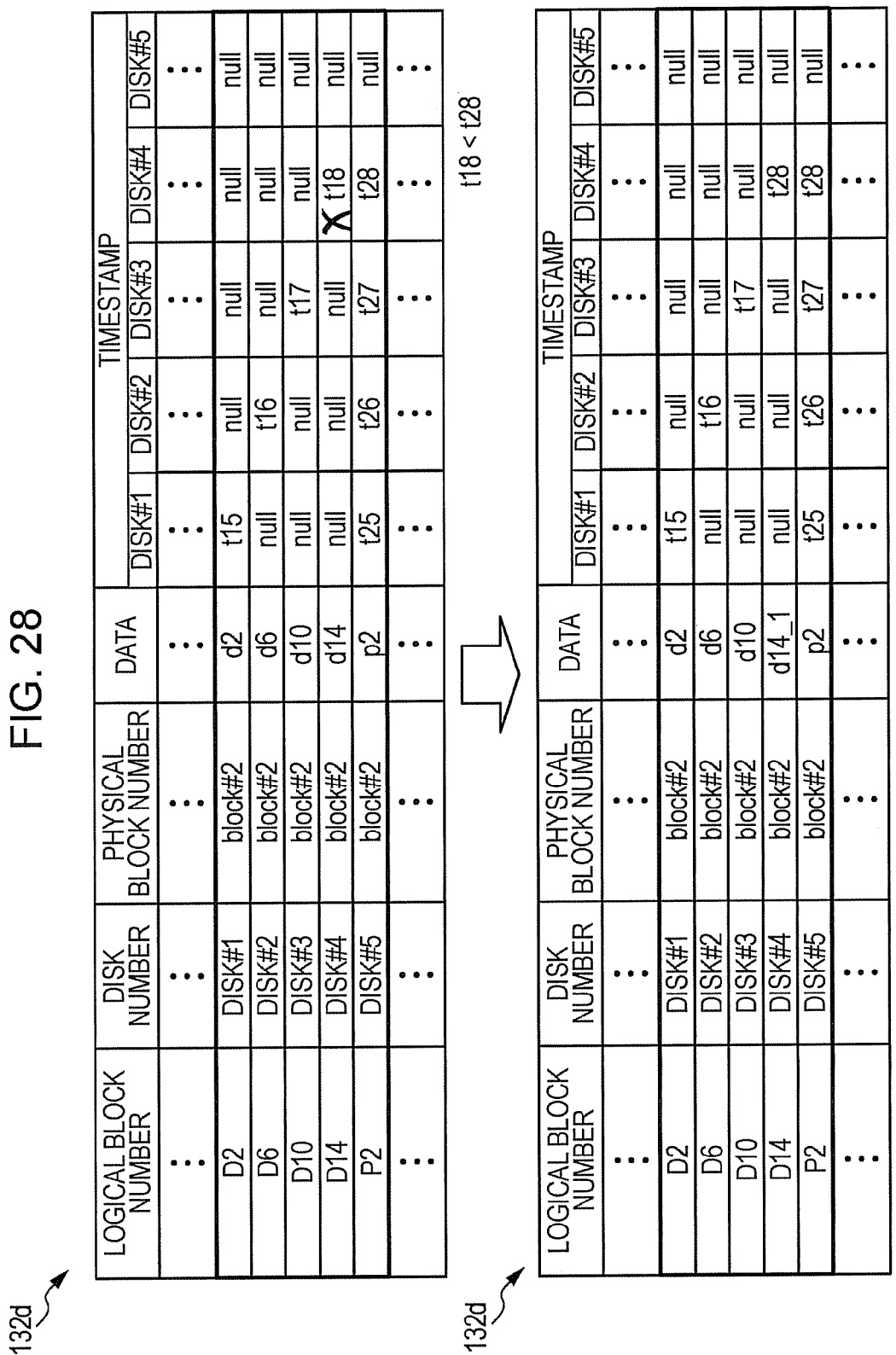
FIG. 28 illustrates an example of the data-to-be-processed table after the data is updated.

FIG. 28 illustrates an example of the data-to-be-processed table after the data restoration. In this case, the timestamp t18 added to the data d14 in the data block with physical block number "D14" does match the timestamp t28 added to the parity data in the parity block with logical block number "P2". That is, as a result of the comparison, t18<t28 is determined.

Thus, the RAID control section 134 selects a parity group having logical block numbers D2, D6, D10, D14, and P2 as a parity group having a mismatched timestamp. In this case, when the number of pieces of data to which the timestamps having smaller values than those of the parity data are attached is one, it is determined that a write-related loss occurred in the data. When the number of data in which a write-related loss occurred is one, the data can be restored. Accordingly, restoration processing is performed on the data.

As illustrated in FIG. 28, when the number of pieces of data in which a write-related loss occurred is one, the data is restored. In this case, the RAID control section 134 performs calculation given by:

$$d14\_1 = d2 \char`\^ d6 \char`\^ d10 \char`\^ p2,$$

where d14_1 represents data that is restored.

The timestamp t28 added to the parity data is added to the restored data d14_1. The restored data is further stored in the data-to-be-processed table 132d. The timestamped parity data d14_1 is then written to the physical block "block#2" in the HDD 240 with disk number "DISK#4".

When the data was successfully restored as described above, the stripe containing the restored data is transmitted to the host computer 10 as a response.

When a write-related loss occurred in two or more pieces of data, the data cannot be restored in RAID 5. In this case, the RAID control section 134 registers, as bad blocks, the logical blocks of the data in which the write-related loss occurred. In order to correct mismatches between the read data and the parity data, parity data is recalculated.

FIG. 29 illustrates an example of the data-to-be-processed table when a write-related loss occurred in two or more pieces of data. It is assumed, in the example of FIG. 29, that a write-related loss occurred during writing of data to two data blocks with logical block numbers "D6" and "D14". In this case, mismatches are detected with respect to the timestamp of the data d6 in the data block with logical block number "D6" and the timestamp of the data d14 in the data block with logical block number "D14". That is, as a result of comparison, t16<t26 and t18<t28 are determined.

When a write-related loss exists in two pieces of data in this manner, the logical blocks corresponding to the data are registered as bad blocks. Parity data is then calculated based on the read data, so that new parity data is generated. In this case, the RAID control section 134 performs calculation given by:

$$p2\_2 = d2 \char`\^ d6 \char`\^ d10 \char`\^ p14,$$

where p2_2 represents data that is restored.

The timestamps t15, t16, t17, and t18 of the data in the same parity group are added to the generated parity data p2_2. The generated parity data p2_2 and the timestamps added thereto are stored in the data-to-be-processed table 132d. The timestamped parity data p2_2 is written to the physical block "block#2" in the HDD 250 with disk number "DISK#5".

When data cannot be restored and a bad block is generated in a stripe in the manner described above, an error response is transmitted to the host computer 10.

As described above, in the first embodiment, physical blocks of data and parity data are simultaneously read during stripe reading based on RAID 5 and the timestamps thereof are compared with each other, so that detection and correction for a write-related loss can be performed. That is, it is possible to detect an abnormality of an event in which no data is written even though data-write processing has been properly completed, without performing read processing immediately after the writing. This arrangement eliminates a need for checking the presence/absence of a write-related loss during data writing and improves the efficiency of data write processing.

Furthermore, when a write-related loss is detected after a read request is issued, data can be restored using parity data and so on. Accordingly, it is possible to maintain high levels of reliability.

Also, when data reading is performed for each stripe, data restoration can be quickly performed upon detection of a write-related loss. That is, during restoration of data, other data and parity data in the same parity group are used. For data reading for each stripe, at a point when a write-related data loss is detected, both data and parity data needed for restoration are already stored in the data-to-be-processed table. Thus, data can be quickly restored and all data in the stripe can be transmitted to the host computer 10 as a response.

When data or parity data is restored, the restored data or parity data is written back to the HDDs. Consequently, a mismatch in the parity group in which a write-related loss occurred can be corrected when a read request is input. That is, the data-read request processing and the write-related-loss checking and restoration are simultaneously performed, so that restoration for a data abnormality can be performed efficiently.

[Second Embodiment]

A second embodiment will be described next. In the second embodiment, counter values are used instead of the timestamps used in the first embodiment.

A system in the second embodiment has the same elements as those in the first embodiment illustrated in FIG. 2. However, the function of the controller 130 and the data format of the HDDs 210, 220, 230, 240, and 250 are different from those in the first embodiment. More specifically, with respect to the data format of the HDDs, the storage area (see FIG. 3) used as the timestamp area 211b in the first embodiment is replaced with a counter area for storing multiple counter values (a counter value group) in the second embodiment. In the second embodiment, one counter value is assumed to be expressed by two bits. The counter area, therefore, requires a smaller storage capacity than that of the timestamp area 211b in the first embodiment.

FIG. 30 is an example of counter values stored in a HDD in the second embodiment. Physical block numbers (i.e., numerals that follow block#) are set for x physical blocks, respectively, in a HDD 31a. Each physical number has a storage area for data and a storage area for counter values. The storage area for the counter values can store counter values corresponding to the number of HDDs. The storage area for the counter values is separated into counter-value areas associated with the disk numbers of the HDDs. Each counter-value area is associated with a corresponding one of the HDDs included in RAID 5. In the example of FIG. 30, a counter value corresponding to disk number "j" at physical block number "i" is expressed by c(i, j). Such counter-value storage areas are provided in each HDD included in RAID 5.

The function of a controller in the second embodiment will be described next.

Figure 31:
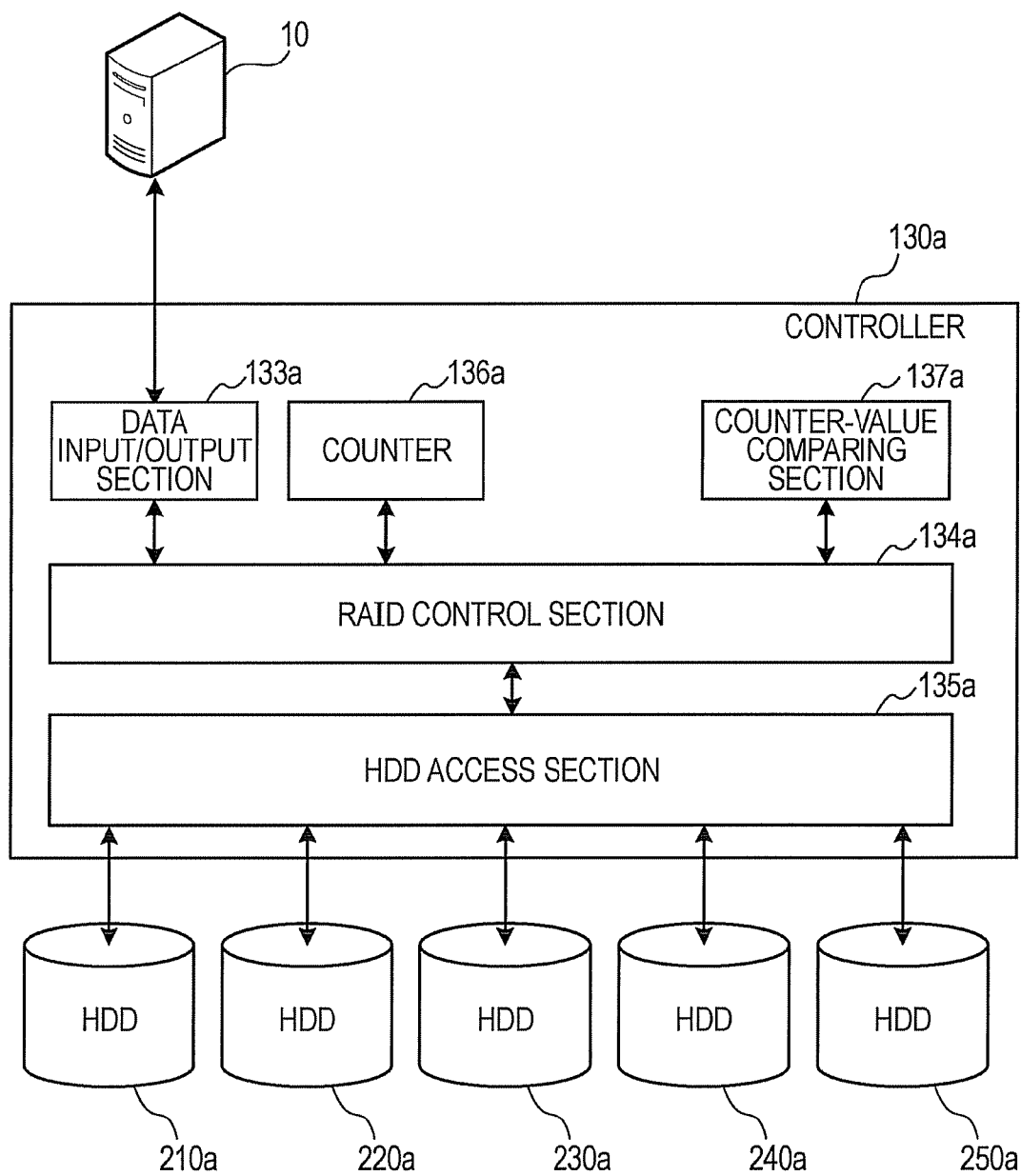
FIG. 31 illustrates the function of a controller in the second embodiment.

FIG. 31 illustrates the function of a controller in the second embodiment. A controller 130a includes a data input/output section 133a, a RAID control section 134a, a HDD access section 135a, a counter 136a, and a counter-value comparing section 137a. The functions of the data input/output section 133a and the HDD access section 135a are analogous to those having the same names in the first embodiment illustrated in FIG. 9.

In response to an access request, the RAID control section 134a performs access control on HDDs 210a, 220a, 230a, 240a, and 250a, which use a RAID technology. In the present embodiment, it is assumed that the RAID control section 134a performs access control based on RAID 5. In order to perform access control based on RAID 5, the RAID control section 134a manages logical-block and physical-block association relationships as illustrated in FIG. 8. The RAID control section 134a identifies a physical block corresponding to a logical block specified by the access request and a HDD having the physical block, and outputs, to the HDD access section 135a, an access instruction corresponding to the access request.

For generation of a new logical disk, the RAID control section 134a initializes counter values for physical blocks associated with logical blocks on the logical disk to "0", the counter values being contained in the counter-value storage areas.

When the access request is a write request, the RAID control section 134a obtains a counter value from the counter 136a. Specifically, in response to a write request, the RAID control section 134a reads data in a physical block for a corresponding data block to which data is to be written and parity data in a physical block for a corresponding parity block in the same parity group as that of the data block. The RAID control section 134a then transfers the counter value, added to the read data, to the counter 136a. In response, an updated counter value is sent back from the counter 136a. The RAID control section 134a then adds the obtained counter value to the data to be written and the corresponding parity data.

When the access request is a read request, the RAID control section 134a extracts a counter value added to the read data and extracts, from counter values added to the parity data in the parity group to which the read data belongs, a counter value corresponding to the read data. The RAID control section 134a then transfers the two extracted counter values to the counter-value comparing section 137a. The RAID control section 134a receives a counter-value comparison result from the counter-value comparing section 137a, and determines the presence/absence of a write-related loss on the basis of the comparison result. When no write-related loss exists, the RAID control section 134a transfers the read data to the data input/output section 133a as a response to the read request.

Upon determining that a write-related loss exists, the RAID control section 134a performs processing for restoring the data. The RAID control section 134a then transfers the restored data to the data input/output section 133a as a response to the read request.

The counter 136a generates a counter value in response to a request from the RAID control section 134a. Specifically, upon receiving the present counter value from the RAID control section 134a, the counter 136a counts up the counter value. Since the counter value is expressed by two bits, count-up is performed from 0 to 3. When the present counter value is 3, the counter value is changed to 0 by count-up.

The counter-value comparing section 137a compares counter values in response to a request from the RAID control section 134a. The comparison of the counter values provides a comparison result indicating whether or not either one of the counter values is advanced by 1 or whether the difference between the counter values is 2. The counter-value comparing section 137a sends the comparison result to the RAID control section 134a.

On the basis of the comparison result sent from the counter-value comparing section 137a, the RAID control section 134a can determine the presence/absence of a write-related loss.

FIG. 32 illustrates write-related loss determination criteria based on the counter-value comparison result. In FIG. 32, a character "u" indicates the counter value of data read from a physical block U. A character "v" indicates a counter value corresponding to a HDD having the physical block U out of counter values added to parity data read from a physical block V.

When the counter value "u" and the counter value "v" are the same, it is determined that no write-related loss exists. When the counter value "v" is advanced by 1 from the counter value "u", it is determined that a write-related loss exists in the physical block U. When the counter value "u" is advanced by 1 from the counter value "v", it is determined that a write-related loss exists in the physical block V. That is, it is determined that a physical block whose counter value is delayed by 1 has a write-related loss.

When the difference between the counter value "u" and the counter value "v" is 2, which counter value is advanced is unknown. In this case, the write-related loss determination cannot be made. When the write-related loss determination cannot be made, the RAID control section 134a regards that the data in the logical block U is lost and registers the logical block U as a bad block. The RAID control section 134a then recalculates parity data in the parity group and sets the counter value "v" of the parity data for the counter value "u" of the data. The RAID control section 134a then updates the counter value of the physical block U for the corresponding data block and also updates the parity data of the physical block V for the corresponding parity block.

During stripe writing, the RAID control section 134a updates the counter values of all data and parity data. Specifically, in response to a stripe write request, the RAID control section 134a reads data and parity data from physical blocks corresponding to all logical blocks included in a stripe. The RAID control section 134a further sends the counter values of all data to the counter 136a, so that the counter values are updated. Thereafter, the RAID control section 134a adds the updated counter values to the data to be written and the parity data and issues, to the HDD access section 135a, an instruction for writing the resulting data and parity data to the physical blocks.

As described above, a write-related loss can be detected using the counter values. Since the counter-value storage area requires a smaller storage capacity than the timestamp storage area, the use of the counter values makes it possible to enhance the efficiency of using the storage area in the HDD.

In the second embodiment, one counter value is expressed by two bits, as described above. In this case, when the counter value "3" is counted up, the counter value becomes 0. This arrangement allows a temporal anteroposterior relationship to be expressed with a counter value having a small number of bits. For example, when data to which the counter value "3" is added and parity data to which the counter value "0" is added are given, it can be determined that the parity data is written at a later time than the data. As a result, it can be determined that the data to which the counter value "3" is added has a write-related loss.

[Third Embodiment]

In a third embodiment, both timestamps and the counter values are used to detect a write-related loss.

As described above in the second embodiment, when the counter values are used, data and parity data are read in advance in order to count up the counter values. Accordingly, in order to eliminate the need for the advance reading during stripe reading, both the timestamps and the counter values are used. Specifically, one timestamp is added to each piece of data and each piece of parity data. Counter values corresponding to the number of HDDs in RAID 5 are set for each data and each parity data, and a flag for determining whether or not which of the timestamp and the counter value is used is set for each counter value.

In the third embodiment, the stamps, the flags, and the counter values added to the data and the parity data are compared with each other to determine the presence/absence of a write-related loss. Hereinafter, the timestamps, the flags, and the counter values are collectively referred to as "comparison information".

In order to store the timestamps and the counter values, comparison-information storage areas, instead of the timestamp storage areas in the first embodiment, are provided for respective physical blocks in the HDDs. One timestamp, multiple counter values, and multiple flags are stored in each comparison-information storage area. Simultaneously with reading of data or parity data from physical blocks, the RAID apparatus also reads information from the comparison information storage areas.

FIG. 33 is an example of the data structure of a data-to-be-processed table in the third embodiment. When data of one stripe are read, the RAID apparatus generates a data-to-be-processed table 132e in a RAM. This data-to-be processed table 132e has a data structure as illustrated in FIG. 33.

The data-to-be-processed table 132e has a logical-block column, a disk-number column, a physical-block column, a data column, a timestamp column, flag columns, and counter-value columns.

In the logical-block column, the logical block number of each of logical blocks included in a stripe is set. In the disk-number column, the disk number of a HDD having a physical block corresponding to the logical block is set. In the physical-block column, the physical block number of the physical block corresponding to the logical block is set. In the data column, data or parity data read from the physical block is set.

In the timestamp column, a timestamp indicating data-writing time is set. The timestamp of the parity data is updated when stripe writing is performed.

In each flag column, a flag indicating which of the timestamp and the counter value is to be compared during write-related-loss check is set. Specifically, a flag added to data to be compared and one of multiple flags added to parity data to be compared, the one flag corresponding to the data to be compared, are used to determine which of the timestamp and the counter value is to be compared. When both the flag of data and the flag of parity data are "0", the counter values are compared with each other. When both the flag of data and the flag of parity data are "1", the timestamps are compared with each other. When the flag of data is "0" and the flag of parity data is "1", the timestamps are compared with each other. When the flag of data is "1" and the flag of parity data is "0", the counter values are compared with each other.

Figure 34:
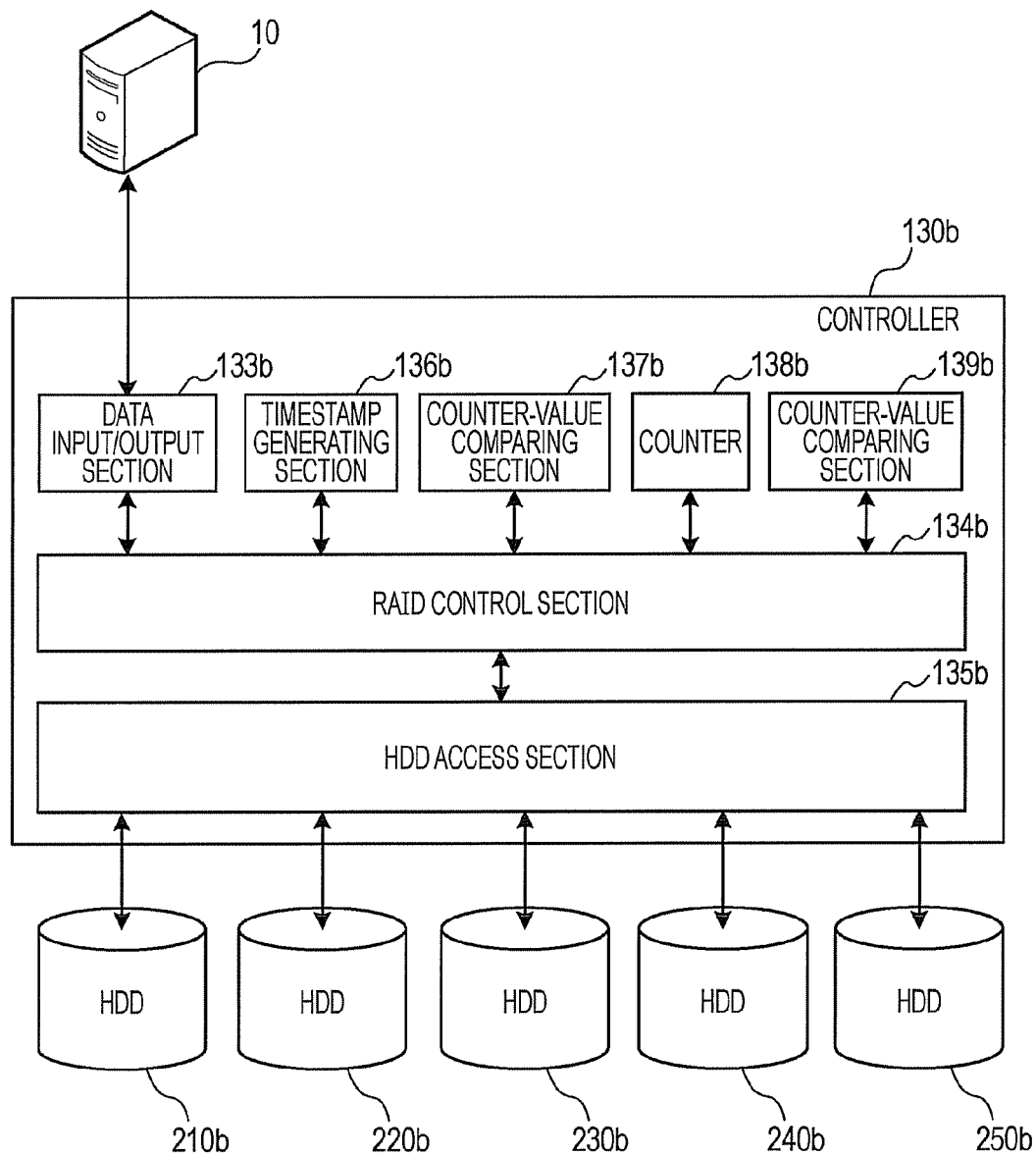
FIG. 34 illustrates the function of a controller in the third embodiment.

FIG. 34 is a block diagram illustrating the function of a controller in the third embodiment. A controller 130b includes a data input/output section 133b, a RAID control section 134b, a HDD access section 135b, a timestamp generating section 136b, a timestamp comparing section 137b, a counter 138b, and a counter-value comparing section 139b. The functions of the data input/output section 133b, the HDD access section 135b, the timestamp generating section 136b, and the timestamp comparing section 137b are analogous to those having the same names in the first embodiment illustrated in FIG. 9. The functions of the counter 138b and the counter-value comparing section 139b are analogous to those having the same names in the second embodiment illustrated in FIG. 31.

In response to an access request, the RAID control section 134b performs access control on HDDs 210b, 220b, 230b, 240b, and 250b, which use a RAID technology. In the present embodiment, it is assumed that the RAID control section 134b performs access control based on RAID 5. In order to perform access control based on RAID 5, the RAID control section 134b manages logical-block and physical-block association relationships as shown in FIG. 8. The RAID control section 134b identifies a physical block corresponding to a logical block specified by the access request and a HDD having the physical block, and outputs, to the HDD access section 135b, an access instruction corresponding to the access request.

For generation of a new logical disk, the RAID control section 134b initializes the comparison-information storage areas for physical blocks associated with logical blocks on the logical disk. In the initialization processing, all flags are set to "0", all counter values are set to "0", and all timestamps are set to "0". After initializing the comparison-information storage areas in all HDDs 210b, 220b, 230b, 240b, and 250b, the RAID control section 134b performs reading from the areas to ensure that writing is properly performed.

When the access request is a write request, the RAID control section 134b obtains comparison information from the counter 138b. Specifically, in response to a write request, the RAID control section 134b reads, in conjunction with the comparison information, data in a physical block for a corresponding data block to which writing is to be performed. The RAID control section 134b also reads, in conjunction with the comparison information, parity data in a physical block corresponding to a parity block in the same parity group as that of the data block to which the writing is to be performed. The RAID control section 134b then transfers, to the counter 138b, the counter value contained in the comparison information added to the read data. In response, an updated counter value is sent back from the counter 138b. The RAID control section 134b then sets the flag for the obtained counter value to "0" and adds the flag and the counter value to parity data corresponding to data to be written. When the access request is a write request, the RAID control section 134b obtains a timestamp from the timestamp generating section 136b. The RAID control section 134b then adds the obtained timestamp to the data to be written. During this processing, the timestamp of the parity data is not updated.

When the access request is a read request, the RAID control section 134b extracts a flag from the comparison information added to the read data and a flag from the comparison information added to parity data in the parity group to which the data belongs. On the basis of the flags of the read data and parity data, the RAID control section 134b determines information used for checking for a write-related loss. The RAID control section 134b then uses either the timestamps or the counter values to determine the presence/absence of a write-related loss. When no write-related loss exists, the RAID control section 134b transfers the read data to the data input/output section 133b as a response to the read request.

Upon determining that a write-related loss exists, the RAID control section 134b performs processing for restoring the data. The RAID control section 134b then transfers the restored data to the data input/output section 133b as a response to the read request.

Processing performed by the controller 130b in response to a write request and a read request from the host computer 10 will be described below in detail. It is also assumed, in the third embodiment, that access for each block and access for each stripe are possible. Thus, processing for a write request and processing for a read request are described with respect to both access for each block and access for each stripe.

Figure 35:
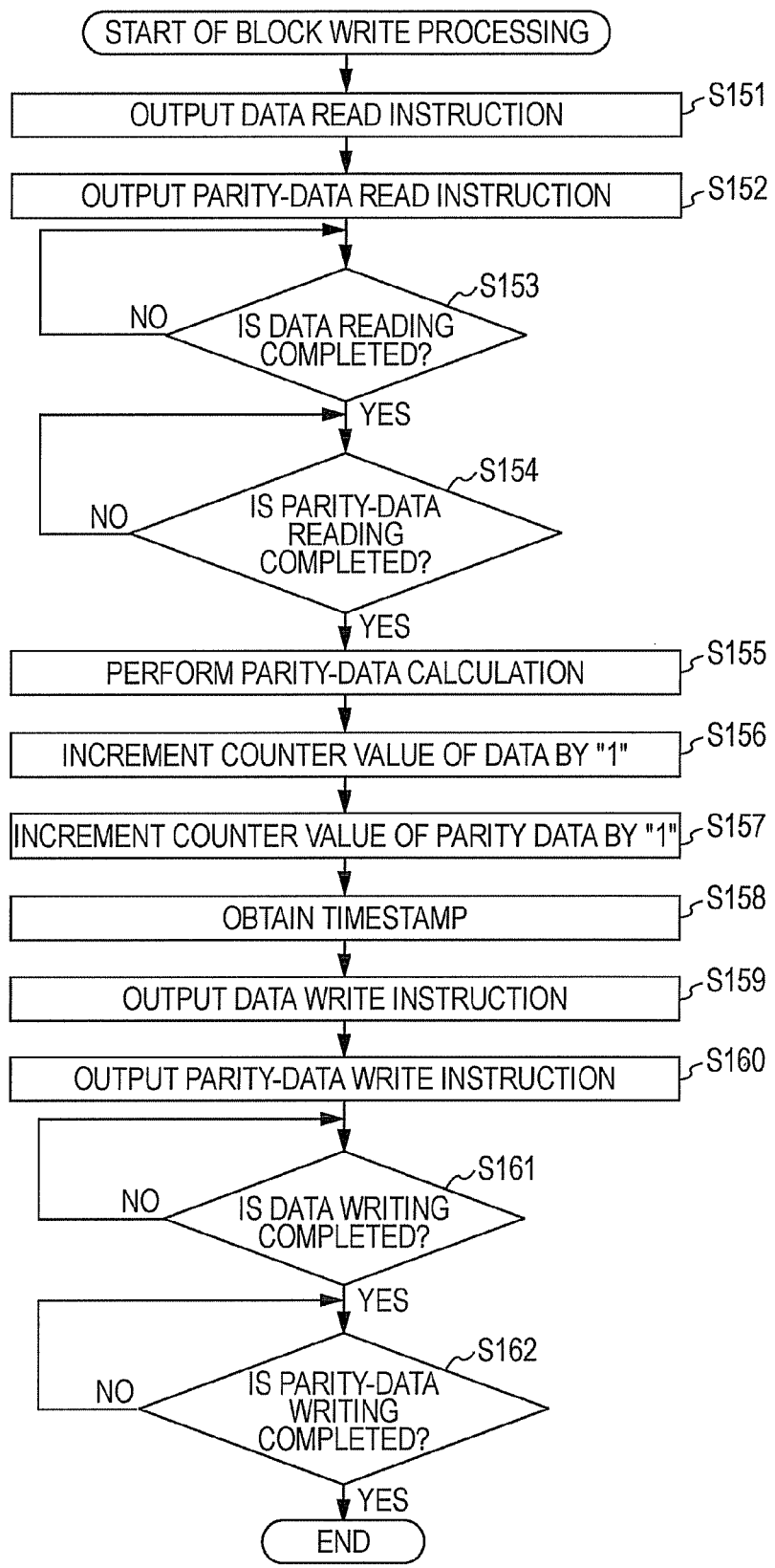
FIG. 35 is a flowchart of a procedure of block write processing in the third embodiment.

FIG. 35 is a flowchart of a procedure of block write processing in the third embodiment. The processing illustrated in FIG. 35 will now be described along with step numbers. This processing is executed when a request for writing data for each block is input from the host computer 10.

In step S151, the RAID control section 134b outputs, to the HDD access section 135b, an instruction for reading data corresponding to the write request. The HDD access section 135b then reads the data in a specified physical block.

In step S152, the RAID control section 134b outputs, to the HDD access section 135b, an instruction for reading parity data corresponding to the write request. In response, the HDD access section 135b reads the parity data in a specified physical block.

In step S153, the RAID control section 134b determines whether or not the data reading is completed. When the data reading is completed, the process proceeds to step S154. When the data reading is not completed, the processing in step S153 is repeated and the RAID control section 134b enters a state for waiting for the data reading.

In step S154, the RAID control section 134b determines whether or not the parity-data reading is completed. When the parity-data reading is completed, the process proceeds to step S155. When the parity-data reading is not completed, the processing in step S154 is repeated and the RAID control section 134b enters a state for waiting for the parity-data reading.

Upon determining that the data reading is completed in steps S153 and the parity-data reading is completed in S154, the RAID control section 134b creates a data-to-be-processed table in the RAM and stores the read data and parity data in the data-to-be-processed table.

In step S155, the RAID control section 134b calculates parity data.

In step S156, the RAID control section 134b counts up the counter value of the data. Specifically, the RAID control section 134b extracts the counter value from the comparison information added to the data read in step S151 and sends the counter value to the counter 138b. The counter 138b then increments the counter value by "1". The counter value is expressed by two bits, as in the second embodiment. When the counter value of the read data is "3", the counter value is updated to "0" by count-up. The counter 138b returns the count-up counter value to the RAID control section 134b. The RAID control section 134b sets "0" for a flag for the obtained counter value.

In step S157, the RAID control section 134b counts up the counter value of the parity data. Specifically, the RAID control section 134b extracts a counter value corresponding to the data read in step S151 from the comparison information added to the parity data read in step S152, and sends the extracted counter value to the counter 138b. In response, the counter 138b counts up the counter value and returns the resulting counter value to the RAID control section 134b. The RAID control section 134b sets "0" for a flag for the obtained counter value.

In step S158, the timestamp generating section 136b obtains a timestamp. Specifically, the RAID control section 134b issues a timestamp generation request to the timestamp generating section 136b. In response to the timestamp generation request, the timestamp generating section 136b generates a timestamp. The generated timestamp is sent from the timestamp generating section 136b to the RAID control section 134b.

In step S159, the RAID control section 134b outputs a data-block write instruction to the HDD access section 135b. Specifically, the RAID control section 134b adds comparison information to the update data specified by the write request. The added comparison information contains the counter value updated in step S156 and the timestamp obtained in step S158. The RAID control section 134b then specifies the disk number and the physical block number of a physical block for a corresponding data block to which the update data belongs, and outputs, to the HDD access section 135b, an instruction for writing the update data having the comparison information. In response to the write instruction, the HDD access section 135b writes the update data having the comparison information to the HDD corresponding to the specified disk number.

In step S160, the RAID control section 134b outputs a parity-data write instruction to the HDD access section 135b. Specifically, the RAID control section 134b specifies the disk number and the physical block number of a physical block for a corresponding parity block, and outputs, to the HDD access section 135b, an instruction for writing the parity data having the comparison information. The comparison information added in this case is the comparison information obtained as a result of the count-up of the counter value of the comparison information obtained during reading of the parity data. In response to the parity-data write instruction, the HDD access section 135b writes the parity data having the comparison information to the HDD corresponding to the specified disk number.

In step S161, the RAID control section 134b determines whether or not the data writing is completed. When the data writing is completed, the process proceeds to step S162. When the data writing is not completed, the processing in step S161 is repeated and the RAID control section 134b enters a state for waiting for the data writing.

In step S162, the RAID control section 134b determines whether or not the parity-data writing is completed. When the parity-data writing is completed, the block write processing ends. When the parity-data writing is not completed, the processing in step S162 is repeated and the RAID control section 134b enters a state for waiting for the parity-data writing.

Data writing for each block is performed as described above. It is assumed, for example, that a request for writing data to the data block with physical block number "D1" in the stripe illustrated in FIG. 33 is issued. In this case, data is read from a physical block for the corresponding data block with logical block number "D1" and parity data is read from a physical block for a corresponding parity block with logical block number "P1". The read data and parity data are stored in the data-to-be-processed table.

FIG. 36 illustrates an example of the data-to-be-processed table used when a write request is issued. When the data and parity data are read, a data-to-be-processed table 132f as illustrated in FIG. 36 is generated in the RAM. Information in the data-to-be-processed table 132f is updated in accordance with a write request.

FIG. 37 illustrates an example of the data-to-be-processed table after the update. As illustrated in FIG. 37, in the data-to-be-processed table 132f, the data d1 in the data block with logical block number "D1" is updated to data d1_1 specified by the write request. New parity data p1_1 is also determined based on the data d1_1. The parity data p1_1 is calculated by performing an XOR operation of the pre-update data d1, the pre-update parity data p1 and the data d1_1 to be written.

In this case, the counter value c1 added to the data d1 is counted up. The counter value after the count-up is represented by c1_1. The counter value c1_1 is c1+1, but when the counter value c1 is 3, the counter value c1_1 becomes 0.

Of the multiple counter values added to the parity data p1, c11 corresponding to the HDD in which the data d1 was stored is also counted up. The counter value after the count-up is assumed to be represented by c11_1. The counter value c11_1 is c11+1, but when the counter value c11 is 3, the counter value c11_1 becomes 0.

In addition, both flags for the updated counter values c1_1 and c11_1 are set to 0. In this case, setting both the flags to 0 means that the counter values are to be compared during write-related-loss check. That is, when the data and the parity data are properly written (without occurrence of a write-related loss), both flags are 0 during reading and it is thus determined that the counter values are to be compared.

The data and the parity data in the data-to-be-processed table 132f are written to corresponding physical blocks.

Processing for a write request for each stripe will be described next.

Figure 38:
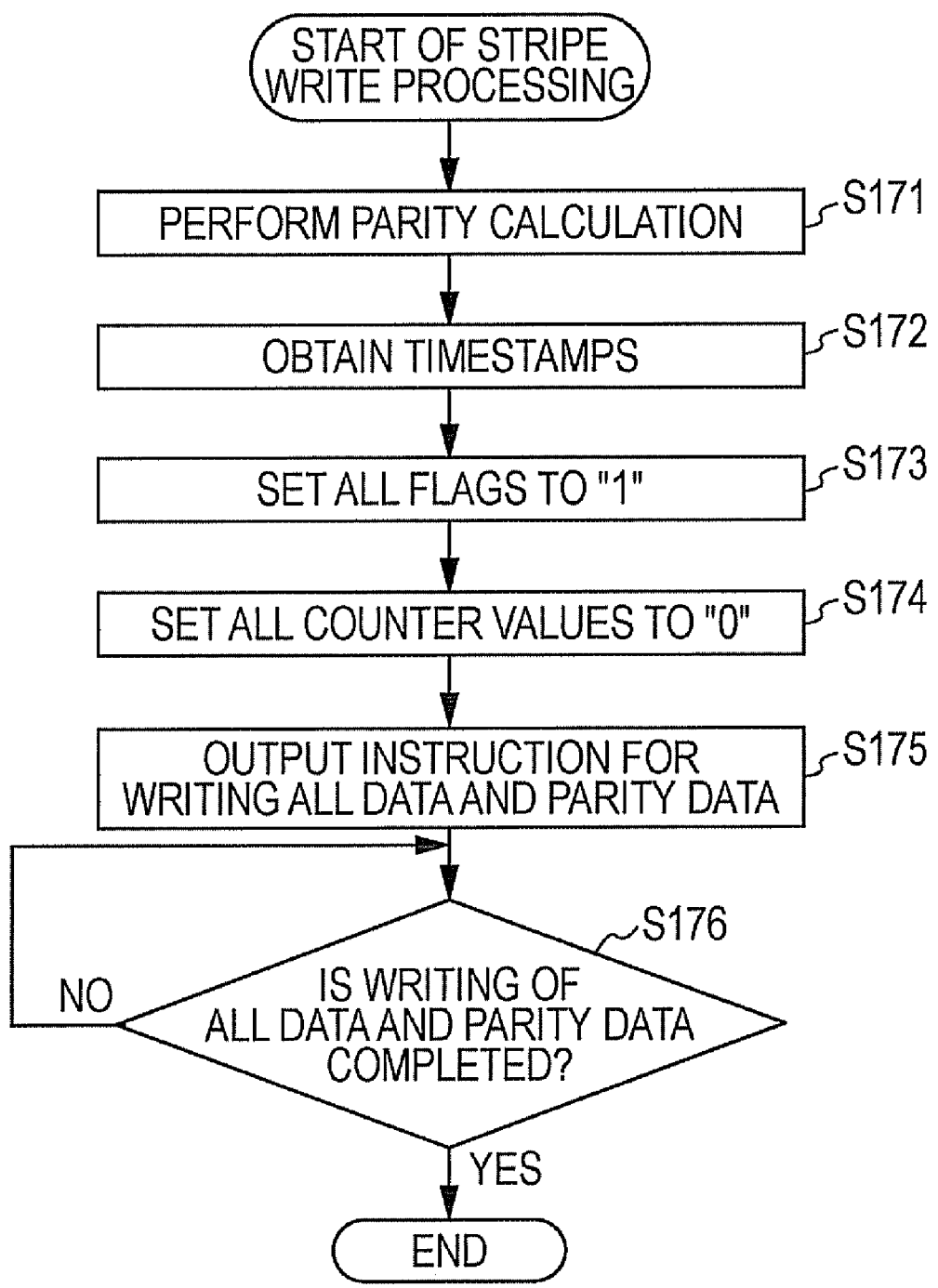
FIG. 38 is a flowchart of a procedure of stripe write processing in the third embodiment.

FIG. 38 is a flowchart of a procedure of stripe write processing in the third embodiment. The processing illustrated in FIG. 38 will now be described along with step numbers. This processing is executed when a request for writing data for each stripe is input from the host computer 10.

In step S171, the RAID control section 134b calculates parity data for each parity group. The RAID control section 134b then registers a logical block having the generated parity data as a parity block for the same parity block as that of the data blocks from which the parity data was generated.

In step S172, the RAID control section 134b obtains a timestamp from the timestamp generating section 136b.

In step S173, the RAID control section 134b sets all flags in the stripe to "1"

In step S174, the RAID control section 134b sets all counter values in the stripe to "0" (initial value).

In step S175, the RAID control section 134b outputs, to the HDD access section 135b, an instruction for writing data and parity data to all logical blocks in the stripe. In response to the write instruction, the HDD access section 135b writes timestamped update data and timestamped parity data to the corresponding specified physical blocks in the specified HDDs.

In step S176, the RAID control section 134b determines whether or not the all data and parity-data writing is completed. When the all data and parity-data writing is completed, the RAID control section 134b ends the stripe write processing. When writing to at least one HDD is not completed, the processing in step S176 is repeated and the RAID control section 134b enters a state for waiting for the writing.

The processing for data writing for each stripe is performed as described above. When the write processing is performed, the RAID control section 134b generates a data-to-be-processed table in the RAM and sets timestamps, flags, and counter values in the data-to-be-processed table.

FIG. 39 illustrates an example of the data-to-be-processed table for the stripe writing. In a data-to-be-processed table 132g generated during stripe writing, timestamps t1_2 having the same value are set for all data and parity data. The flags for all counter values are set to "1". Setting all flags to "1" means that the timestamps are to be compared during write-related-loss check. That is, when the data and the parity data m are properly written (without occurrence of a write-related loss), both flags are "1" during reading and it is thus determined that the timestamps are to be compared. The initial value "0" is set for all counter values.

Read processing will be described next in detail.

Figure 40:
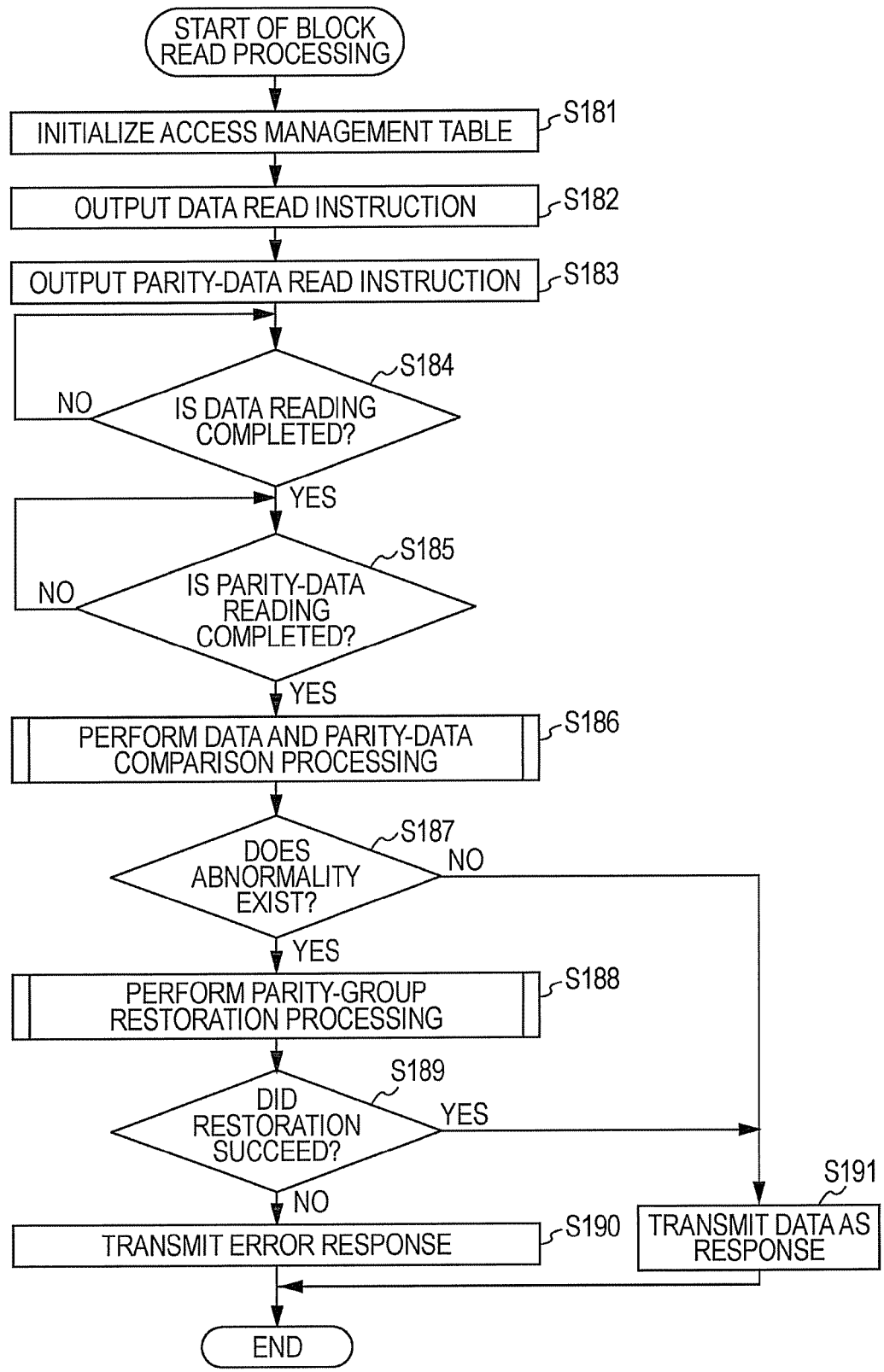
FIG. 40 is a flowchart of a procedure of block read processing.

FIG. 40 is a flowchart of a procedure of block read processing. The processing illustrated in FIG. 40 will now be described along with step numbers. This processing is executed when a request for reading data for each block is input from the host computer 10.

In step S181, the RAID control section 134b initializes an access management table for a parity group to which a logical block to be accessed belongs. The access management table is a data table for registering the presence/absence of a write-related data loss for each logical block. In initialization processing of the access management table, "undefined (null)" is set as information indicating the presence/absence of a write-related loss for each logical block belonging to the parity group.

In step S182, the RAID control section 134b outputs, to the HDD access section 135b, an instruction for reading data in a physical block to which data is to be written, so as to correspond to the write request.-{ }- The HDD access section 135b then reads the data in a specified physical block.

In step S183, the RAID control section 134b outputs, to the HDD access section 135b, an instruction for reading parity data in a physical block for a corresponding parity block. In response to the read instruction, the HDD access section 135b reads the parity data in the specified physical block.

In step S184, the RAID control section 134b determines whether or not the data reading is completed. When the data reading is completed, the process proceeds to step S185. When the data reading is not completed, the processing in step S184 is repeated and the RAID control section 134b enters a state for waiting for the data reading.

In step S185, the RAID control section 134b determines whether or not the parity-data reading is completed. When the parity-data reading is completed, the process proceeds to step S186. When the parity-data reading is not completed, the processing in step S185 is repeated and the RAID control section 134b enters a state for waiting for the parity-data reading.

When the data reading and the parity-data reading are completed, the RAID control section 134b creates a data-to-be-processed table in the RAM 132 and stores the read data and parity data in the data-to-be-processed table.

In step S186, the RAID control section 134b performs data and parity-data comparison processing. In the comparison processing, the presence/absence of an abnormality is determined. Details of the comparison processing are described below (with reference to FIG. 46).

In step S187, the RAID control section 134b determines whether or not the result of the comparison processing performed in step S186 indicates an abnormality. When no abnormality exists, the process proceeds to step S191. When an abnormality exists, the process proceeds to step S188.

In step S188, the RAID control section 134b performs parity-group restoration processing. The result of the restoration processing is reflected in the access management table. Thus, referring to the access table makes it possible to determine whether or not the restoration succeeded. Details of the restoration processing are described below (with reference to FIGS. 48A to 48D).

In step S189, the RAID control section 134b determines whether or not the parity-group restoration succeeded. When restoration of at least one piece of data failed, the RAID control section 134b determines that the parity-data restoration fails. When the restoration succeeds, the process proceeds to step S191. When the restoration fails, the process proceeds to step S190.

In step S190, the RAID control section 134b transmits an error response to the host computer 10. Thereafter, the block read processing ends.

In step S191, the RAID control section 134b transmits the data in the parity group to the host computer 10 as a response. Thereafter, the block read processing ends.

The block read processing is performed as described above. It is now assumed that a data read request specifying the logical block with logical block number "D1" in the stripe illustrated in FIG. 39 is issued. In this case, the access management table for the parity group to which the logical block with logical block number "D1" belongs is initialized.

FIG. 41 illustrates an example of the initialized access management table. An access management table 132h has a logical-block-number column and a status column. In the logical-block-number column, the logical block numbers of logical blocks belonging to the parity group to be processed are set.

In the status column, the statuses of the logical blocks are set. The status includes "null", "OK", "error", and "restored". The status "null" indicates that write-related-loss check has not been performed. The status "OK" indicates that it is determined by the write-related-loss check that no write-related loss exists. The status "error" indicates that it is determined by the write-related-loss check that a write-related loss exists. The status "restored" indicates that data having a write-related loss has been restored.

The parity group to which the logical block with logical block number "D1" belongs includes, in addition to the logical block, logical blocks with logical block numbers D5, D9, D13, and P1. Thus, in the status column in the access management table 132h, the logical block numbers of the logical blocks are set. In the access management table 132h, the statuses of all logical blocks are set to "null" upon initialization.

Thereafter, data corresponding to the read request and parity data corresponding to the data are read and are registered in the data-to-be-processed table. The contents of the data-to-be-processed table in this case are the same as those illustrated in FIG. 36. Thereafter, comparison processing is performed on the read data and parity data.

Before a description of a procedure of the comparison processing is given, time-series-information (flags, counter values, and timestamps) generation patterns resulting from a difference in a writing system will be described with reference to FIGS. 42 to 45. In the following example, attention is given to an arbitrary data block and a parity block contained in one parity group. A description is given of what pattern of the time-series information can be generated for a case in which writing using the same writing system continues and a case in which writing systems are switched.

An ECC can confirm that writing to each block is an atomic operation (i.e., integrated processing). That is, when only part of data, a flag, a counter value, and a timestamp is written and a write-related loss occurs in other information, the HDD access section 135b can detect the write-related loss by ECC checking. Thus, a write-related loss occurs in the combination of the time-series information and data or in the combination of the time-series information of parity data. In other words, write-related partial losses, such as only flag loss and only counter-value loss, are not considered.

A write-related loss is a rare event. Thus, it is assumed that all writing before an assumed write-related loss occurs is properly performed. For example, performing an operation so that logical-block reading is periodically performed makes it possible to significantly reduce the possibility that write-related loss is repeatedly occurs in a logical block in which a write-related loss has already occurred. In addition, since a write-related loss is a rare event, it is also assumed that a write-related loss occurs in either one of a data block and a parity block that are processed in response to one write request.

For such a reason, the time-series-information generation pattern, in most cases, corresponds to any of 12 patterns illustrated in FIGS. 42 to 45.

FIG. 42 illustrates time-series-information generation patterns when block writing continues. Specifically, FIG. 42 illustrates time-series-information generation patterns that can occur when block writing is properly executed and then block writing is further performed. FIG. 42 illustrates, of the flags and the counter values added to a parity block, only the flag and the counter value corresponding to a data block to which data is already written (the same applies to FIGS. 43 to 45).

When the previous block writing is properly performed, both the flag for a data block (a logical block D) and the flag for a parity block (a logical block P) are "0". The counter value of the data block and the counter value of the parity block have the same value. In the example of FIG. 42, both counter values are "1". Time T1 indicating block-writing time is set for the timestamp for the data block. On the other hand, time Tx at which stripe writing was performed last time is still set for the timestamp for the parity block.

Figure 45:
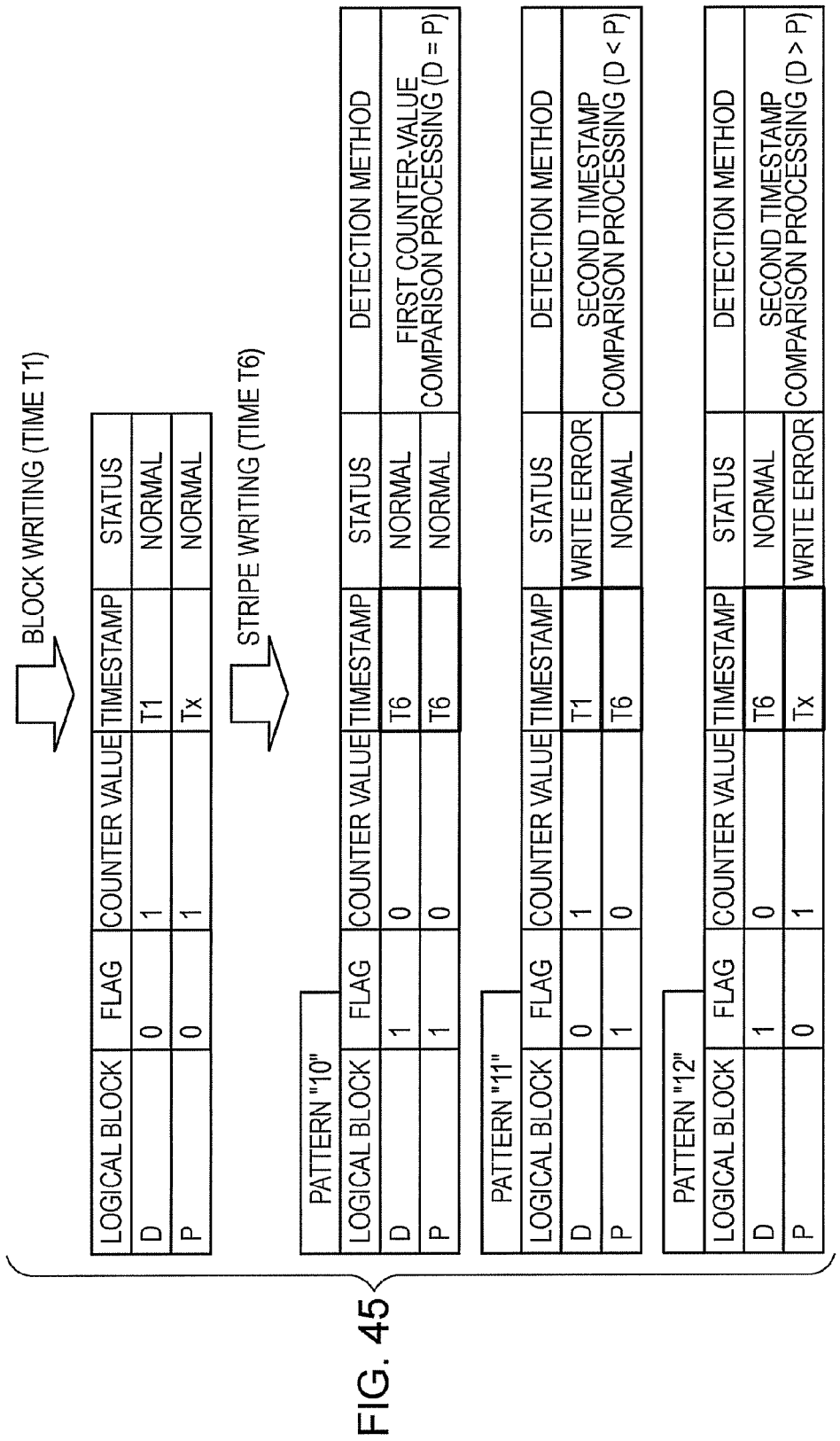
FIG. 45 illustrates time-series-information generation patterns when stripe writing is performed after block writing.

In FIG. 42, the status of the logical block on which block writing was executed properly (i.e., without occurrence of a write-related loss) is expressed as "normal" and the status of the logical block in which a write-related loss occurred is expressed by "write error" (the same applies to FIGS. 43 to 45).

When a block write request is issued for the logical block on which the block writing was properly executed, time-series-information patterns 1 to 3 can occur.

Pattern 1 occurs when writing was properly performed on both the data block and the parity block. In this case, the counter values of both logical blocks are counted up. In the example of FIG. 42, both counter values are updated to "2". The timestamp for the data block is also updated to subsequent block-writing time T2. In this case, first counter-value comparison processing, which is described below, is performed as write-related-loss detection processing.

Pattern 2 occurs when writing for the parity block is properly performed and a write-related loss occurs in the data block. In this case, only the counter value of the parity block is counted up. In the example of pattern 2, the counter value of the parity block is updated to "2", but the counter value of the data block is still "1". The timestamps of both the data block and the parity block are not changed. In this case, the first counter-value comparison processing, which is described below, is performed as write-related-loss detection processing.

Pattern 3 occurs when writing for the data block is properly performed and a write-related loss occurs in the parity block. In this case, only the counter value of the data block is counted up. In the example of pattern 3, the counter value of the data block is updated to "2", but the counter value of the parity block is still "1". The timestamp for the data block is also updated to subsequent block-writing time T2. In this case, the first counter-value comparison processing, which is described below, is performed as write-related-loss detection processing.

Thus, in patterns 1 to 3, it is possible to detect a write-related loss through comparison of the counter values.

FIG. 43 illustrates time-series-information generation patterns when stripe writing continues. Specifically, FIG. 43 illustrates time-series-information generation patterns that can occur when stripe writing is properly executed and then stripe writing is further performed.

When the previous stripe writing is properly performed, both the flag for the data block and the flag for the parity block are "1". Both the counter value of the data block and the counter value of the parity block are "0". Time T3 indicating time at which the stripe writing was performed is set for the timestamps for the data block and the parity block.

When a stripe write request is issued for a logical block on which the stripe writing was properly executed, time-series-information patterns 4 to 6 can occur.

Pattern 4 occurs when writing was properly performed on both the data block and the parity block. In this case, the timestamps for both the logical blocks are updated to subsequent stripe-writing time T4. In this case, first timestamp comparison processing, which is described below, is performed as write-related-loss detection processing.

Pattern 5 occurs when writing for the parity block is properly performed and a write-related loss occurs in the data block. In this case, only the timestamp for the parity block is updated to subsequent stripe-writing time T4. In this case, the first timestamp comparison processing, which is described below, is performed as write-related-loss detection processing.

Pattern 6 occurs when writing for the data block is properly performed and a write-related loss occurs in the parity block. In this case, only the timestamp for the data block is updated to subsequent stripe-writing time 14. In this case, the first timestamp comparison processing, which is described below, is performed as write-related-loss detection processing.

Thus, in patterns 4 to 6, it is possible to detect a write-related loss through comparison of the timestamps.

FIG. 44 illustrates time-series-information generation patterns when block writing is performed after stripe writing. Specifically, FIG. 44 illustrates time-series-information generation patterns that can occur when stripe writing is properly executed and then block writing is further performed. The statuses after the stripe writing are the same as the statuses illustrated in FIG. 43.

When a block write request is issued for the logical block on which the stripe writing was properly executed, time-series-information patterns 7 to 9 can occur.

Pattern 7 occurs when writing was properly performed on both the data block and the parity block. In this case, the flags for both logical blocks are changed to "0". The counter values of both logical blocks are also counted up. In the example of pattern 7, both counter values are updated to "1". The timestamp for the data block is also updated to subsequent block-writing time 15. In this case, the first counter-value comparison processing, which is described below, is performed as write-related-loss detection processing.

Pattern 8 occurs when writing for the parity block is properly performed and a write-related loss occurs in the data block. In this case, the flag for the parity block is changed to "1". Only the counter value of the parity block is also counted up. In the example of pattern 8, the counter value of the parity block is updated to "1", but the counter value of the data block remains to be "0". The timestamps of both the data block and the parity block are not changed. In this case, second timestamp comparison processing and second counter-value comparison processing, which are described below, are performed as write-related-loss detection processing.

Pattern 9 occurs when writing for the data block is properly performed and a write-related loss occurs in the parity block. In this case, only the counter value of the data block is counted up. In the example of pattern 9, the counter value of the data block is updated to "1", but the counter value of the parity block is "0". The timestamp for the data block is also updated to subsequent block-writing time T5. In this case, the second timestamp comparison processing, which is described below, is performed as write-related-loss detection processing.

In the manner described above, the flags do no mach each other in patterns 8 and 9. In this case, comparison of the timestamps makes it possible to detect a write-related loss as in pattern 9. When the timestamps match each other, comparison of the counter values makes it possible to detect a write-related loss as in pattern 8.

FIG. 45 illustrates time-series-information generation patterns when stripe writing is performed after block writing. Specifically, FIG. 45 illustrates time-series-information generation patterns that can occur when block writing is properly executed and then stripe writing is further performed. The statuses after the block writing are the same as the statuses illustrated in FIG. 42.

When a stripe write request is issued for the logical block on which the block writing was properly executed, time-series-information patterns 10 to 12 can occur.

Pattern 10 occurs when writing was properly performed on both the data block and the parity block. In this case, the flags for both logical blocks are changed to "1" and the counter values therefor are initialized to "0". The timestamps for both the logical blocks are updated to subsequent stripe-writing time 16. In this case, the first counter-value comparison processing, which is described below, is performed as write-related-loss detection processing.

Pattern "11" occurs when writing for the parity block is properly performed and a write-related loss occurs in the data block. In this case, the flag for the parity block is changed to "1" and the counter value therefor is initialized to "0". Only the timestamp for the parity block is updated to subsequent stripe-writing time T6. In this case, the second timestamp comparison processing, which is described below, is performed as write-related-loss detection processing.

Pattern "12" occurs when writing for the data block is properly performed and a write-related loss occurs in the parity block. In this case, the flag for the data block is changed to "1" and the counter value therefor is initialized to "0". Only the timestamp for the data block is also updated to subsequent stripe-writing time 16. In this case, the second timestamp comparison processing, which is described below, is performed as write-related-loss detection processing.

In the manner described above, the flags do no mach each other in patterns 11 and 12. In this case, comparison of the timestamps makes it possible to detect a write-related loss.

Procedures for processing for detecting a write-related loss in patterns as illustrated in FIGS. 42 to 45 are described next in detail.

Figure 46:
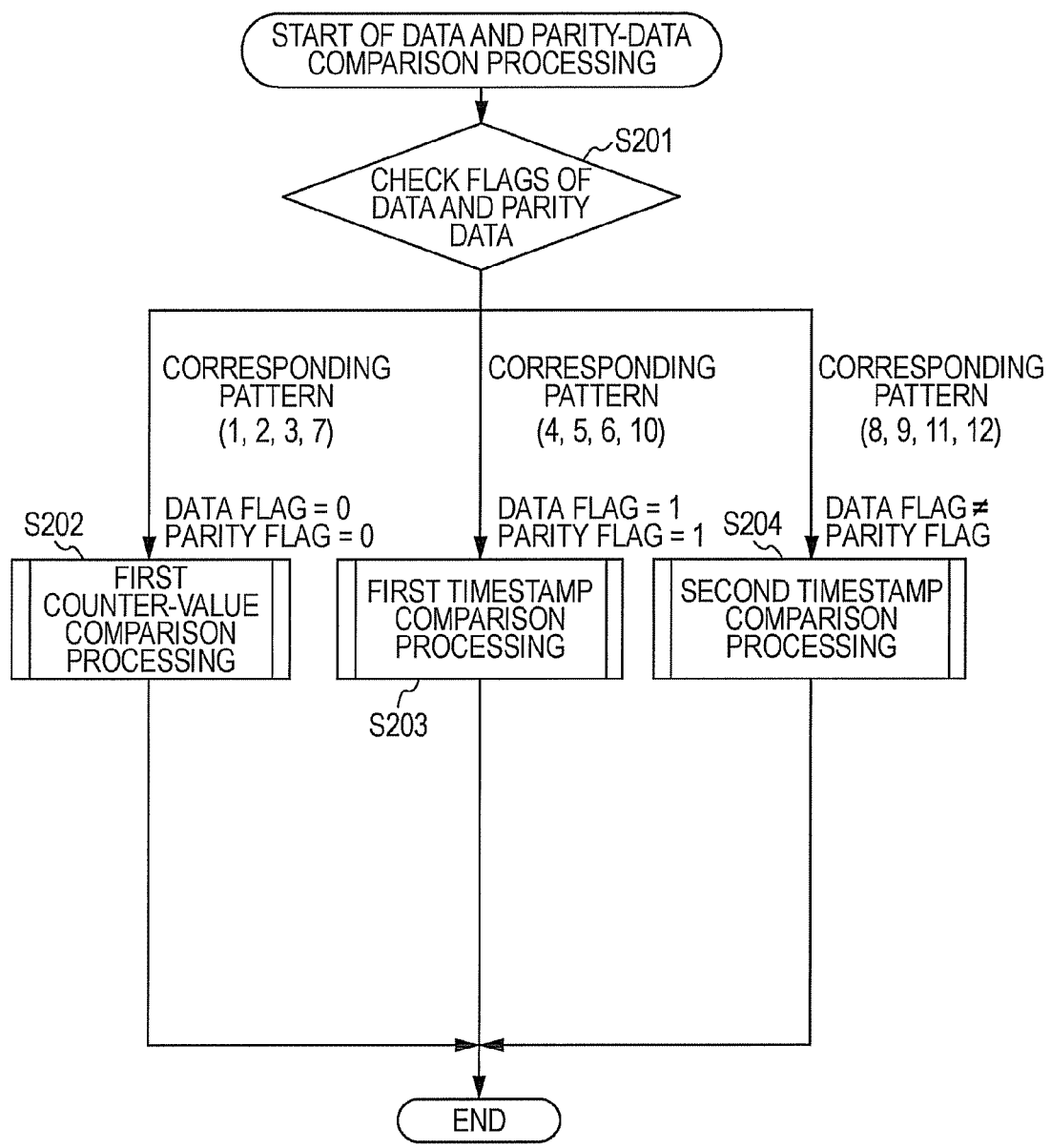
FIG. 46 is a flowchart of a procedure of data and parity-data comparison processing.

FIG. 46 is a flowchart of a procedure of the data and parity-data comparison processing. The processing illustrated in FIG. 46 will now be described along with step numbers.

In step S201, the RAID control section 134b checks the flags of data and parity data. Specifically, the RAID control section 134b obtains a flag "f1" of a counter value #1 "c1" added to data d1 in the data-to-be-processed table 132f and a flag "f11" of a counter value #1 "c11" added to parity data p1. The RAID control section 134b then splits the processing in accordance with the values of the flags. When the flag of the data is "0" and the flag of the parity data is "0", the process proceeds to step S202. When the flag of the data is "1" and the flag of the parity data is "1", the process proceeds to step S203. When the flag of the data is "1" and the flag of the parity data is "0" or when the flag of the data is "0" and the flag of the parity data is "1", the process proceeds to step S204.

When both flags of the data and the parity data are "0", in step S202, the counter-value comparing section 139b executes the first counter-value comparison processing. A case in which both flags of the data and the parity data are "0" corresponds to patterns 1, 2, 3, and 7. Details of the first counter-value comparison processing are described below (with reference to FIG. 47). After step S202, the data and parity-data comparison processing ends.

When both flags of the data and the parity data are "1", in step S203, the timestamp comparing section 137b executes the first timestamp comparison processing. A case in which both flags of the data and the parity data are "1" corresponds to patterns 4, 5, 6, and 10. Details of the first timestamp comparison processing are described below (with reference to FIG. 49). After step S203, the data and parity-data comparison processing ends.

When the flags of the data and the parity do not mach each other, in step S204, the timestamp comparing section 137b executes the second timestamp comparison processing. A case in which the flags of the data and the parity data do not mach each other corresponds to patterns 8, 9, 11, and 12. Details of the second timestamp comparison processing are described below (with reference to FIG. 50). Thereafter, the data and parity-data comparison processing ends.

Details of the comparison processing will now be described next.

Figure 47:
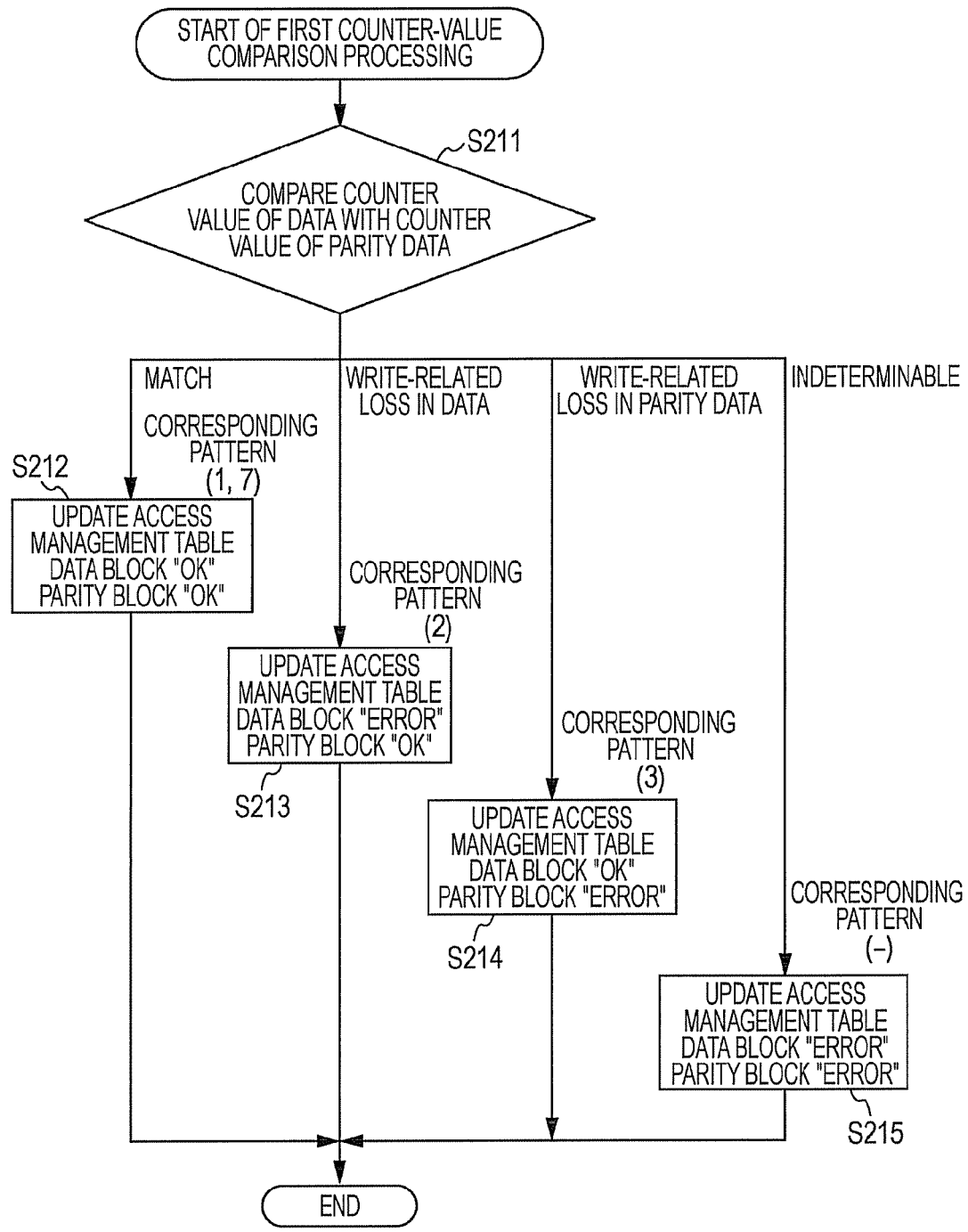
FIG. 47 is a flowchart of a procedure of first counter-value comparison processing.

FIG. 47 is a flowchart of a procedure of the first counter-value comparison processing. The processing illustrated in FIG. 47 will now be described along with step numbers.

In step S211, the counter-value comparing section 139b compares the counter value of the data with the counter value of the parity data. When the counter values match each other, the counter-value comparing section 139b determines that no write-related loss exists and the process proceeds to step S212. A case in which the counter values match each other corresponds to patterns 1 and 7.

When the counter value of the parity data is advanced by "1", the counter-value comparing section 139b determines that a write-related loss exists in the data and the process proceeds to step S213. A case in which the counter value of the parity data is advanced corresponds to pattern 2. When the counter value of the data is advanced by "1", the counter-value comparing section 139b determines that a write-related loss exists in the parity data and the process proceeds to step S214. A case in which the counter value of the data is advanced corresponds to pattern 3.

When the difference between the counter values is 2, the counter-value comparing section 139b determines that the determination cannot be made and the process proceeds to step S215. The patterns illustrated in FIGS. 42 to 45 are not aimed for a case in which a write-related loss occurs in the same logical block repeatedly. Thus, patterns 1 to 12 do not include a pattern in which the difference between the counter values is 2.

In step S212, the counter-value comparing section 139b changes, in the access management table 132h, the status of the data block for the compared data to "OK". The counter-value comparing section 139b also changes the status of the parity block for the compared parity data to "OK". Thereafter, the first counter-value comparison processing ends.

In step S213, the counter-value comparing section 139b changes, in the access management table 132h, the status of the data block for the compared data to "error". The counter-value comparing section 139b also changes the status of the parity block for the compared parity data to "OK". Thereafter, the first counter-value comparison processing ends.

In step S214, the counter-value comparing section 139b changes, in the access management table 132h, the status of the data block for the compared data to "OK". The counter-value comparing section 139b also changes the status of the parity block for the compared parity data to "error". Thereafter, the first counter-value comparison processing ends.

In step S215, the counter-value comparing section 139b changes, in the access management table 132h, the status of the data block for the compared data to "error". The counter-value comparing section 139b also changes the status of the parity block for the compared parity data to "error". Thereafter, the first counter-value comparison processing ends.

The contents of the access management table 132h are updated in accordance with the result of the comparison of the counter values, as described above.

FIGS. 48A to 48D each illustrate an access management table after the first counter-value comparison processing is executed. In FIGS. 48A to 48D, the status of the data block with logical block number "D1" and the status of the parity block with logical block number "P1" are updated.

FIG. 48A illustrates the contents of the access management table 132h when the counter values match each other. As a result of the match of the counter values, both the status of the data block and the status of the parity block become "OK". FIG. 48B illustrates the contents of the access management table 132h when a write-related data loss is detected. As a result of detection of the write-related data loss, the status of the data block becomes "error" and the status of the parity block becomes "OK". FIG. 48C illustrates the contents of the access management table 132h when a write-related parity-data loss is detected. As a result of detection of the write-related parity-data loss, the status of the data block becomes "OK" and the status of the parity block becomes "error". FIG. 48D illustrates the contents of the access management table 132h when the determination cannot be made. Since the determination cannot be made, both the status of the data block and the status of the parity block become "error".

FIG. 49 is a flowchart of a procedure of the first timestamp comparison processing. The processing illustrated in FIG. 49 will now be described along with step numbers.

In step S221, the timestamp comparing section 137b compares the timestamp of the data with the timestamp of the parity data. When the timestamps match each other, the timestamp comparing section 137b determines that no write-related loss exists and the process proceeds to step S222. A case in which the timestamps match each other corresponds to patterns 4 and 10.

When the value of the timestamp of the parity data is greater than the value of the timestamp of the data, the timestamp comparing section 137b determines that a write-related loss exists in the data and the process proceeds to step S223. A case in which the value of the timestamp of the parity data is greater corresponds to pattern 5. When the value of the timestamp of the data is greater than the value of the timestamp of the parity data, the timestamp comparing section 137b determines that a write-related loss exists in the parity data and the process proceeds to step S224. A case in which the value of the timestamp of the data is greater corresponds to pattern 6.

In step S222, the timestamp comparing section 137b changes, in the access management table 132h, the status of the data block for the compared data to "OK". The timestamp comparing section 137b also changes the status of the parity block for the compared parity data to "OK". Thereafter, the first timestamp comparison processing ends.

In step S223, the timestamp comparing section 137b changes, in the access management table 132h, the status of the data block for the compared data to "error". The timestamp comparing section 137b also changes the status of the parity block for the compared parity data to "OK". Thereafter, the first timestamp comparison processing ends.

In step S224, the timestamp comparing section 137b changes, in the access management table 132h, the status of the data block for the compared data to "OK". The timestamp comparing section 137b also changes the status of the parity block for the compared parity data to "error". Thereafter, the first timestamp comparison processing ends.

Figure 50:
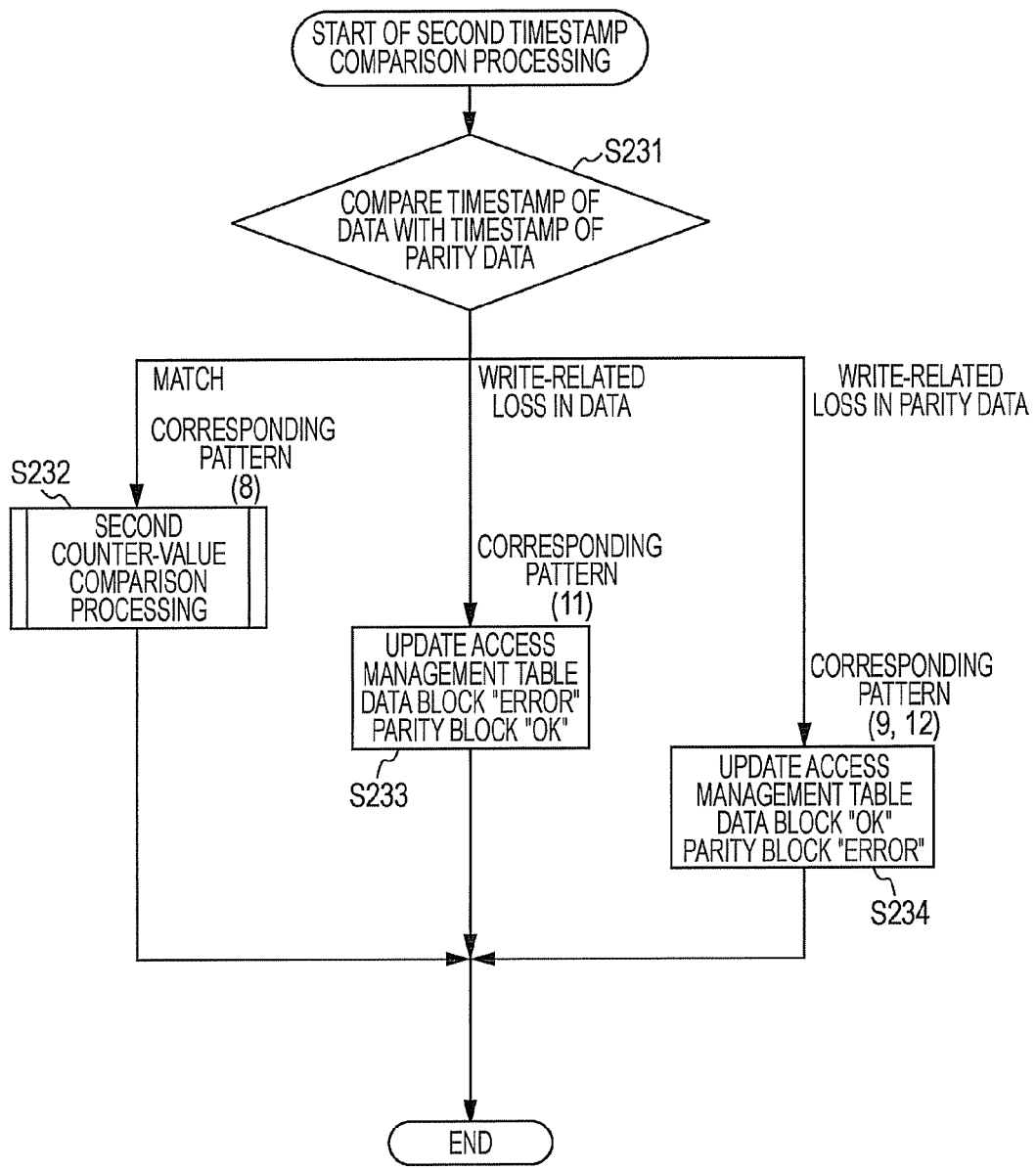
FIG. 50 is a flowchart of a procedure of second timestamp comparison processing.

FIG. 50 is a flowchart of a procedure of the second timestamp comparison processing. The processing illustrated in FIG. 50 will now be described along with step numbers.

In step S231, the timestamp comparing section 137b compares the timestamp of the data with the timestamp of the parity data. When the timestamps match each other, the timestamp comparing section 137b determines that no write-related loss exists and the process proceeds to step S232. A case in which the timestamps match each other corresponds to pattern 8. When the value of the timestamp of the parity data is greater than the value of the timestamp of the data, the timestamp comparing section 137b determines that a write-related loss exists in the data and the process proceeds to step S233. A case in which the value of the timestamp of the parity data is greater corresponds to pattern 11. When the value of the timestamp of the data is greater than the value of the timestamp of the parity data, the timestamp comparing section 137b determines that a write-related loss exists in the parity data and the process proceeds to step S234. A case in which the value of the timestamp of the data is greater corresponds to patterns 9 and 12.

In step S232, the counter-value comparing section 139b executes the second counter value comparison processing. Details of the second counter-value comparison processing are described below (with reference to FIG. 51). After step S232, the second timestamp comparison processing ends.

In step S233, the timestamp comparing section 137b changes, in the access management table 132h, the status of the data block for the compared data to "error". The timestamp comparing section 137b also changes the status of the parity block for the compared parity data to "OK". Thereafter, the second timestamp comparison processing ends.

In step S234, the timestamp comparing section 137b changes, in the access management table 132h, the status of the data block for the compared data to "OK". The timestamp comparing section 137b also changes the status of the parity block for the compared parity data to "error". Thereafter, the second timestamp comparison processing ends.

Figure 51:
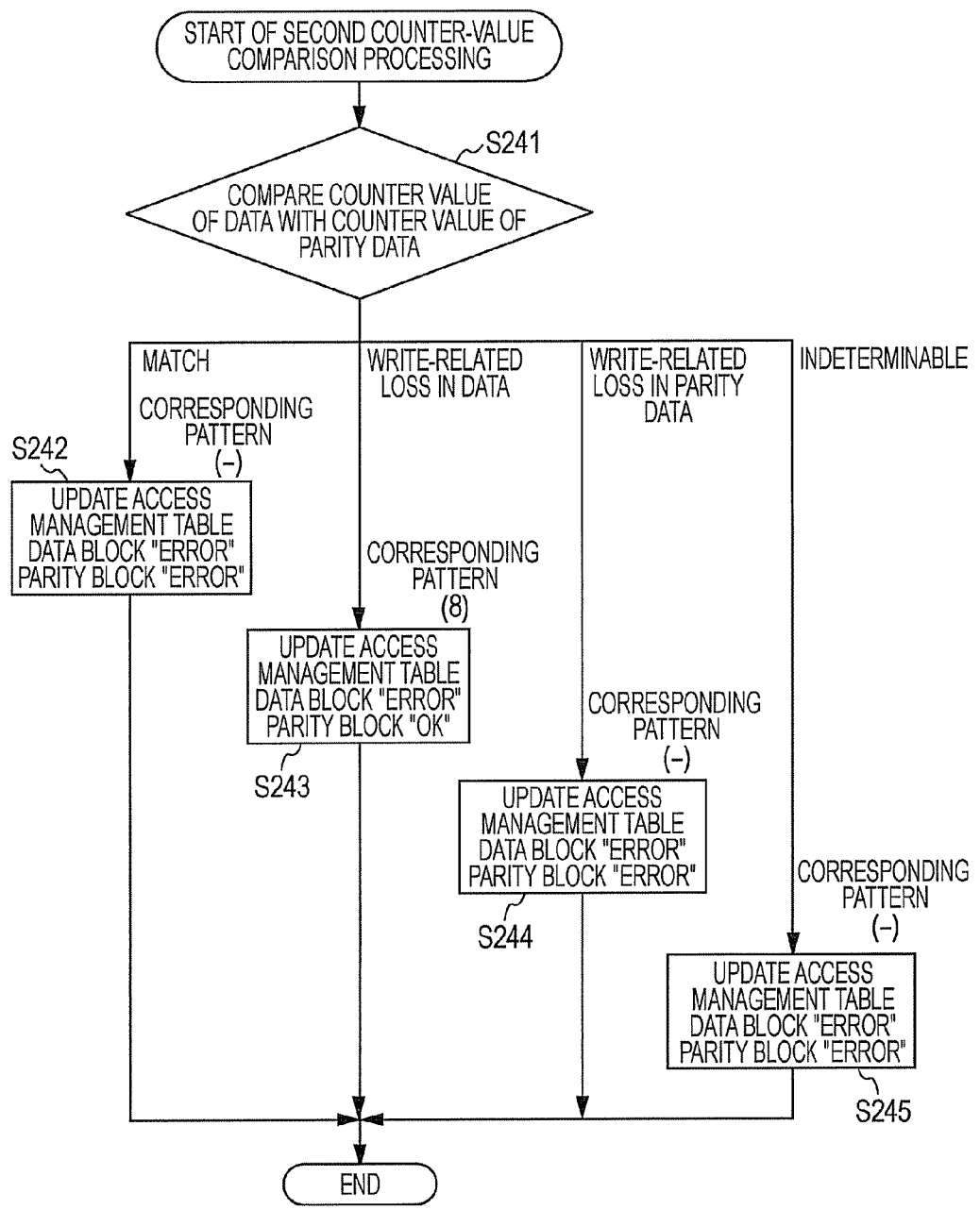
FIG. 51 is a flowchart of a procedure of second counter-value comparison processing.

FIG. 51 is a flowchart of a procedure of the second counter-value comparison processing. The processing illustrated in FIG. 51 will now be described along with step numbers.

In step S241, the counter-value comparing section 139b compares the counter value of the data with the counter value of the parity data. When the counter values match each other, the counter-value comparing section 139b determines that no write-related loss exists and the process proceeds to step S242. A pattern in which the counter values match each other in step S241 does not exist in the patterns illustrated in FIGS. 42 to 45.

When the counter value of the parity data is advanced by "1", the counter-value comparing section 139b determines that a write-related loss exists in the data and the process proceeds to step S243. A case in which it is determined in step S241 that the counter value of the parity data is advanced by "1" corresponds to pattern 8.

When the counter value of the data is advanced by "1", the counter-value comparing section 139b determines that a write-related loss exists in the parity data and the process proceeds to step S244. A pattern in which the counter values match each other in step S241 does not exist in the patterns illustrated in FIGS. 42 to 45.

When the difference between the counter values is 2, the counter-value comparing section 139b determines that the determination cannot be made and the process proceeds to step S245. A pattern in which the difference between the counter values is 2 in step S241 does not exist in the patterns illustrated in FIGS. 42 to 45.

In step S242, the counter-value comparing section 139b changes, in the access management table 132h, the status of the data block for the compared data to "error". The counter-value comparing section 139b also changes the status of the parity block for the compared parity data to "error". Thereafter, the second counter-value comparison processing ends.

In step S243, the counter-value comparing section 139b changes, in the access management table 132h, the status of the data block for the compared data to "error". The counter-value comparing section 139b also changes the status of the parity block for the compared parity data to "OK". Thereafter, the second counter-value comparison processing ends.

In step S244, the counter-value comparing section 139b changes, in the access management table 132h, the status of the data block for the compared data to "error". The counter-value comparing section 139b also changes the status of the parity block for the compared parity data to "error". Thereafter, the second counter-value comparison processing ends.

In step S245, the counter-value comparing section 139b changes, in the access management table 132h, the status of the data block for the compared data to "error". The counter-value comparing section 139b also changes the status of the parity block for the compared parity data to "error". Thereafter, the second counter-value comparison processing ends.

As described above, the write-related-loss check processing is performed and the result of the check processing is reflected in the access management table 132h. When a logical block whose status in the access management table 132h is "error" exists, the RAID control section 134b performs parity-group restoration processing. The parity-group restoration processing will be described below in detail.

Figure 52:
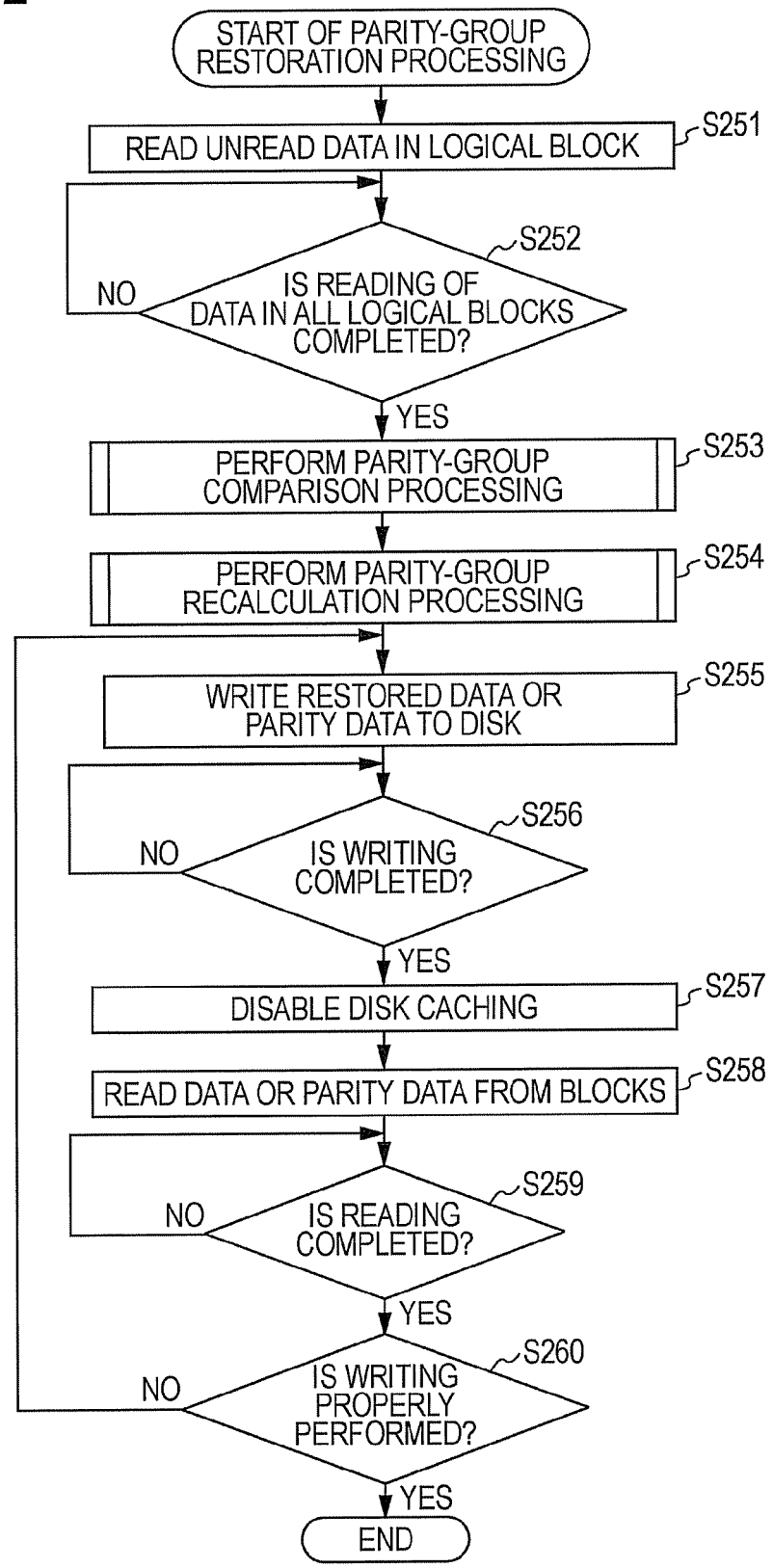
FIG. 52 is a flowchart of a procedure of parity-group restoration processing.

FIG. 52 is a flowchart of a procedure of the parity-group restoration processing. The processing illustrated in FIG. 52 will now be described along with step numbers.

In step S251, the RAID control section 134b reads, from corresponding physical blocks, unread data in the logical blocks in the parity group. That is, in steps S182 and S183 in the block read processing illustrated in FIG. 40, one piece of data and one piece of parity data have already been read in response to the read request. When a write-related loss is detected during the reading, an instruction for reading other data belonging to the same parity group as that of the data read in step S182 is issued to the HDD access section 135b. Consequently, the HDD access section 135b reads the other data from the HDDs.

In step S252, the RAID control section 134b determines whether or not the reading of the data in all logical blocks in the parity group to be restored is completed. When reading of the data in all logical block is completed, the process proceeds to step S253. When unread data exists, the processing in step S252 is repeated and the RAID control section 134b enters a state for waiting for the data reading.

In step S253, the RAID control section 134b performs parity-group comparison processing. In the parity-group comparison processing, write-related-loss check is also performed on the data read in step S251. Consequently, all data and parity data belonging to the parity group are checked for the presence/absence of a write-related loss and the result of the check is reflected in the access management table 132h. Details of the parity-group comparison processing are described below (with reference to FIG. 53).

In step S254, the RAID control section 134b performs parity-group recalculation processing. The parity-group recalculation processing is processing for recalculating data or parity data in the logical block whose status in the access management table 132h is "error". Details of the parity-group recalculation processing are described below (with reference to FIG. 54).

In step S255, the RAID control section 134b writes the restored data or parity data in the logical block(s) to physical block(s) corresponding to the logical block(s).

In step S256, the RAID control section 134b determines whether or not the writing in step S255 is completed. When the writing is completed, the process proceeds to step S257. When the writing is not completed, the processing in step S256 is repeated and the RAID control section 134b enters a state for waiting for the writing.

In step S257, the RAID control section 134b disables disk caching in the HDDs 210b, 220b, 230b, 240b, and 250b. This is because, if cached data is read in read processing in step S258 described below, whether or not the writing is properly executed cannot be checked.

In step S258, the RAID control section 134b reads the data or parity data from the physical blocks in which the restored data or parity data in the logical blocks are written.

In step S259, the RAID control section 134b determines whether or not the reading in step S258 is completed. When the reading is completed, the process proceeds to step S260. When the reading is not completed, the RAID control section 134b repeats the processing in step S259 and enters a state for waiting for the reading.

In step S260, the RAID control section 134b determines whether or not the writing in step S255 was properly performed. Specifically, the RAID control section 134b compares the data or parity data written in step S255 with the data or parity data read in step S258. When the result of the comparison indicates that the contents of the data or parity data match the contents of the corresponding data or parity data, it is determined that the writing was properly performed. When the result of the comparison indicates that the contents of the data or parity data do not match with the contents of the corresponding data or parity data, it is determined that the writing was not properly performed.

When the writing is not properly performed, the process returns to step S255 and the writing is performed again. On the other hand, when the writing is properly performed, the parity-group restoration processing ends.

Details of the parity-group comparison processing will now be described next.

Figure 53:
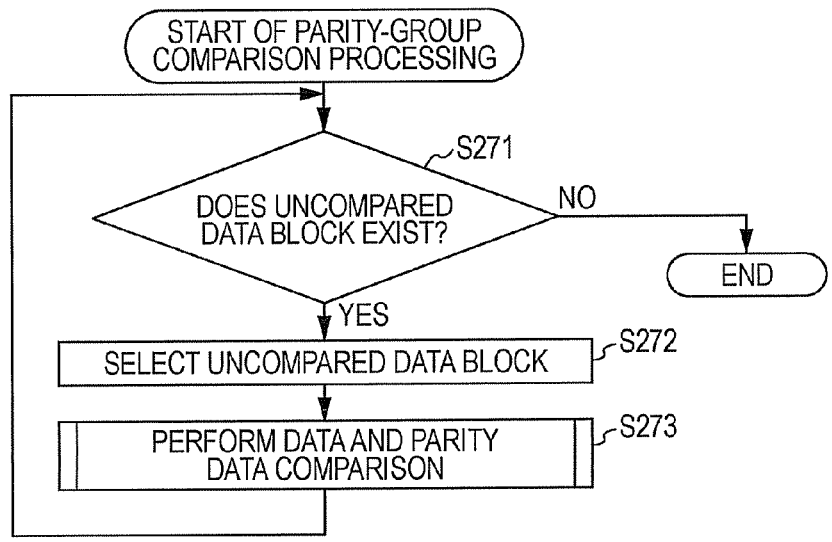
FIG. 53 is a flowchart of a procedure of parity-group comparison processing.

FIG. 53 is a flowchart of a procedure of the parity-group comparison processing. The processing illustrated in FIG. 53 will now be described along with step numbers.

In step S271, the RAID control section 134b determines whether or not any data block that has not been compared, i.e., any data block that has not been subjected to processing in step S273 described below, exists in the logical blocks shown in the access management table 132h for the parity group to be processed. A data block whose status in the access management table 132h is "null" is a data block that has not been compared. When an uncompared data block exists, the process proceeds to step S272. When no uncompared data block exists, the proceeding ends.

In step S272, the RAID control section 134b selects one uncompared data block in the access management table 132h.

In step S273, the RAID control section 134b executes processing for comparing the data in the data block selected in step S272 with the parity data in the parity block. This comparison processing is performed as described above in detail with reference to FIGS. 46 to 51. As a result of the processing of comparison with the parity data in the parity block, the status "OK" or "error" is set for the selected data block in the access management table 132h. Thereafter, the process returns to step S271.

Details of the parity-group recalculation processing will now be described next.

Figure 54:
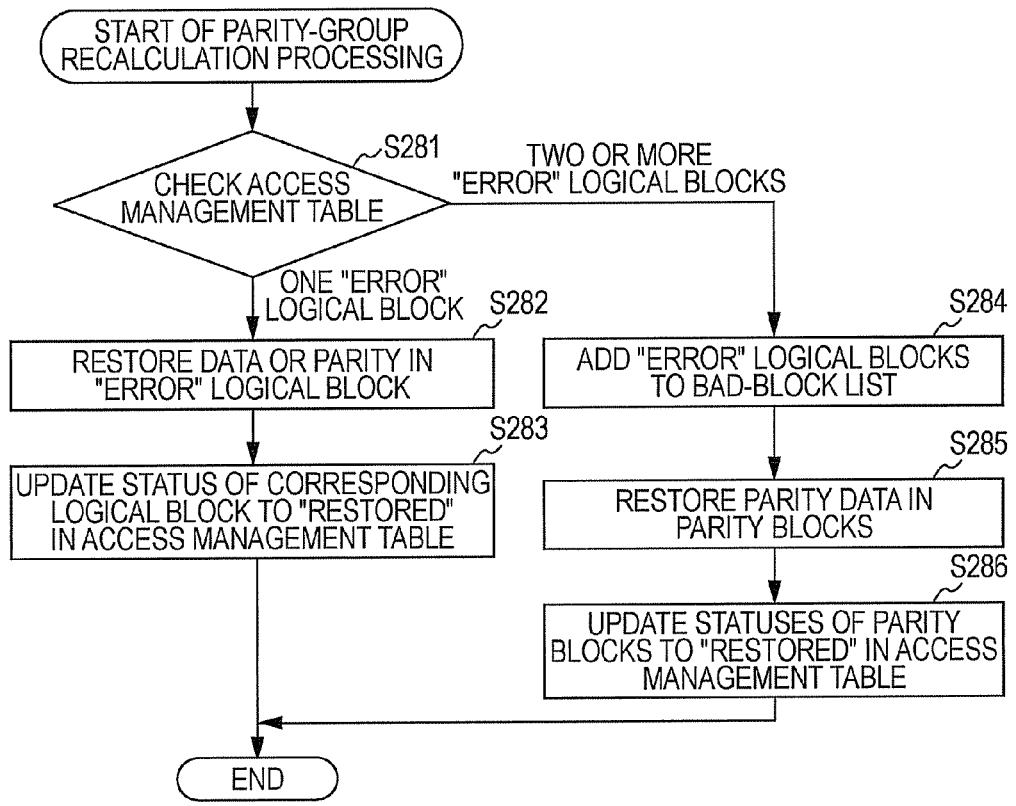
FIG. 54 is a flowchart of a procedure of parity-group recalculation processing.

FIG. 54 is a flowchart of a procedure of the parity-group recalculation processing. The processing illustrated in FIG. 54 will now be described along with step numbers.

In step S281, the RAID control section 134b checks the access management table to count the number of logical blocks whose statuses are "error". When the number of "error" logical blocks is one, the process proceeds to step S282. When the number of "error" logical blocks is two or more, the process proceeds to step S284.

In step S282, the RAID control section 134b restores data or parity data in the "error" logical block. Specifically, the RAID control section 134b performs a bitwise XOR operation on other normal data and parity data and uses the result of the operation as restored data or parity data. The RAID control section 134b writes the restored data or parity data to the physical block corresponding to the logical block to be restored.

In step S283, the RAID control section 134b updates, in the access management table 132h, the status of the logical block in which the restored data or parity data is written to "restored". Thereafter, the parity-group recalculation processing ends.

When the number of "error" logical blocks is two or more in step S281, in step S284, the RAID control section 134b adds the logical block numbers of the "error" logical blocks to a bad-block list.

In step S285, the RAID control section 134b restores the parity data in the parity block. Specifically, the RAID control section 134b performs a bitwise XOR operation on the data in the data block and uses the result of the operation as parity data. The RAID control section 134b writes the restored parity data to the physical block for the corresponding parity block.

In step S286, the RAID control section 134b updates the status of the parity block to "restored" in the access management table 132h. Thereafter, the parity-group recalculation processing ends.

The data or parity data in the logical block(s) in which a write-related loss occurred is restored as described above.

Figure 55:
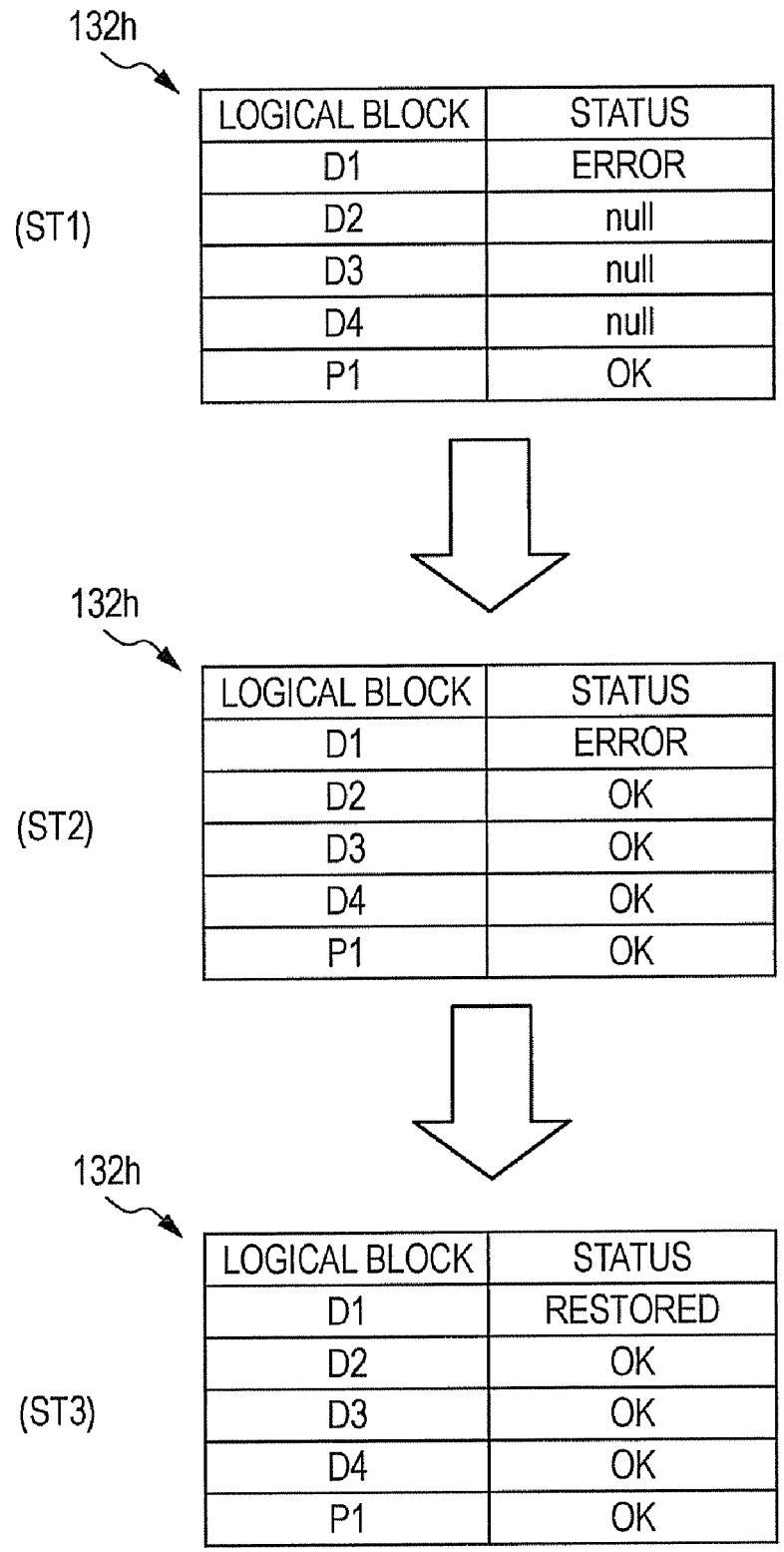
FIG. 55 illustrates an example of changes in statuses in the access management table when the parity-group restoration processing is executed.

FIG. 55 illustrates an example of changes in the statuses in the access management table when the parity-group restoration processing is executed. FIG. 55 illustrates an example when a write-related loss is detected in a data block for which a read request was issued and other logical blocks in the same parity group are normal.

A first state ST1 represents a state of the access management table 132h after write-related-loss check is performed on the data and parity data read in response to a read request. In the example of the first state ST1, a write-related loss is detected in the data block with logical block number "D1" and thus the status thereof is "error". No write-related loss is detected in the parity block and thus the state thereof is "OK".

When a write-related loss is detected, the RAID control section 134b starts execution of restoration processing and checks for a write-related data loss in other data blocks.

A second state ST2 represents a state of the access management table 132h after the write-related-loss check is performed in the restoration processing. As a result of the write-related-loss check performed on all data blocks, it has been confirmed that no write-related loss exists except for logical block number "D1". Thus, the statuses of the data blocks with logical block numbers D2, D3, and D4 indicate "OK".

Thereafter, the RAID control section 134*b* continuously performs the restoration processing to restore data in the logical block in which the write-related loss occurred.

A third state ST3 represents a state of the access management table 132*h* after the data is restored. That is, since the data in the data block with physical block number "D1" in which the write-related loss occurred has been restored, the status of the data block is changed to "restored".

The write-related-loss detection and restoration during block reading are performed as described above.

Stripe read processing will be described next.

Figure 56:
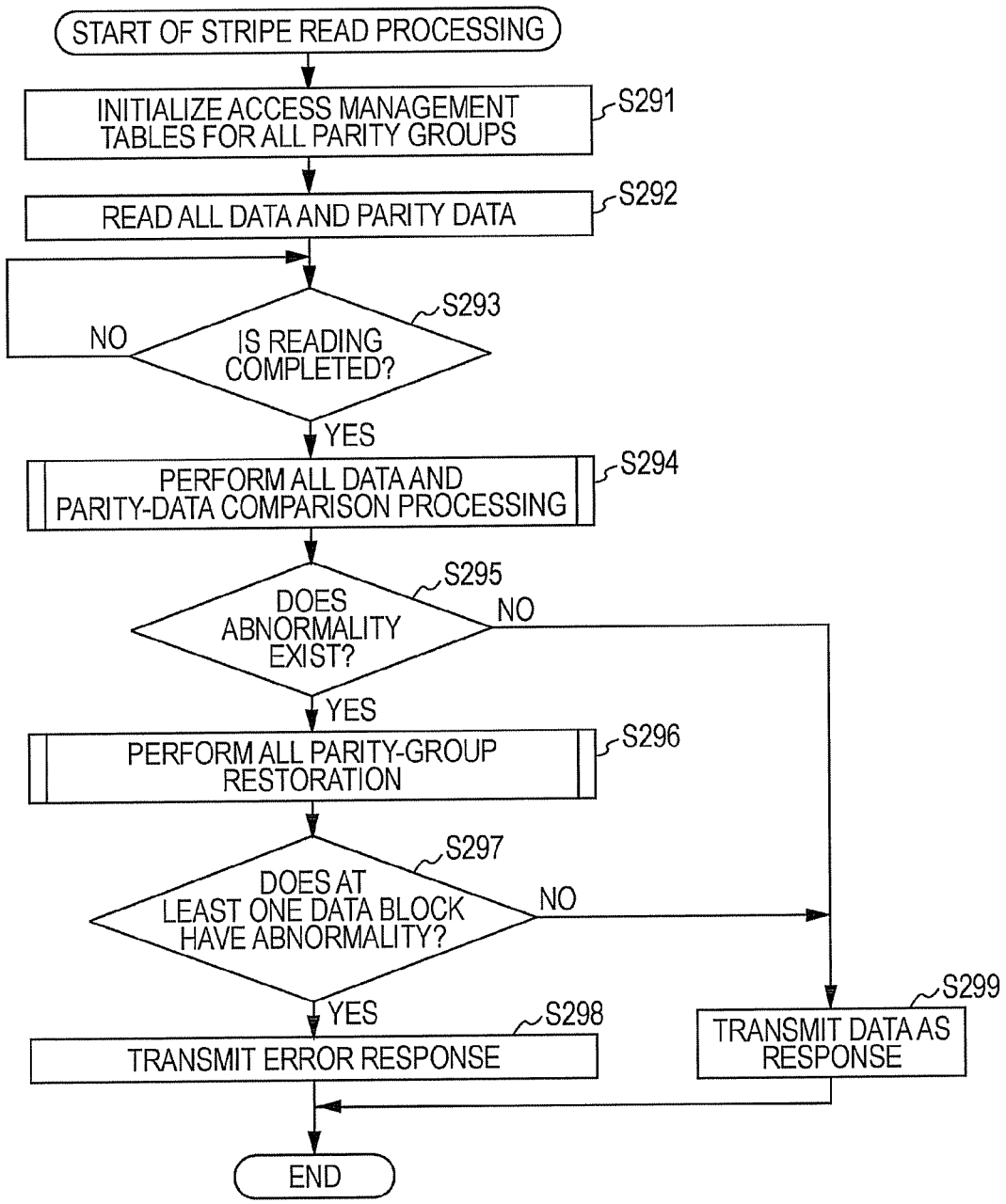
FIG. 56 is a flowchart of a procedure of stripe read processing.

FIG. 56 is a flowchart of a procedure of stripe read processing. The processing illustrated in FIG. 56 will now be described along with step numbers.

In step S291, the RAID control section 134*b* initializes the access management tables for respective parity groups included in a stripe to be accessed. In the initialized access tables, "undefined (null)" is set as the status of each of the logical blocks belonging to the corresponding parity groups.

FIG. 57 illustrates an example of the access management tables initialized during the stripe reading. This example is aimed for a case in which a read request for the stripe illustrated in FIG. 39 is input. The access management tables illustrated in FIG. 57 include the stripe illustrated in FIG. 39, i.e., four parity groups. Thus, four access management tables 132*h*, 132*i*, 132*j*, and 132*k* for the corresponding parity groups are generated. The logical block numbers of the logical blocks included in the corresponding parity groups are set in the access management tables 132*h*, 132*i*, 132*j*, and 132*k*. The statuses of the logical blocks are also set in association with the logical block numbers. The statuses of the logical blocks are set to "null" by initialization.

A description will be given below with reference back to FIG. 56.

In step S292, the RAID control section 134*b* reads, from the physical blocks corresponding to all logical blocks belonging to the parity groups included in the stripe, data and parity data in the logical blocks.

In step S293, the RAID control section 134*b* determines whether or not the reading of all data and parity data is completed. When the reading is completed, the process proceeds to step S294. When the reading is not completed, the processing in step S293 is repeated and the RAID control section 134*b* enters a state for waiting for the reading.

In step S294, the RAID control section 134*b* performs all data and parity-data comparison processing. In the comparison processing, the presence/absence of a write-related loss is checked with respect to all logical blocks. Details of the all data and parity-data comparison processing are described below (with reference to FIG. 58).

In step S295, the RAID control section 134*b* determines whether or not the result of the all data and parity-data comparison processing performed in step S294 indicates an abnormality. When no abnormality exists, the process proceeds to step S299. When an abnormality exists, the process proceeds to step S296.

In step S296, the RAID control section 134*b* performs all-parity-group restoration processing. The result of the restoration processing is reflected in the access management tables. Details of the all-parity-group restoration processing are described below (with reference to FIG. 59).

In step S297, the RAID control section 134*b* determines whether or not at least one data block has an abnormality. When at least one bad block is detected, the RAID control section 134*b* determines that an abnormality exists. When no abnormality exists, the process proceeds to step S299. When an abnormality exists, the process proceeds to step S298.

When restoration of the parity groups fails in step S296, in step S298, the RAID control section 134*b* transmits an error response to the host computer 10. Thereafter, the stripe read processing ends.

In step S299, the RAID control section 134*b* transmits the data in the stripe to the host computer 10 as a response. Thereafter, the stripe read processing ends.

During stripe reading, a write-related loss in all data and parity data is checked as described above.

The all data and parity-data comparison processing will now be described next in detail.

Figure 58:
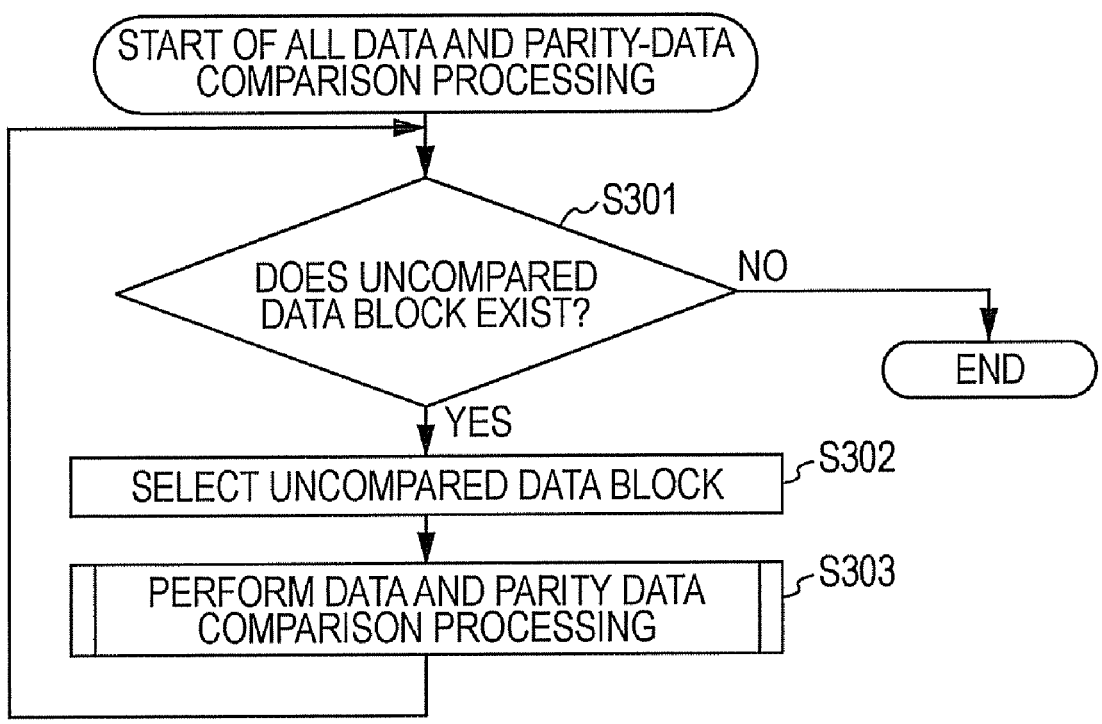
FIG. 58 is a flowchart of a procedure of all data and parity-data comparison processing.

FIG. 58 is a flowchart of a procedure of the all data and parity-data comparison processing. The processing illustrated in FIG. 58 will now be described along with step numbers.

In step S301, the RAID control section 134*b* determines whether or not any uncompared data block, i.e., any data block that has not been subjected to processing in step S303 described below, exists in the logical blocks shown in the access management tables 132*h*, 132*i*, 132*j*, and 132*k*. The data blocks whose statuses in the access management table 132*h*, 132*i*, 132*j*, and 132*k* indicate "null" are data blocks that have not been compared. When an uncompared data block exists, the process proceeds to step S302. When no uncompared data block exists, the all data and parity-data comparison proceeding ends.

In step S302, the RAID control section 134*b* selects one uncompared data block in the access management tables 132*h*, 132*i*, 132*j*, and 132*k*.

In step S303, the RAID control section 134*b* executes processing for comparing the data in the data block selected in step S302 with the parity data in the parity block. This comparison processing is performed as described above in detail with reference to FIGS. 46 to 51. As a result of the processing of comparison with the parity data in the parity block, the status "OK" or "error" is set for the selected data block in the access management tables 132*h*, 132*i*, 132*j*, and 132*k*. Thereafter, the process returns to step S301.

Details of the all-parity-group restoration processing will now be described next.

Figure 59:
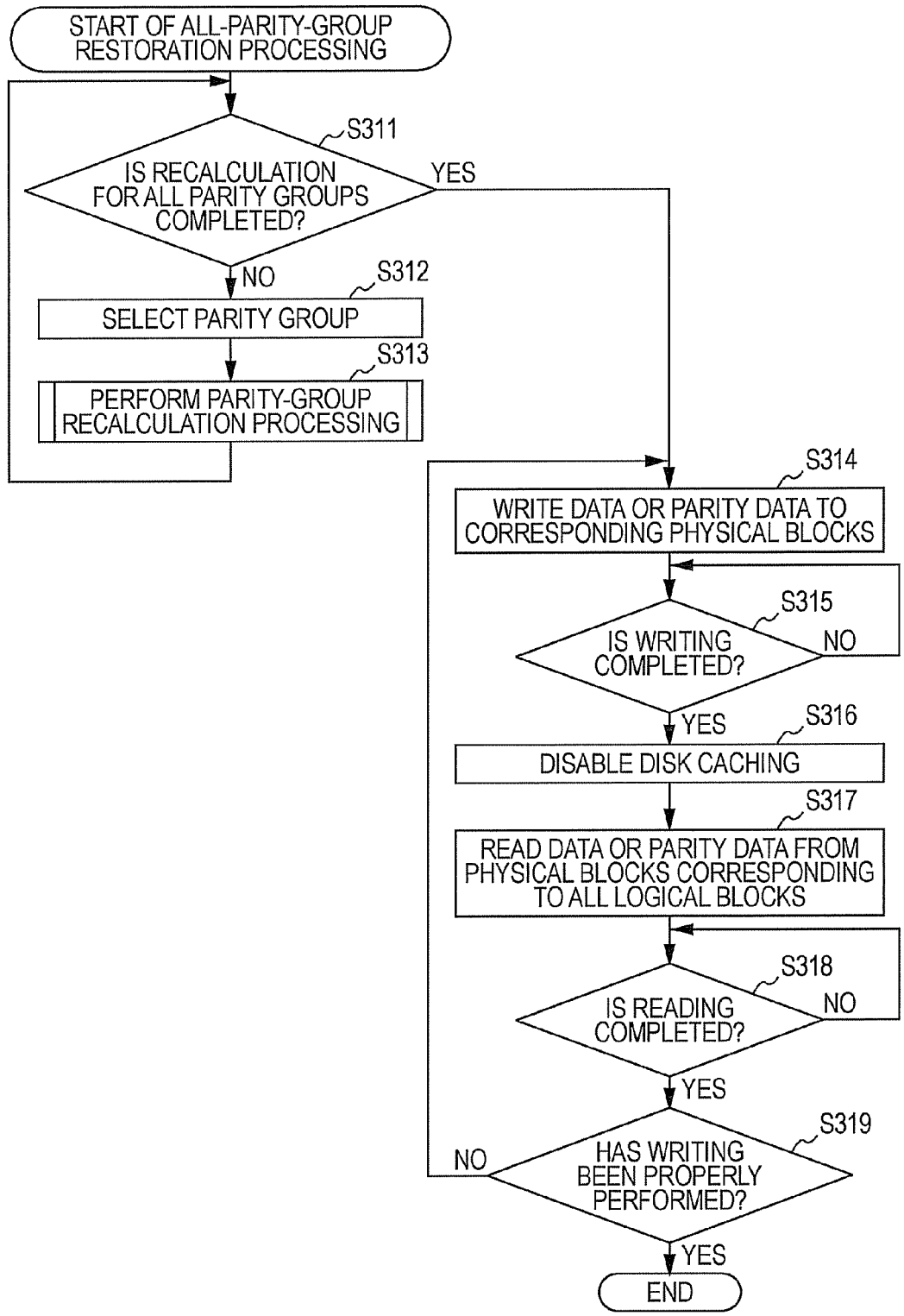
FIG. 59 is a flowchart of a procedure of all-parity-group restoration processing.

FIG. 59 is a flowchart of a procedure of the all-parity-group restoration processing. The processing illustrated in FIG. 59 will now be described along with step numbers.

In step S311, the RAID control section 134*b* determines whether or not the parity-group recalculation processing is completed with respect to all parity groups. When the parity-group recalculation processing is completed with respect to all parity groups, the process proceeds to step S314. When an unprocessed parity group exists, the process proceeds to step S312.

In step S312, the RAID control section 134*b* selects one parity group on which the parity-group recalculation processing has not been performed.

In step S313, the RAID control section 134*b* performs the parity-group recalculation processing. This recalculation processing is performed as described above in detail with reference to FIG. 54. After step S313, the process returns to step S311.

In step S314, the RAID control section 134*b* writes the data or parity data, contained in the stripe to be processed, to the physical blocks corresponding to the logical blocks.

In step S315, the RAID control section 134*b* determines whether or not the write processing in step S314 is completed. When the writing is completed, the process proceeds to step S316. When the writing is not completed, the processing in step S315 is repeated and the RAID control section 134*b* enters a state for waiting for the writing.

In step S316, the RAID control section 134*b* disables disk caching in the HDDs 210*b*, 220*b*, 230*b*, 240*b*, and 250*b*.

In step S317, the RAID control section 134*b* reads data or parity data from physical blocks corresponding to all logical blocks contained in the stripe to be processed.

In step S318, the RAID control section 134*b* determines whether or not the reading in step S317 is completed. When the reading is completed, the process proceeds to step S319. When the reading is not completed, the RAID control section 134*b* repeats the processing in step S318 and enters a state for waiting for the reading.

In step S319, the RAID control section 134*b* determines whether or the writing in step S314 is properly performed. Specifically, the RAID control section 134*b* compares the data or parity data written in step S314 with the data or parity data read in step S317. When the result of the comparison indicates that the contents of the data or parity data read in step S314 match the contents of the corresponding data or parity data read in step S317, it is determined that the writing was properly performed. When the result of the comparison indicates that the contents of the data or parity data do not match, it is determined that the writing was not properly performed.

When the writing is not properly performed in step S319, the process returns to step S314 and the writing is performed again. When the writing is properly performed in step S319, the all-parity-group restoration processing ends.

The use of both the timestamps and the counter values, as described above, makes it possible to eliminate the need for performing the advance reading during stripe writing. Furthermore, the capacity of the storage area for the time-series information (the timestamps, the flags, and the counter values) can be reduced, compared to a case in which only the timestamps are used. That is, it is possible to minimize the storage area for the supplementary information for write-related-loss checking and it is also possible to eliminate the need for reading all data during stripe writing.

Other Application Examples

Although detailed processing has been described in the above embodiments in conjunction with an example of RAID 5, the embodiments can also be applied to RAID 4.

Figure 60:
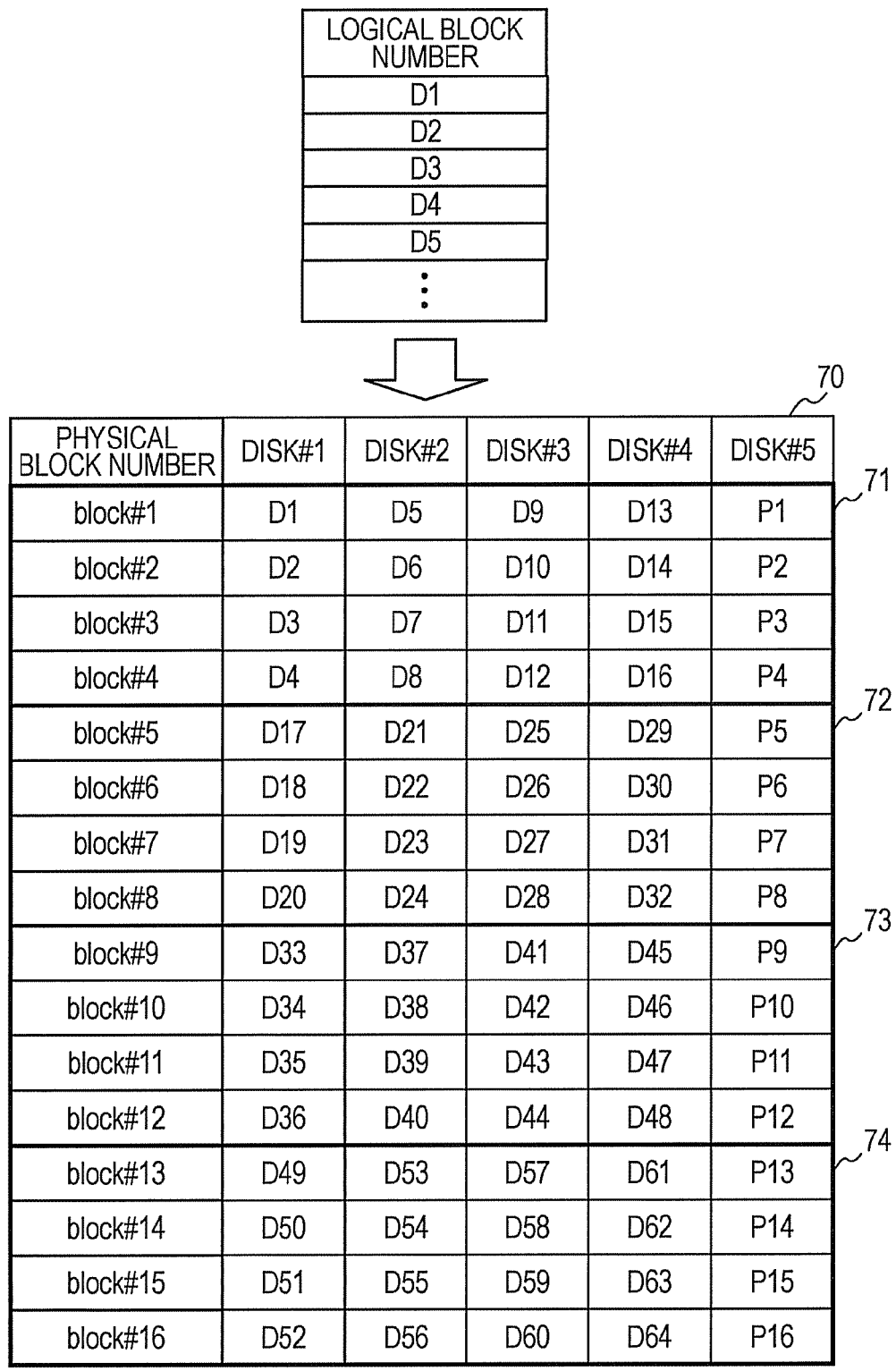
FIG. 60 illustrates an example of assignment of logical blocks in RAID 4 to HDDs.

FIG. 60 illustrates an example in which logical blocks in RAID 4 are assigned to HDDs. In FIG. 60, the logical block number of each data block in which data is stored is represented by a combination of character "D" and a numeral. The logical block number of each parity block in which parity data is stored is represented by a combination of character "P" and a numeral. In an assignment table 70, the logical block number of a logical block assigned to a physical block identified by a disk number and a block number is set at a position where the disk number and the block number cross each other. In the example of FIG. 60, the number of bocks in a parity group is five and the number of blocks in a chunk is four. Thus, the blocks horizontally arranged in the assignment table 70 constitute one parity group, and a collection of the parity groups corresponding to the number (in this case, 5) of parity groups constitutes each of stripes 71 to 74. In FIG. 60, the stripes 71 to 74 are surrounded by thick-line frames. In RAID 4, all parity blocks in the parity groups are stored in one HDD.

When compared with the RAID 5 data assignment illustrated in FIG. 8, RAID 4 is different therefrom in that the physical blocks assigned to the parity blocks are located in one HDD. Thus, the processing in the first to third embodiments can be directly applied to RAID 4.

According to the above-described storage apparatus, write-related-loss detection can be performed during data reading.

The functions of the above-described processing can be realized by a computer.

Figure 61:
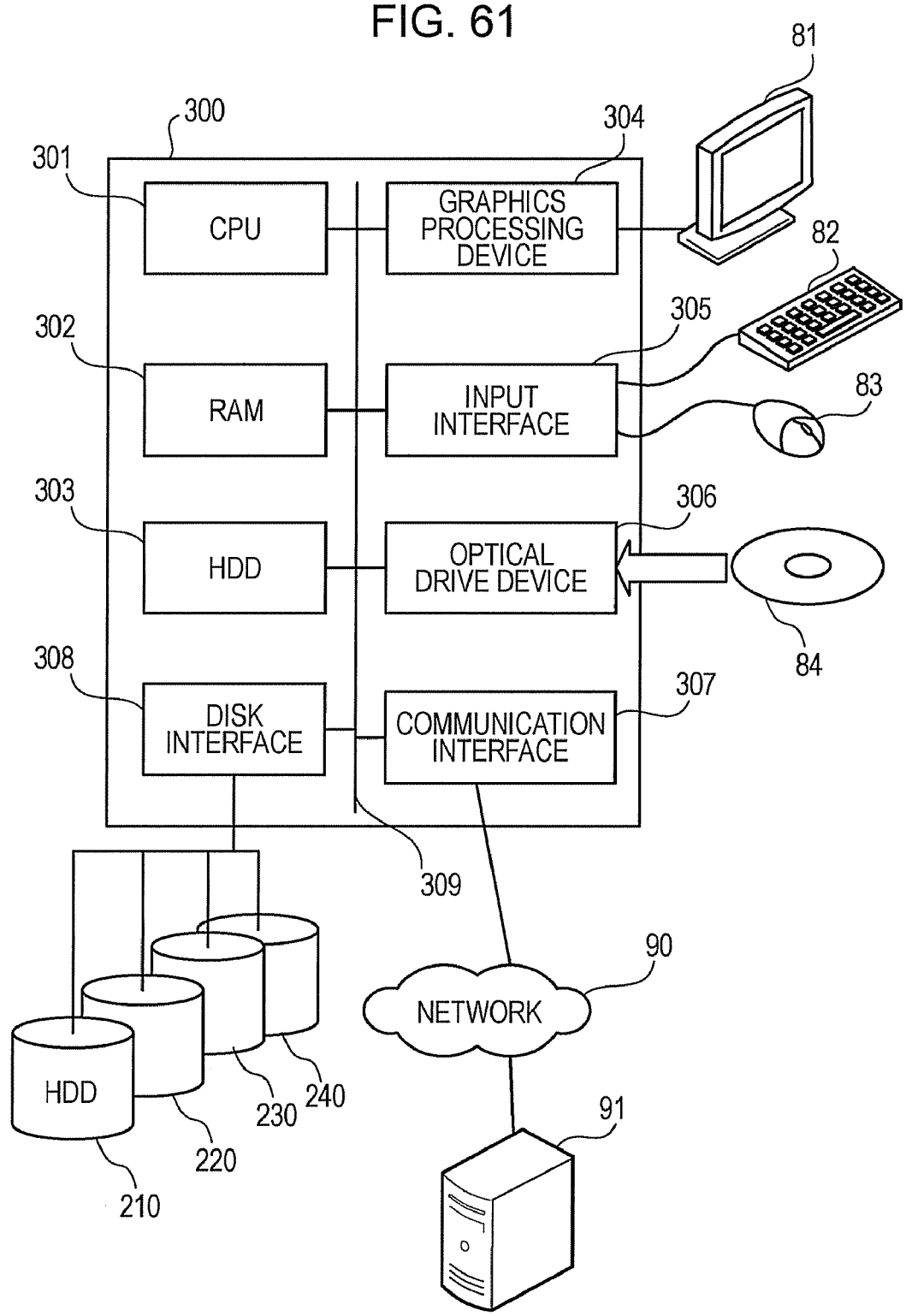
FIG. 61 is a block diagram of an example of the hardware configuration of a computer used in the embodiments.

FIG. 61 is a block diagram of an example of the hardware configuration of a computer used in the embodiments. A computer 300 has a CPU (central processing unit) 301, which controls the entire apparatus. A RAM 302 and peripherals are connected to the CPU 301 through a bus 309.

The RAM 302 is used as a primary storage device for the computer 300. The RAM 302 temporarily stores at least part of an OS (operating system) program and an application program to be executed by the CPU 301. The RAM 302 stores various types of data needed for processing to be executed by the CPU 301.

Examples of the peripherals connected to the bus 309 include a HDD 303, a graphics processing device 304, an input interface 305, an optical drive device 306, a communication interface 307, and a disk interface 308.

The HDD 303 magnetically writes data to and reads data from its built-in disk. The HDD 303 is used as a secondary storage device for the computer 300. The HDD 303 stores the OS program, application program, and various types of data. A semiconductor storage device, such as a flash memory, may also be used as the secondary storage device.

A monitor 81 is connected to the graphics processing device 304. In accordance with an instruction from the CPU 301, the graphics processing device 304 displays an image on a screen of the monitor 81. The monitor 81 may be implemented by a liquid crystal display device, a display device using a CRT (cathode ray tube), or the like.

A keyboard 82 and a mouse 83 are connected to the input interface 305. The input interface 305 sends signals, transmitted from the keyboard 82 and the mouse 83, to the CPU 301. The mouse 83 is one example of a pointing device and may be implemented by another pointing device. Examples of another pointing device include a touch panel, a graphics tablet, a touchpad, and a trackball.

The optical drive device 306 uses laser light or the like to read data recorded on an optical disk 84. The optical disk 84 is a removable recording medium on which data is recorded so as to be readable through light reflection. Examples of the optical disk 84 include a DVD (Digital Versatile Disc), a DVD-RAM, a CD-ROM (Compact Disc—Read Only Memory), and a CD-R (Recordable)/RW-R (ReWritable).

The communication interface 307 is linked to a network 90. The communication interface 307 transmits/receives data to/from another computer, such as a server, 91 over the network 90.

HDDs 210, 220, 230, and 240 for achieving RAID 5 are connected to the disk interface 308. The disk interface 308 controls input/output data to/from the HDDs 210, 220, 230, and 240.

In this case, a program in which the contents of processing for the functions of the RAID apparatus are written is provided. When the program is executed by the computer, the above-described processing functions are realized on the computer. In this case, the computer 300 has the reading module 1, the parity-data generating module 2, the time-series-information generating module 3, the time-series-information adding module 4, the writing module 5, the comparing module 6, the restoring module 7, and the data output module 8 which are illustrated in FIG. 1.

The program in which the contents of the processing are written can be recorded to a computer-readable recording medium. Examples of the computer-readable recording medium include a magnetic storage device, an optical disk, a magneto-optical recording medium, and a semiconductor memory. Examples of the magnetic storage device include a HDD, a flexible disk (FD), and a magnetic tape. Examples of the optical disk include a DVD, DVD-RAM, CD-ROM, and CD-R/RW. One example of the mantic optical recording medium is an MO (magneto-optical disk).

For distribution of the program, portable recording media (such as DVDs and CD-ROMs) on which the program is recorded may be made commercially available. The program may also be stored in a storage device in a server computer so that the program can be transferred therefrom to another computer over a network.

A program that executes the program stores the program, recorded on the portable recording medium or the like or transferred from the server computer, in the storage device of the computer. The computer then reads the program from the storage device thereof to execute processing according to the program. The computer may also directly read the program from the portable recording medium to execute processing according to the program. In addition, each time the program is transferred from the server computer, the computer may execute the processing according to the received program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A disk array apparatus in which each storage area in multiple storage devices is divided into multiple unit storage areas, multiple pieces of data and parity data generated based on the multiple pieces of data are grouped into a parity group, and the multiple pieces of data and the parity data in a same parity group are distributed and stored in the multiple unit storage areas in the multiple storage devices, the disk array apparatus comprising:
   a parity-data generating unit that generates, in response to a write request containing update data, updated parity data in a parity group to which the update data belongs;
   a time-series-information generating unit that generates time-series information indicating an anteroposterior relationship during writing between the update data and existing data stored in an unit storage area to which the update data is to be written;
   a time-series-information adding unit that adds the time-series information, generated in response to the write request, to the update data as certification time-series information and that adds comparison time-series information to the updated parity data in association with the update data, the comparison time-series information having the same value as the certification time-series information; and
   a writing unit that distributes and writes, to the multiple storage devices, the update data to which the certification time-series information is added and the updated parity data to which the comparison time-series information is added.

2. The apparatus according to claim 1, further comprising:
   a reading unit that reads, from the multiple storage devices, the update data to which the certification time-series information is added and the updated parity data to which the comparison time-series information associated with the update data is added, in response to a read request specifying the update data;
   a comparing unit that compares the certification time-series information added to the update data with the comparison time-series information associated with the update data; and
   a data output unit that outputs the update data when the certification time-series information and the comparison time-series information match each other.

3. The apparatus according to claim 2, wherein the time-series-information generating unit generates, as the time-series information, time-series information having a value that increases as the write request is input later;
   wherein the disk array apparatus further comprises a restoring unit that reads, when a result of the comparison performed by the comparing unit indicates that the value of the certification time-series information is smaller than the value of the comparison time-series information associated with the update data, other data in the parity group to which the update data belongs from the multiple storage devices and that restores the update data by using the other data and the updated parity data; and
   wherein, when the update data is restored, the data output unit outputs the restored update data.

4. The apparatus according to claim 3, wherein, when the update data is restored, the time-series-information adding unit adds the comparison time-series information, added to the updated parity data in association with the update data, to the restored update data; and
   wherein the writing unit writes, back to an unit storage area from which the update data was read, the restored update data to which the comparison time-series information is added.

5. The apparatus according to claim 3, wherein, when the value of the certification time-series information added to the update data is greater than the value of the comparison time-series information added to the updated parity data in association with the update data, the reading unit reads the other data in the parity group to which the update data belongs, together with the certification time-series information generated during writing of the other data, from the multiple storage devices;
   wherein the restoring unit restores the updated parity data by using the other data and the update data;
   wherein, when the updated parity data is restored, the time-series-information adding unit adds the comparison time-series information to the restored updated parity data, the comparison time-series information having the same value as the certification time-series information of multiple pieces of data in the parity group to which the update data belongs; and
   wherein, when the updated parity data is restored, the writing unit writes, back to an unit storage area from which the updated parity data was read, the restored updated parity data to which multiple pieces of comparison time-series information are added.

6. The apparatus according to claim 3, wherein the time-series-information generating unit generates, as the time-series information, a timestamp indicating a time at which the write request is input.

7. The apparatus according to claim 1, wherein, when the write request is a stripe write request specifying writing of all data in at least one parity group, the parity-data generating unit generates the updated parity data on a basis of multiple pieces of update data specified by the write request; and wherein, when the write request is the stripe write request, the time-series-information adding unit adds the certification time-series information having a same value to the multiple pieces of update data and adds, to the generated updated parity data, the comparison time-series information corresponding to the respective multiple pieces of update data in the same parity group as the parity group of the updated parity data.

8. The apparatus according to claim 1, further comprising:
a reading unit that reads, from the multiple storage devices, the existing data stored in the unit storage area to which the update data is to be written and existing parity data belonging to the same parity group as the parity group of the update data, in response to the write request when the write request is a block write request specifying writing to one unit storage area; and
wherein the parity-data generating unit generates the updated parity data by using the existing data, the update data, and the existing parity data.

9. The apparatus according to claim 8, wherein the time-series-information generating unit generates, as the time-series information, time-series information having a value obtained by counting up the value of the certification time-series information added to the update data.

10. The apparatus according to claim 9, wherein, when the value of the certification time-series information added to the existing data is a predetermined maximum value, the time-series-information generating unit uses a predetermined initial value as the time-series information.

11. The apparatus according to claim 10, wherein, in response to a read request specifying the update data, the reading unit reads, from the multiple storage devices, the update data to which the certification time-series information is added and the updated parity data to which the comparison time-series information associated with the update data is added;
wherein the disk array apparatus further comprises:
a comparing unit that compares the certification time-series information added to the update data with the comparison time-series information associated with the update data;
a restoring unit that reads, when a result of the comparison performed by the comparing unit indicates that the value of the certification time-series information added to the update data is a value before a count-up of the comparison time-series information added to the updated parity data in association with the update data, other data in the parity group to which the update data belongs from the multiple storage devices and that restores the update data by using the other data and the updated parity data; and
a data output unit that outputs the update data read from the multiple storage devices when the certification time-series information and the comparison time-series information match each other and that outputs the restored update data when the update data is restored.

12. The apparatus according to claim 11, wherein, when the value of the certification time-series information added to the update data read in response to the read request is a value after the count-up of the comparison time-series information added to the updated parity data in association with the update data, the reading unit reads the other data in the parity group to which the update data belongs, together with the certification time-series information, from the multiple storage devices;
wherein the restoring unit restores the updated parity data by using the other data and the update data;

wherein, when the updated parity data is restored, the time-series-information adding unit adds multiple pieces of comparison time-series information to the restored updated parity data, the multiple pieces of comparison time-series information having the same value as corresponding multiple pieces of certification time-series information added to the update data and the other data; and
wherein, when the updated parity data is restored, the writing unit writes, back to an unit storage area from which the updated parity data was read, the restored updated parity data to which the multiple pieces of comparison time-series information are added.

13. The apparatus according to claim 8, wherein, when the write request is the block write request, the time-series-information generating unit generates, as the time-series information, first time-series information having a value that increases as the write request is input later and second time-series information having a value that is obtained by counting up the value of the certification time-series information added to the update data, and when the write request is a stripe write request specifying writing of all data in at least one parity group, the time-series-information generating unit generates, as the time-series information, the first time-series information and the second time-series information having a predetermined initial value;
wherein, when the write request is the block write request, the time-series-information adding unit adds, to the update data, certification time-series information containing the first time-series information and the second time-series information and a first flag indicating that the second time-series information to be compared and adds, to the updated parity data, comparison time-series information containing the second time-series information and the first flag in association with the update data; and
wherein, when the write request is the stripe write request, the time-series-information adding unit adds, to the update data, a second flag indicating that the first time-series information is to be compared and the certification time-series information containing the first time-series information and the second time-series information and adds, to the updated parity data, a combination of the second flag associated with the update data and the second time-series information and comparison time-series information containing the first time-series information.

14. The apparatus according to claim 13, wherein, in response to a read request specifying the update data, the reading unit reads, from the multiple storage devices, the update data to which the certification time-series information is added and the updated parity data to which the comparison time-series information associated with the update data is added; and
wherein the disk array apparatus further comprises:
a comparing unit that compares, when both the certification time-series information added to the update data and the comparison time-series information added to the updated parity data in association with the update data have the first flag, the value of the second time-series information of the certification time-series information with the value of the second time-series information of the comparison time-series information and that compares, when both the certification time-series information added to the update data and the comparison time-series information added to the updated parity data in association with the update data have the second flag, the value of the first time-series information of the certification time-series information with value of the first time-series information of the comparison time-series information; and
a data output unit that outputs the update data when a comparison result indicates a value match.

15. A data distribution and management method in which each storage area in multiple storage devices is divided into multiple unit storage areas, multiple pieces of data and parity data generated based on the multiple pieces of data are grouped into a parity group, and the multiple pieces of data and the parity data in a same parity group are distributed and stored in the multiple unit storage areas in the multiple storage devices, the method comprising:
  generating, in response to a write request containing update data, updated parity data in a parity group to which the update data belongs;
  generating time-series information indicating an antero-posterior relationship during writing between the update data and existing data stored in an unit storage area to which the update data is to be written;
  adding the time-series information, generated in response to the write request, to the update data as certification time-series information;
  adding comparison time-series information to the updated parity data in association with the update data, the comparison time-series information having the same value as the certification time-series information; and
  distributing and writing, to the multiple storage devices, the update data to which the certification time-series information is added and the updated parity data to which the comparison time-series information is added.

16. A computer-readable recording medium encoded with a data distribution and management program containing instructions executable on a computer that performs data distribution and management in which each storage area in multiple storage devices is divided into multiple unit storage areas, multiple pieces of data and parity data generated based on the multiple pieces of data are grouped into a parity group, and the multiple pieces of data and the parity data in a same parity group are distributed and stored in the multiple unit storage areas in the multiple storage devices, the program causing the computer to execute:
  generating, in response to a write request containing update data, updated parity data in a parity group to which the update data belongs;
  generating time-series information indicating an antero-posterior relationship during writing between the update data and existing data stored in an unit storage area to which the update data is to be written;
  adding the time-series information, generated in response to the write request, to the update data as certification time-series information;
  adding comparison time-series information to the updated parity data in association with the update data, the comparison time-series information having the same value as the certification time-series information; and
  distributing and writing, to the multiple storage devices, the update data to which the certification time-series information is added and the updated parity data to which the comparison time-series information is added.

* * * * *